US008191764B2

(12) United States Patent
Bolton

(10) Patent No.: US 8,191,764 B2
(45) Date of Patent: Jun. 5, 2012

(54) SYSTEM AND METHOD FOR DETECTING SECURITY FEATURES ON PAPER BALLOTS

(75) Inventor: Steve Bolton, Clearwater, FL (US)

(73) Assignee: ES&S Innovations LLC, Omaha, NE (US)

( * ) Notice: Subject to any disclaimer, the term of this patent is extended or adjusted under 35 U.S.C. 154(b) by 348 days.

(21) Appl. No.: 12/372,422

(22) Filed: Feb. 17, 2009

(65) Prior Publication Data

US 2009/0256703 A1 Oct. 15, 2009

Related U.S. Application Data

(63) Continuation-in-part of application No. 12/049,210, filed on Mar. 14, 2008.

(60) Provisional application No. 60/918,117, filed on Mar. 15, 2007.

(51) Int. Cl.
*G06F 17/00* (2006.01)

(52) U.S. Cl. ........................................ 235/375; 235/385

(58) Field of Classification Search .................. 235/375, 235/385, 386, 462.01, 50 A
See application file for complete search history.

(56) References Cited

U.S. PATENT DOCUMENTS

| | | | | |
|---|---|---|---|---|
| 5,871,615 | A | 2/1999 | Harris | |
| 6,854,644 | B1 | 2/2005 | Bolton et al. | |
| 6,892,944 | B2 | 5/2005 | Chung et al. | |
| 7,036,730 | B2 | 5/2006 | Chung | |
| 7,077,313 | B2 | 7/2006 | Chung et al. | |
| 7,111,782 | B2 | 9/2006 | Homewood et al. | |
| 7,422,151 | B2 | 9/2008 | Homewood et al. | |
| 2003/0062411 | A1 * | 4/2003 | Chung et al. | 235/386 |
| 2004/0080777 | A1 | 4/2004 | Smith | |
| 2004/0238632 | A1 | 12/2004 | Homewood et al. | |
| 2006/0202031 | A1 | 9/2006 | Chung et al. | |
| 2007/0012767 | A1 | 1/2007 | Homewood et al. | |
| 2008/0210746 | A1 | 9/2008 | Homewood et al. | |
| 2008/0281682 | A1 * | 11/2008 | Euchner et al. | 705/12 |
| 2009/0121018 | A1 | 5/2009 | Bauchot et al. | |
| 2009/0121019 | A1 | 5/2009 | Bauchot et al. | |
| 2009/0289115 | A1 * | 11/2009 | Chung et al. | 235/386 |
| 2009/0294533 | A1 * | 12/2009 | Reardon | 235/386 |

FOREIGN PATENT DOCUMENTS

| | | |
|---|---|---|
| IT | 1234224 | 5/1992 |
| WO | WO 2008/113058 A1 | 9/2008 |

OTHER PUBLICATIONS

Saltman, Roy G., *Accuracy, Integrity, and Security in Computerized Vote-Tallying,* NBS Special Publication 500-158, Institute for Computer Sciences and Technology, National Bureau of Standards, Aug. 1988, 103 pgs.

* cited by examiner

*Primary Examiner* — Daniel St.Cyr

(74) *Attorney, Agent, or Firm* — Stinson Morrison Hecker LLP

(57) ABSTRACT

The present invention is directed to a system and method for detecting security features on paper ballots. The security features allow a ballot tabulator to distinguish between an authentic ballot and a counterfeit ballot that does not include the required security feature. One or more security sensors in the ballot tabulator are operable to detect the security feature on the ballot, and provide an output indicating the presence or absence of the security feature. The ballot tabulator preferably generates a visual alert and/or audio alert if the security sensor does not detect the security feature on the paper ballot.

39 Claims, 37 Drawing Sheets

SYSTEM AND METHOD FOR DETECTING SECURITY FEATURES ON PAPER BALLOTS

CROSS-REFERENCE TO RELATED APPLICATIONS

This application is a continuation-in-part of, and claims priority to, U.S. patent application Ser. No. 12/049,210, filed on Mar. 14, 2008, which in turn claims priority to U.S. Provisional Application Ser. No. 60/918,117, filed on Mar. 15, 2007, each of which is incorporated herein by reference in its entirety.

STATEMENT REGARDING FEDERALLY SPONSORED RESEARCH OR DEVELOPMENT

Not applicable.

BACKGROUND OF THE INVENTION

1. Field of the Invention

The present invention relates generally to voting systems and, more particularly, to a system and method for detecting security features on paper ballots.

2. Description of Related Art

A variety of different types of voting equipment are used in the United States and throughout the world. In many jurisdictions, a voter receives a traditional paper ballot on which is printed the various races to be voted on. The voter votes by darkening or otherwise marking the appropriate mark spaces on the paper ballot. The marked paper ballot may then be dropped in a ballot box, with the ballot later being transferred to a centralized location for tabulation by a central ballot counter. Alternatively, many jurisdictions provide a local precinct ballot counter at the polling place in order to expedite the tabulation of votes. In either case, the marked ballot is inserted into a ballot counter or tabulator which is operable to read the selections marked on the ballot and tabulate votes based on those selections. As additional ballots are processed, the tabulator keeps a running total of the votes cast for each candidate (or other choice) for each of the races printed on the ballot.

In jurisdictions that use traditional paper ballots, an electronic ballot marking device may be provided for use by voters who are blind, vision-impaired, or have a disability or condition that would make it difficult or impossible to manually mark a paper ballot in the usual way. In operation, a voter receives a paper ballot from a poll worker and takes the paper ballot to the ballot marking device. The voter inserts the paper ballot into the device, whereby the paper ballot is scanned and the various races to be voted on are presented to the voter either visually on a touch screen display or audibly via headphones. The voter then selects his/her votes using one of several different types of input devices (e.g., a touch screen display, Braille-embossed keys, etc.). Once the voter confirms that the selected votes are correct, a printer marks the paper ballot by printing marks in the appropriate mark spaces on the paper ballot. The voter or a poll worker then drops the marked paper ballot in a ballot box for tabulation by a central ballot counter, or the marked paper ballot is directly inserted into a precinct ballot counter.

One issue that has been raised with respect to central and precinct ballot counters is that such systems do not guard against the tabulation of counterfeit ballots. Specifically, a voter can potentially insert one or more counterfeit ballots into the ballot box (for later tabulation by the central ballot counter) or directly into the precinct ballot counter. As a result, the integrity of an election may be compromised if votes from counterfeit ballots are tabulated along with votes from authentic ballots.

BRIEF SUMMARY OF THE INVENTION

The present invention is directed to a system and method for detecting security features on paper ballots, wherein the security feature allows either a precinct ballot tabulator or a central ballot tabulator to distinguish between an authentic ballot and a counterfeit ballot that does not include the required security feature. In an exemplary embodiment, the ballot tabulator includes a paper drive mechanism operable to transport a paper ballot through a paper path in the ballot tabulator. A scanner of the ballot tabulator is operable to scan the paper ballot to determine one or more voting selections marked thereon. The voting selections may be hand-marked by a voter on the paper ballot, or may be printed on the paper ballot by an electronic ballot marking device or a ballot printer connected to an ADA console. The ballot tabulator is also operable to tabulate the voting selections decoded from the paper ballot.

In accordance with the invention, the paper ballot includes one or more security features, such as a taggant, a watermark, printed indicia, a hologram, a thread, embossing, intaglio print, or combinations thereof. The security feature may optionally provide an indication of an election, a ballot style, a precinct, an absentee ballot, an election day ballot, or combinations thereof. At least one security sensor positioned within the ballot tabulator is operable to detect the security feature on the paper ballot and provide an output indicating the presence or absence of the security feature. Preferably, the ballot tabulator includes an output device operable to generate a visual alert and/or audio alert if the security sensor does not detect the required security feature on the paper ballot. For example, the output device may comprise a display operable to present a visual alert and/or a buzzer, piezoelectric device or tone generator operable to present an audio alert. Of course, if the security sensor detects the security feature on the paper ballot, the ballot tabulator tabulates the voting selections marked on the paper ballot. As such, only the votes from authentic ballots are included within the vote totals for the election.

In another exemplary embodiment, the security sensor is positioned within a ballot reader that is used to verify the authenticity of paper ballots. The ballot reader includes a paper drive mechanism operable to transport a paper ballot through a paper path in the ballot reader, and a security sensor operable to detect the security feature on the paper ballot and provide an output indicating the presence or absence of the security feature. In this embodiment, the ballot reader does not scan the paper ballot to determine the voting selections marked thereon and does not tabulate the marked voting selections. Rather, if the paper ballot includes the required security feature, the ballot is dropped in a ballot box for tabulation by a conventional central ballot counter, or the ballot is directly inserted into a conventional precinct ballot counter.

DETAILED DESCRIPTION OF EXEMPLARY EMBODIMENTS

The present invention is directed to a system and method for detecting security features on a paper ballot. While the invention will be described in detail below with reference to various exemplary embodiments, it should be understood that the invention is not limited to the specific system configuration or methodology of those embodiments. In addition, although the exemplary embodiments are described as embodying several different inventive features, one skilled in the art will appreciate that any one of these features could be implemented without the others in accordance with the invention.

Configuration of Voting System

Figure 1:
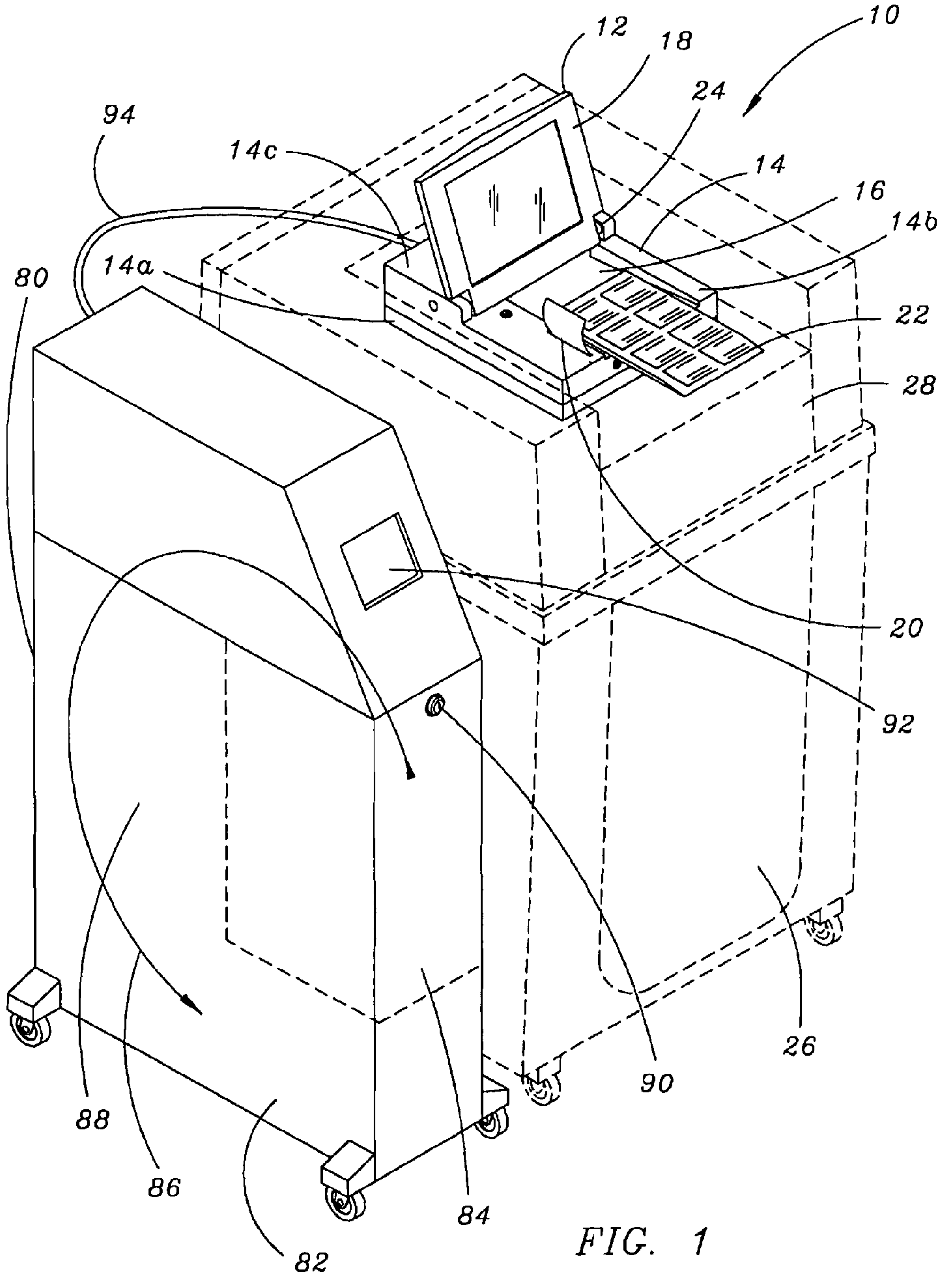
FIG. 1 is a perspective view of an exemplary embodiment of a voting system in accordance with the present invention.

Referring to FIG. 1, an exemplary embodiment of a voting system in accordance with the present invention is shown as reference numeral 10. Voting system 10 comprises a voting device 12 that generally includes a protective housing 14 with various internal components (as described in detail with reference to FIG. 2), a ballot insertion tray 16, a display 18 and a report printer 20. Each of these components will be described in detail below.

Protective housing 14 is preferably made of injection-molded plastic and has a modular "clamshell" design that provides easy access for maintenance and set up activities. Of course, other materials and designs are also within the scope of the present invention. Protective housing 14 preferably comprises three primary sections to assist in ease of manufacturing and maintenance: base section 14*a*, front cover section 14*b*, and rear cover section 14*c*. In addition, various access doors (not shown) may be included to provide access to a variety of switches, connections and interfaces. For example, in the exemplary embodiment, a locked access door is provided to secure access to a power switch, a "close polls" switch, and a modem with an RJ-11 connection and antenna (discussed further in connection with the main access board 66 of FIG. 2). Another locked access door is provided to secure access to various USB port interfaces for removable USB flash drives (discussed further in connection with the USB board 64 of FIG. 2).

The back of protective housing 14 preferably includes a variety of external ports (not shown), such as a USB hub 70 (FIG. 2) and other types of ports that are standard and well known in the art. The back of protective housing 14 also preferably includes a personalized electronic ballot (PEB) reader/writer (discussed further in connection with the PEB board 68 of FIG. 2). Of course, the external ports and PEB reader/writer may be located in other locations provided they do not interfere with the use of the voting device 12.

The ballot insertion tray 16 is provided to receive a paper ballot for scanning and tabulation. The ballot insertion tray 16 is preferably molded into the front cover section 14*b* of protective housing 14 and is approximately 8.525 inches wide in order to accommodate an 8.5 inch wide standard-size ballot, such as ballot 22 shown in FIG. 1. The ballot insertion tray 16 can, however, be designed to fit any size ballot. An additional tray insert (not shown) having reversible paper guides may be mounted into the ballot insertion tray 16. For example, when the paper guides are oriented down, the ballot insertion tray 16 may accommodate an 8.5 inch wide ballot. When the paper guides are oriented up, a 4.25 inch wide ballot may be supported. An arrow graphic is also preferably molded onto the ballot insertion tray 16 or additional tray insert to indicate the proper insertion of the ballot. Lastly, the ballot insertion tray 16 preferably has a ribbed texture to assist with reducing static buildup.

The display 18 is preferably an LCD touch screen display with a landscape orientation. The display 18 may be a standard, off-the-shelf component which is readily available and well known in the art. For example, the display 18 may be a standard size of 10.4 inches or 12.1 inches, measured diagonally, and approximately 82×82 dpi. Most preferably, the display 18 is an LG Philips 12.1" SVGA (800×600) TFT color display model LB121S03-TL01, which has a color depth of LVDS 6-bit, 262,144 colors and an anti-glare surface treatment. Of course, other types of touch screen displays may also be utilized in accordance with the present invention.

The display 18 is connected to the upper portion of voting device 12 by two hinges 24—one located on each side of the display 18—which enable the display 18 to open up during use or fold down flat during storage. For security and protection, the display 18 preferably incorporates a locking mechanism. The voting device 12 may include an LCD switch 72 (FIG. 2) that will sense that the display 18 is open to thereby power up without necessitating a poll worker physically turning on the display 18. Similarly, the LCD switch 72 will sense that the display 18 is closed to thereby power down after a specified period of time.

Alternatively, if the display 18 is not configured as a touch screen display, the voting device 12 would also include another type of input device, such as a keyboard, a joystick, a pointing device, a trackball or a touch pad. The display 18 may also comprise a cathode ray tube (CRT) display configured as a touch screen display located external to the voting device 12. In such a configuration, the display would be connected to the voting device 12 through a dedicated I/O connector of the voting device 12. Of course, other types of displays and input devices are also possible and within the scope of the present invention.

As will be described in greater detail below, the display 18 provides an improved voter interface that may be used to display information associated with a scanned paper ballot to the voter (e.g., information on ballot irregularities) and receive voter feedback. The display 18 may also be used to present an electronic ballot to the voter, whereby the voter may vote by touching the appropriate locations on the display 18 with either a finger or a computer pen (not shown).

The report printer 20 is an internal printer for device level and polling place level reporting, including the printing of reports at poll opening and poll closing (as are known in the art). The report printer 20 is a standard printer that is readily available and well known to those skilled in the art. The report printer 20 is capable of printing on paper that is approximately 3 inches wide and is of the drop-in roll paper type. As shown in FIG. 1, the paper passes through an aperture in the protective housing 14 such that it is easily accessible by users.

As shown in FIG. 1, voting device 12 mounts onto the top of a ballot receptacle 26. The base of voting device 12 includes four mounting feet (not shown) that provide airflow under the unit and allow it to be securely inserted into a recessed area of the ballot receptacle 26. In this embodiment, voting device 12 slides onto mounting rails (not shown) located on top of the ballot receptacle 26. A hinged door (not shown) may be located on the front of the ballot receptacle 26 and may be raised up and locked into place to further secure the voting device 12. The ballot receptacle 26 is preferably made of steel or a durable plastic material for security purposes. In operation, scanned and tabulated ballots are deposited directly into the ballot receptacle 26. In addition, the ballot receptacle 26 preferably includes a compartment 28 that poll workers can use to temporarily store uncounted ballots in the event of a power failure, scanner error, or the like. Of course, the ballot receptacle 26 may have other configurations as are well known to those skilled in the art.

Figure 2:
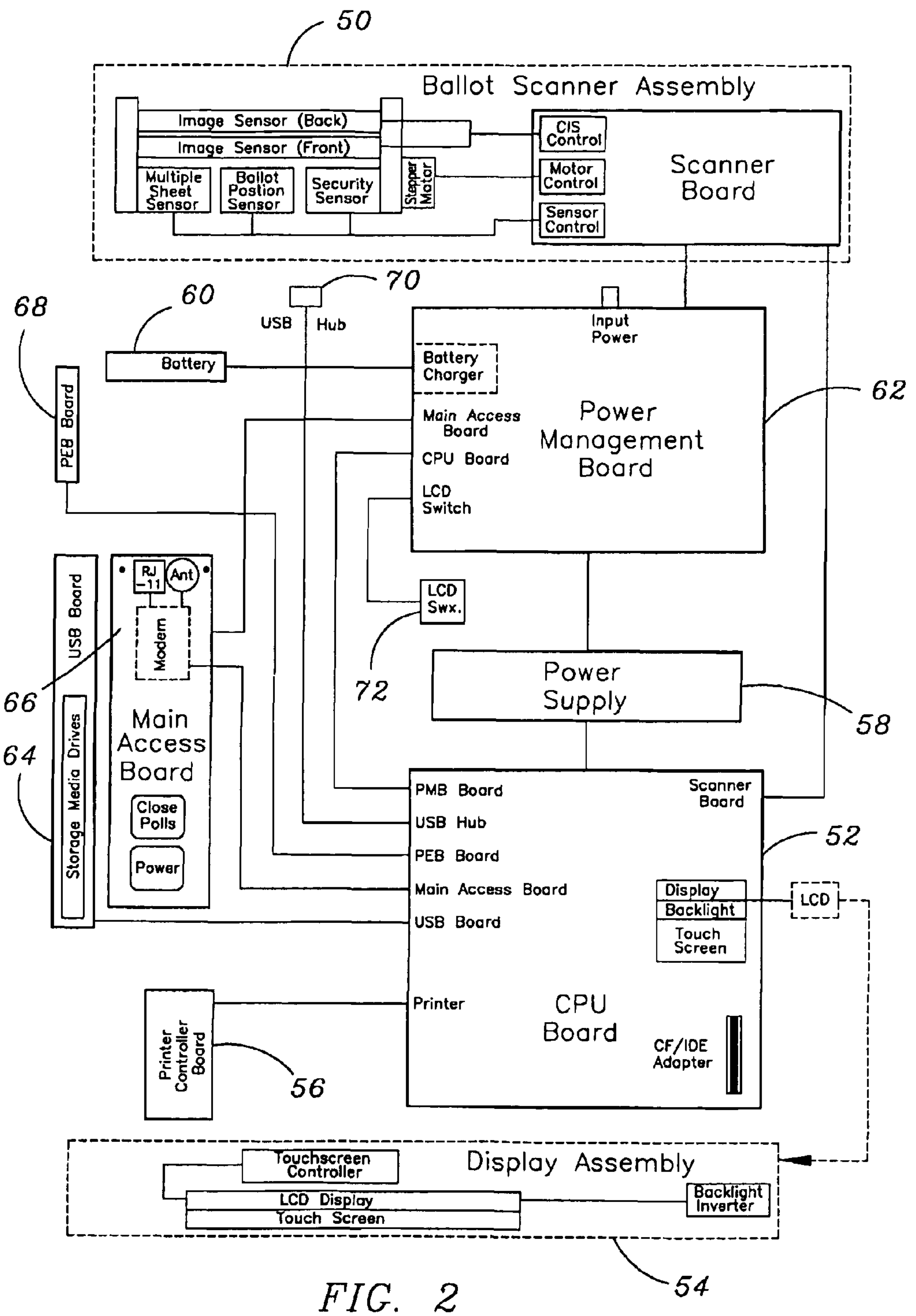
FIG. 2 is a block diagram of the various internal components of the voting device of FIG. 1.

Turning to FIG. 2, the internal components of voting device 12 are shown in a block diagram format and generally include: a ballot scanner assembly 50, a CPU board 52, a display assembly 54, a printer controller board 56, an internal power supply 58, an internal battery pack 60, a power management board 62, a USB board 64, a main access board 66, a PEB board 68, a USB hub 70, and an LCD switch 72 (discussed above). It should be understood that the various components and subsystems are connected to each other as shown in FIG. 2.

The ballot scanner assembly 50 includes a scanner board that provides the image capture, processing and transport control functions associated with scanning a paper ballot. The ballot scanner assembly 50 utilizes a set of sensors to monitor each paper ballot as it is placed in the ballot insertion tray 16 of voting device 12 and travels through the ballot transport mechanism (not shown). These sensors detect the position of the ballot, check for multiple ballots and confirm the release of the ballot into the ballot receptacle 26. As described in more detail below with respect to a second exemplary embodiment, there may also be included a security sensor that detects one or more security features on the ballot to detect counterfeit ballots and/or ballots that may have been tampered with.

The ballot scanner assembly 50 utilizes two contact image sensors to produce a bitmap image of the paper ballot (preferably at 200 dpi or greater). One contact image sensor is positioned to read the top surface of the ballot and the other contact image sensor is positioned to read the bottom surface of the ballot. The imaging of the top and bottom surfaces of the ballot preferably occurs simultaneously. The paper ballot is pulled across the contact image sensors to capture the ballot image. In this embodiment, the ballot scanner assembly 50 utilizes image capture technology available from Ricoh Electronics, Inc. The ballot image captured by the ballot scanner assembly 50 is passed to the CPU board 52, which decodes and tabulates the voting selections marked on the scanned ballot (described further below).

The CPU board 52 is a commercial off-the-shelf board that generally controls the operation of voting device 12 for all three modes of operation: the paper ballot mode, the electronic ballot mode and the audio ballot mode (described in greater detail below). The CPU board 52 is preferably capable of executing at least two independent processes concurrently so that either the paper ballot mode or the electronic ballot mode may be executed concurrently with the audio ballot mode. Accordingly, it is preferable to use an operating system that includes multi-tasking functionality, such as Linux and other operating systems known in the art. In this embodiment, the CPU board 52 is a VIA Embedded Platform EPIA-CL with a VIA C3™ or VIA Eden™ ESP processor. The CPU board 52 may include any type of memory that is suitable for storing information necessary for the operation of voting device 12, as is well known in the art.

Many of the other internal components of voting device 12 are also well known in the art. For example, the display assembly 54 includes an LCD display touch screen, a backlight inverter and a touch screen controller that provides an interface to display 18. The printer controller board 56 provides an interface to the report printer 20. In addition, the USB hub 70 provides a plurality of external USB ports that provide a connection for a variety of external devices, including an audit log printer assembly 80 (described below in connection with FIG. 1) and a voting console 104 with associated ballot printer/reader assembly 108 (described below in connection with FIGS. 3 and 4).

The USB board 64 includes a plurality of external USB port interfaces that accommodate removable USB flash drives or any other type of removable data storage system. The removable USB flash drives may be used to store the election definition and the accumulated vote totals for voting device 12. Also, the removable USB flash drives may be used to store the images of the scanned ballots, which may be accessed at a later time for audit purposes (applicable in the paper ballot mode of operation, described below). The removable USB flash drives may further be used to store a back-up copy of an electronic audit log, which may be removed after the election for transport to election headquarters (applicable in the electronic ballot mode of operation, described below).

The PEB board 68 provides an interface to a PEB reader/writer for reading information from and writing information to various PEBs, such as a master PEB, a supervisor PEB and/or a voter PEB (applicable in the electronic ballot mode of operation, described below). The configuration of the PEB reader/writer is described in greater detail in U.S. Pat. No. 5,583,329 assigned to the assignee of the present application, which is incorporated herein by reference in its entirety.

The main access board 66 includes a power switch and a "close polls" switch. The main access board 66 also includes a modem with an RJ-11 connector and antenna, which provide both landline and wireless modem options for transmitting vote results to a central vote accumulation site.

The voting device 12 is powered by a power management subsystem that includes the power management board 62, an internal battery pack 60, and an internal ITX power supply 58. The power management board 62 is a custom power supply board which receives its input from an external brick power supply that operates on standard AC-volt lines. The internal battery pack 60 (preferably a re-chargeable Lithium-Ion type) provides up to two hours of operation during a loss of AC power. The internal ITX power supply 58 provides power to the CPU board 52, as is known in the art. The power management board 62 monitors the status of and charges the internal battery pack 60, and automatically switches from the external brick power supply to the internal battery pack 60 as needed.

Referring back to FIG. 1, voting system 10 includes an audit log printer assembly 80 located external to voting device 12 that is operable to print an audit log of the voter actions and/or poll worker actions taken at the voting device 12 during the electronic ballot mode of operation (described below). In the exemplary embodiment, the audit log printer assembly 80 includes a printer (not shown) that is operable to print the voter actions and/or poll worker actions on a printable medium, such as a continuous paper roll or folded sheets of paper stock, to create the audit log. Preferably, the audit log is printed in real-time as the voter actions and/or poll worker actions are taken at the voting device 12.

The printable medium is secured within a locked housing 82 such that the printable medium is inaccessible to a voter using the voting system 10. Specifically, the printable medium is stored within a supply compartment 84 prior to printing and, during printing, the audit log is transported along a paper transport path 86 to a storage bin 88. Of course, poll workers would have access to locked housing 82 via a lock 90 in order to load the printable medium, unload the audit log, clear any paper jams, etc. Preferably, locked housing 82 includes a display window 92 that enables a voter to review a portion of the audit log associated with the voter in order to verify the correctness of the voter actions printed on the printable medium. A magnifier may optionally be provided to assist the voter in reviewing the audit log. As such, the printed audit log may be used for both auditing purposes and voter verification.

The audit log printer assembly 80 is connected to the voting device 12 via a USB cable 94 (which connects to one of the USB ports of USB hub 70). While audit log printer assembly 80 is located external to voting device 12 in the exemplary embodiment, it should be understood that audit log printer assembly 80 could also be included as part of voting device 12 or mounted in another location. Of course, one skilled in the art will appreciate that other configurations for audit log printer assembly 80 are within the scope of the present invention.

Figure 3:
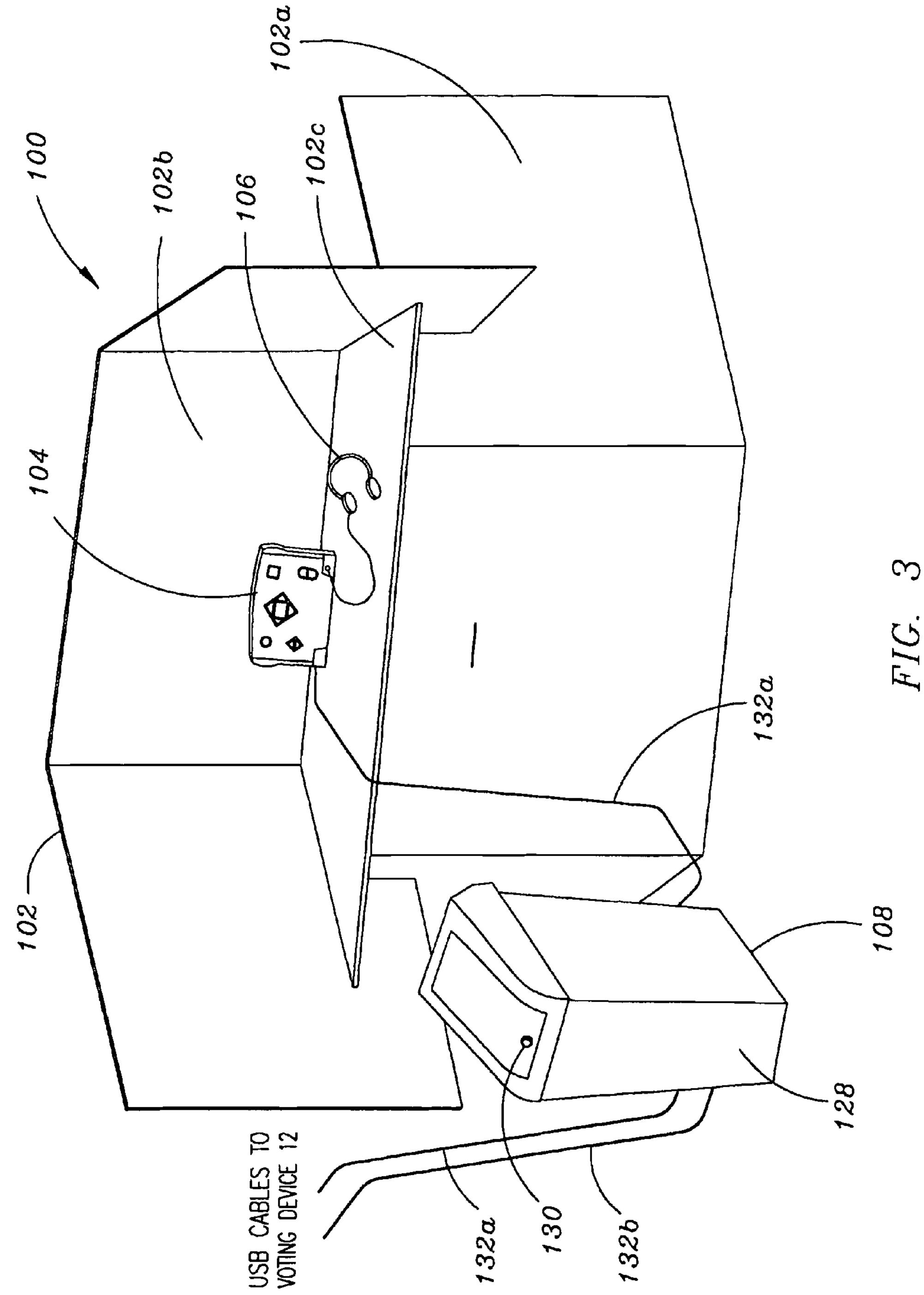
FIG. 3 is a perspective view of an exemplary embodiment of an accessible voting station used in connection with the voting system of FIG. 1.
Figure 4:
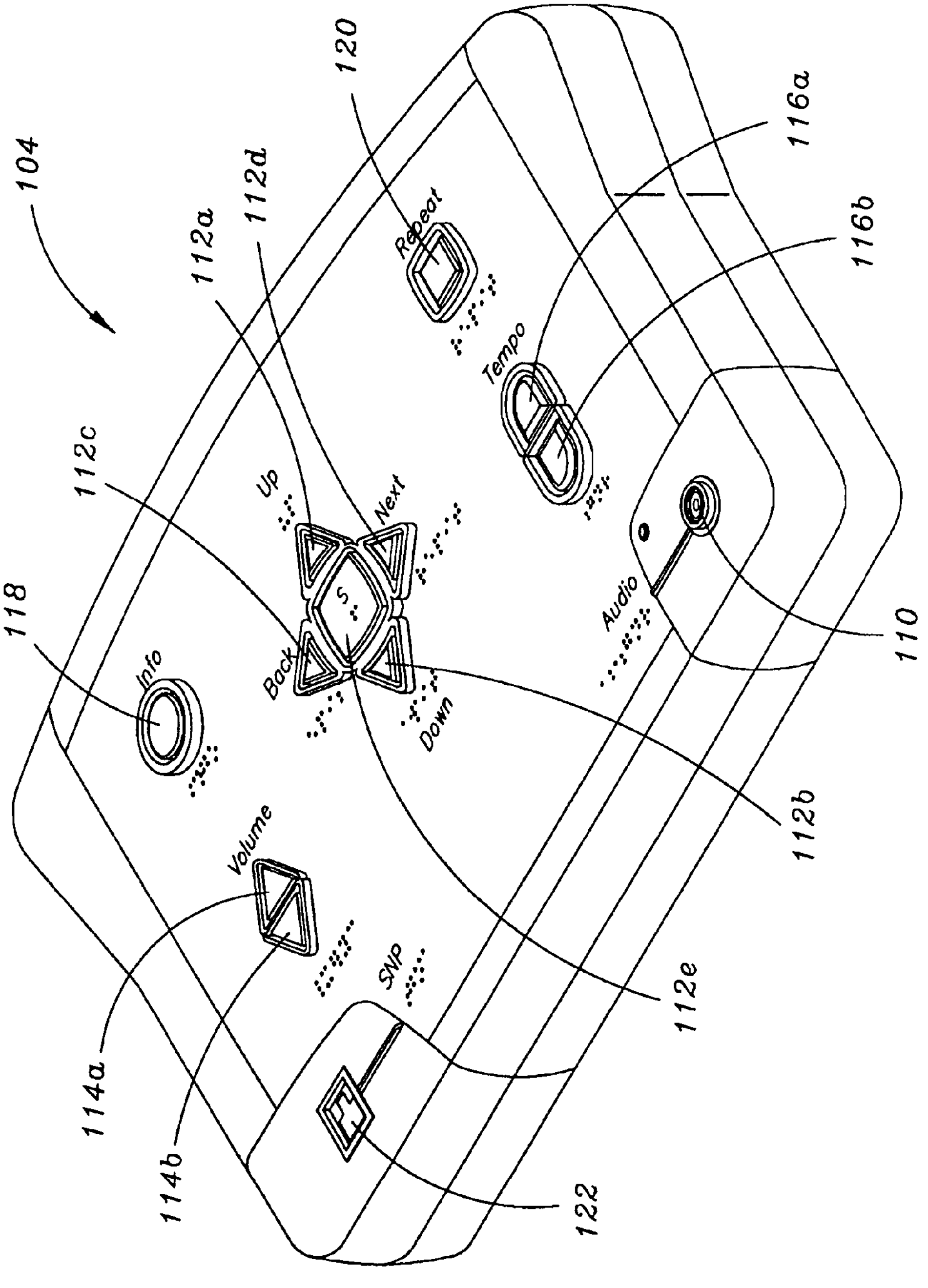
FIG. 4 is a perspective view of the voting console of FIG. 3.

Referring to FIGS. 3 and 4, voting system 10 further includes an accessible voting station 100 that allows voters with disabilities to vote independently when the voting device 12 is operating in the audio ballot mode (described below). The accessible voting station 100 generally includes a privacy screen 102, a voting console 104 with associated headphones 106, and a ballot printer/reader assembly 108. Preferably, the accessible voting station 100 complies with the requirements of the Americans with Disabilities Act (ADA), and the 2002 and 2005 voluntary voting system guidelines (VVSG).

The privacy screen 102 includes a lower wall section 102*a* that interlocks with an upper wall section 102*b* to form a standing voting booth. A tabletop section 102*c* slides into and is supported by the lower and upper wall sections 102*a* and 102*b*, thereby forming a shelf surface to support the voting console 104. The lower wall section 102*a*, upper wall section 102*b* and tabletop section 102*c* are preferably formed of plastic, corrugated plastic or any other suitable material. It can be appreciated that the privacy screen 102 may be easily assembled and disassembled by a poll worker and may be folded into a relatively flat configuration for transport and/or storage.

An exemplary embodiment of the voting console 104 is shown in FIG. 4. The voting console 104 includes an audio connection 110 for headphones 106. As will be described in greater detail below, a voter may use the voting console 104 and headphones 106 to navigate through an audio representation of the ballot. Specifically, the voter navigates through the audio ballot using the "up" 112*a*, "down" 112*b*, "back" 112*c* and "next" 112*d* buttons on the voting console 104 and selects his/her votes using the center "select" button 112*e*. The voter also has the ability to control the audio volume through the use of the "volume" up and down buttons 114*a*, 114*b* and the rate of speech through the use of the "tempo" up and down buttons 116*a*, 116*b*. The voting console 104 also has an "information" button 118 that provides instructions at any time during the voting session. A voter may also press a "repeat" button 120 to have the instructions or audio ballot presentation repeated. It can be appreciated that voters who are blind or vision-impaired would use the Braille markings on the voting console 104 to select the appropriate button. Finally, a connection port 122 is provided to accommodate other types of input devices, such as a sip and puff straw, large paddles, and any one of numerous other accessible devices that are known in the art. The connected input device would act as a mouse-type controller to operate the buttons on the voting console 104.

Referring back to FIG. 3, the ballot printer/reader assembly 108 includes a printer (not shown) operable to print a ballot that identifies the voting selections entered by the voter using the voting console 104. Preferably, the printed ballot includes a description of each contest, the name of the selected candidate for each contest and an associated barcode for each contest. The printed ballot may also include information on any under voted contests. It should be understood that all of the information printed on the ballot is human-readable except for the barcodes, which are printed in a machine-readable format. Of course, other ballot configurations are also within the scope of the present invention. The ballot printer/reader assembly 108 also includes a barcode reader (not shown) operable to read the barcodes printed on the ballot. It can be appreciated that the barcode reader is preferably located in proximity to the ballot printer in order to effectively read the barcodes printed on the ballot.

The ballot printer and barcode reader are securely mounted within a locked ballot bin 128 to prevent voter access to the printed ballots collected therein. The ballot bin 128 is preferably made of steel or a durable plastic material for security purposes, although other materials would also be acceptable. Poll workers would have access to ballot bin 128 via a lock 130 in order to load paper stock, remove the printed ballots, clear any paper jams, etc. In this embodiment, the voter is not able to review the printed ballot collected within the ballot bin 128. Of course, one skilled in the art will appreciate that other configurations in which the voter is given the opportunity to review the printed ballot are also within the scope of the present invention.

Preferably, the processing resources needed for the operation of the voting console 104 and ballot printer/reader assembly 108 are provided by the CPU board 52 of the voting device 12. As such, the voting console 104 and ballot printer/reader assembly 108 are connected to the voting device 12 via USB cables 132*a* and 132*b*, respectively (which connect to two of the USB ports of USB hub 70). Of course, other system configurations are also within the scope of the present invention.

Operation of Voting System

An exemplary operation of the voting system 10 will now be described. First, a poll worker opens the poll by depressing the "power" switch located on the main access board 66 of voting device 12 and transferring the election definition data for a particular voting precinct to the voting device 12. The transfer of the election definition data may be effectuated by a variety of different means. For example, a removable USB flash drive may be inserted into one of the USB ports of USB board 64. Alternatively, a master PEB may be inserted into the PEB reader/writer of PEB board 68. Of course, other means are also within the scope of the present invention.

Figure 10A:
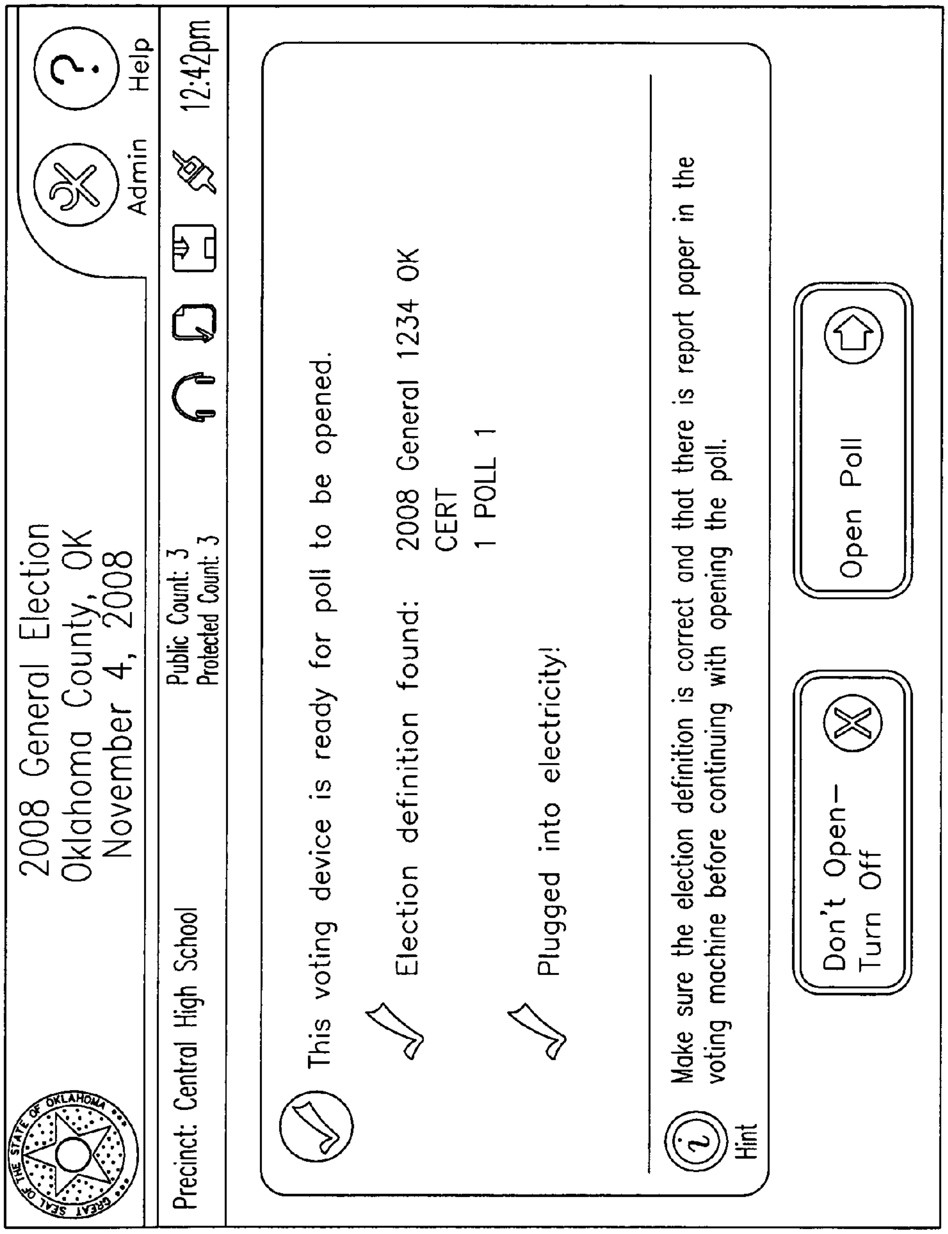
FIGS. 10A-10D are various screen shots of the display of the voting device of FIG. 1 when opening and closing a poll.

Next, voting device 12 displays a "voting device ready" screen on display 18 as shown in FIG. 10A. The "voting device ready" screen includes a message indicating that the voting device is ready for the poll to be opened (e.g., "This voting device is ready for poll to be opened. Election definition found. Plugged into electricity!"). It can be seen that the "voting device ready" screen also includes a hint (e.g., "Make sure the election definition is correct and that there is report paper in the voting machine before continuing with opening the poll."). Finally, it can be seen that the "voting device ready" screen includes two selection buttons—"Don't Open-Turn Off" and "Open Poll." If the poll worker selects the "Don't Open—Turn Off" button, voting device 12 will power down. However, if the poll worker selects the "Open Poll" button, the poll will be open and, depending on the options set for the election definition, the voting device 12 may automatically print a variety of reports as are known in the art.

Figure 10B:
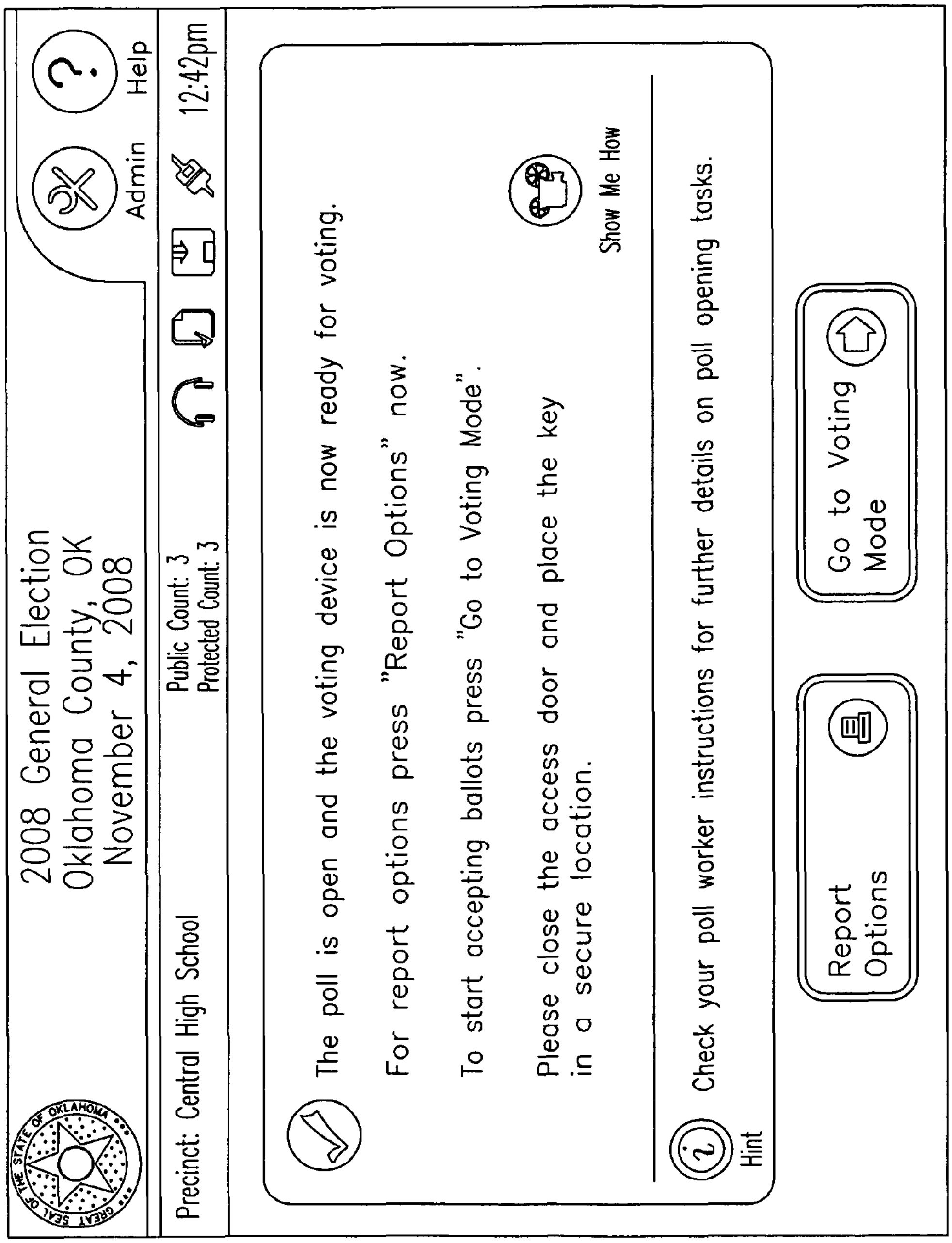

Next, voting device 12 displays a "poll open" screen on display 18 as shown in FIG. 10B. The "poll open" screen includes a message indicating that the poll is open and the voting device is ready for voting (e.g., "The poll is open and the voting device is now ready for voting. For report options press 'Report Options' now. To start accepting ballots press 'Go to Voting Mode.' Please close the access door and place the key in a secure location."). It can be seen that the "poll open" screen also includes a hint (e.g., "Check your poll worker instructions for further details on poll opening tasks."). Finally, it can be seen that the "poll open" screen includes two selection buttons—"Report Options" and "Go to Voting Mode." If the poll worker selects the "Report Options" button, a variety of different report options will be displayed. However, if the poll worker selects the "Go to Voting Mode" button, the voting device 12 will be ready for voting.

The voting device 12 is preferably capable of executing three different modes: paper ballot mode, electronic ballot mode and audio ballot mode (each of which will be described in greater detail below). A voter may choose one of these different voting options depending on voter preference. While some voters may choose to vote by marking a paper ballot, other voters may choose to vote via an electronic ballot. In addition, other voters (e.g., blind or vision-impaired voters) may choose to vote via an audio ballot. In the exemplary embodiment, the voting device 12 may operate in either the paper ballot mode or the electronic ballot mode (but not both modes concurrently). However, the audio ballot mode is executed separate and apart from the paper ballot mode and the electronic ballot mode. Therefore, at any given time, the audio ballot mode may be executed concurrently with either the paper ballot mode or the electronic ballot mode.

In order to determine if the voting device 12 is operating in the paper ballot mode or the electronic ballot mode, the voting device 12 may be programmed to detect one or more user inputs. For example, the electronic ballot mode may be activated by (i) inserting a USB device into a USB port of USB hub 70, (ii) inserting a PEB into a PEB reader/writer of PEB board 68 (described below), (iii) placing a control sheet with specific machine-readable control codes in the ballot insertion tray 16 of voting device 12, or (iv) entering a command into the touch screen display 18 of voting device 12. The paper ballot mode may be activated by (i) placing the paper ballot in the ballot insertion tray 16 of voting device 12 or (ii) entering a command into the touch screen display 18 of voting device 12. Of course, the voting device 12 may be programmed to default to either the paper ballot mode or the electronic ballot mode as desired. One skilled in the art will appreciate that the above methods for determining the mode of operation are merely examples and may be employed separately or in combination in accordance with the present invention.

Figure 10C:
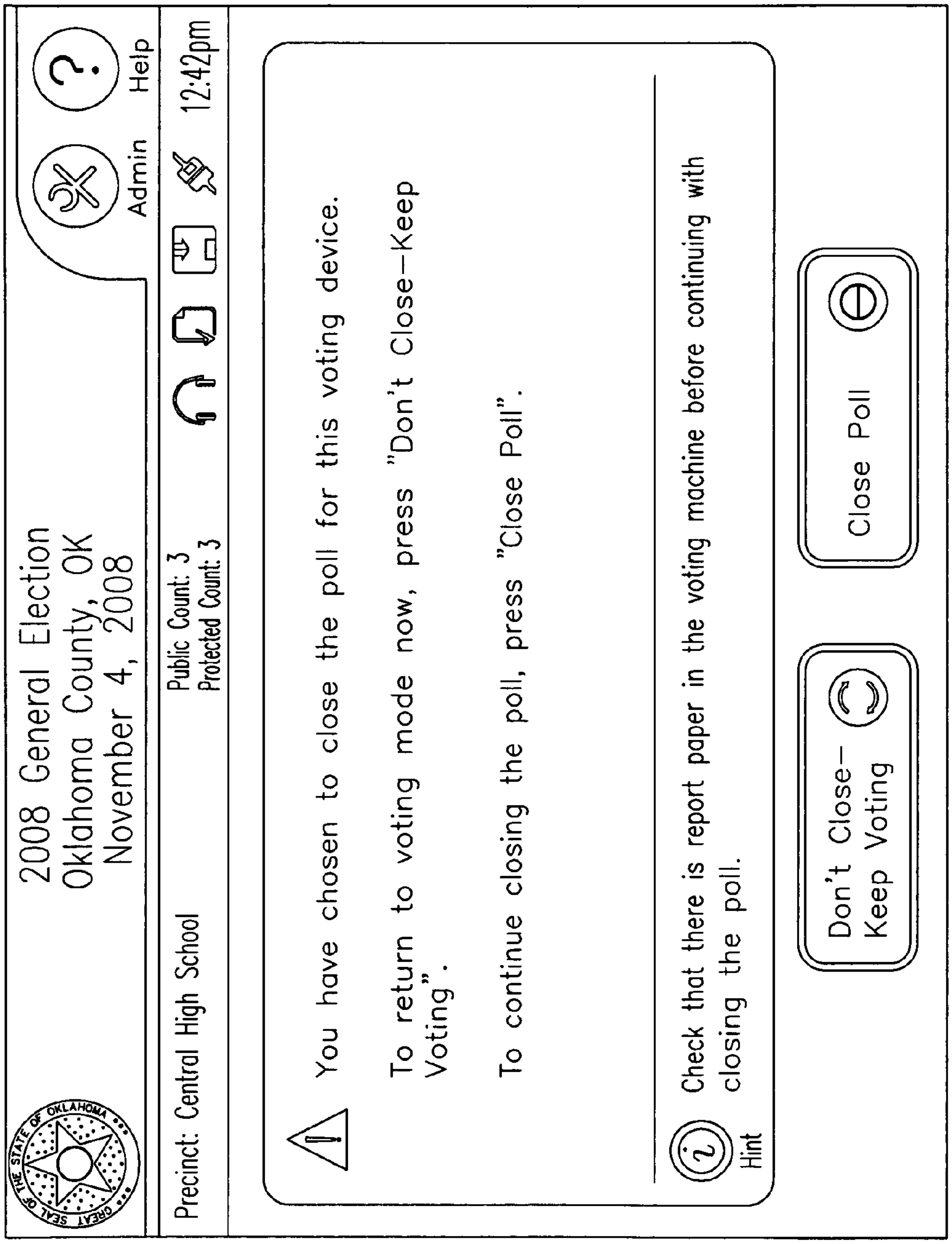

At poll closing, the poll worker depresses the "close polls" switch located on the main access board 66 of voting device 12. In response, voting device 12 displays an interim "close poll" screen on display 18 as shown in FIG. 10C. The interim "close poll" screen includes a message indicating that the poll is about to be closed (e.g., "You have chosen to close the poll for this voting device. To return to voting mode now, press 'Don't Close—Keep Voting.' To continue closing the poll, press 'Close Poll.'"). It can be seen that the interim "close poll" screen also includes a hint (e.g., "Check that there is report paper in the voting machine before continuing with closing the poll."). Finally, it can be seen that the "close poll" screen includes two selection buttons—"Don't Close-Keep Voting" and "Close Poll." If the poll worker selects the "Don't Close—Keep Voting" button, voting device 12 will continue with voting. However, if the poll worker selects the "Close Poll" button, the poll will close and, depending on the options set for the election definition, the voting device 12 may automatically print a variety of reports as are known in the art.

Figure 10D:
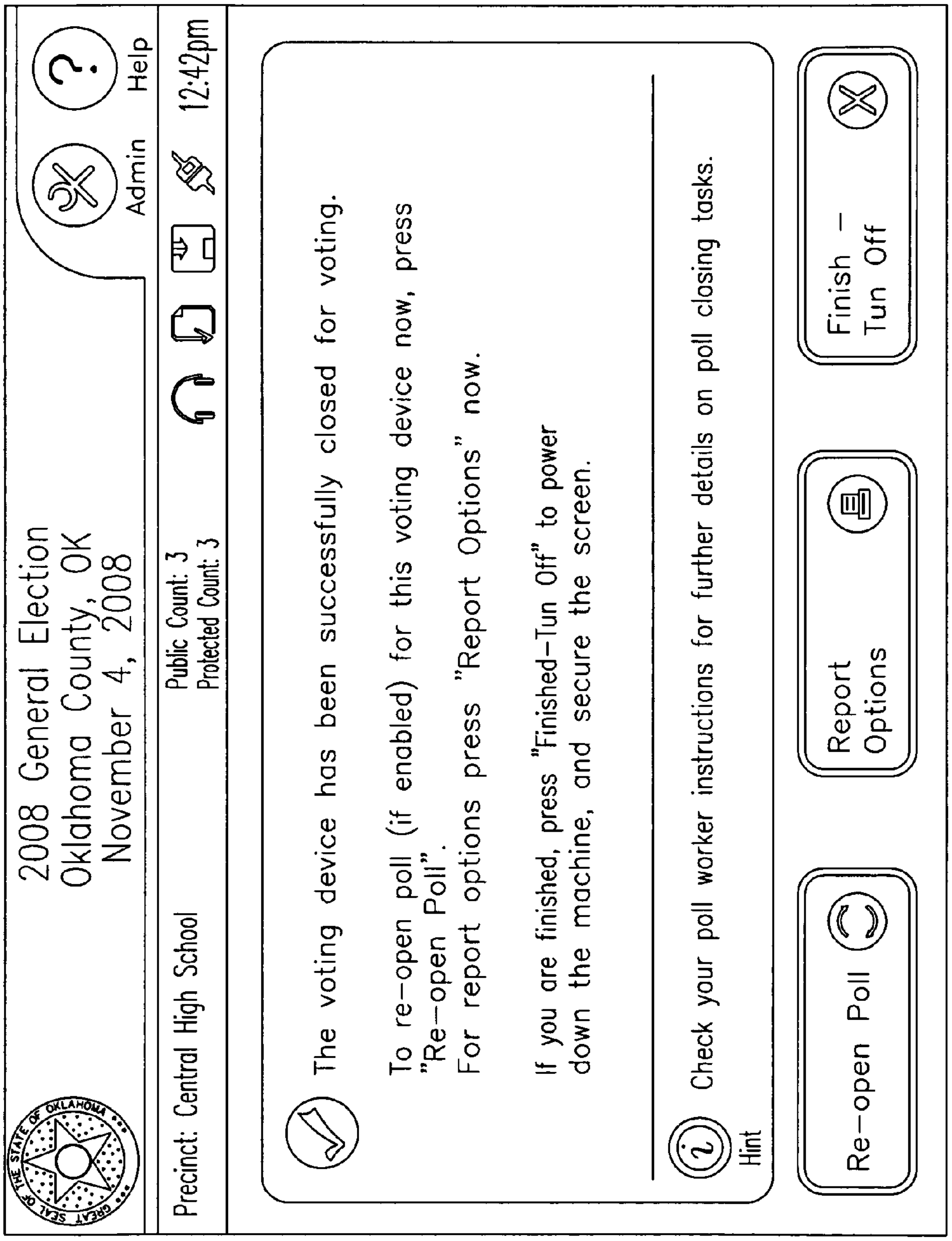

Finally, voting device 12 displays a final "poll closed" screen on display 18 as shown in FIG. 10D. The final "poll closed" screen includes a message indicating that the poll is closed for voting (e.g., "This voting device has been successfully closed for voting. To re-open poll (if enabled) for this voting device now, press 'Re-open Poll.' For report options, press 'Report Options' now. If you are finished, press 'Finished—Turn Off' to power down the machine, and secure the screen."). It can be seen that the final "poll closed" screen also includes a hint (e.g., "Check your poll worker instructions for further details on poll closing tasks."). Finally, it can be seen that the final "poll closed" screen includes three selection buttons—"Re-Open Poll," "Report Options" and "Finished—Turn Off." If the poll worker selects the "Re-Open Poll" button, the voting device 12 will go back to voting. If the poll worker selects the "Report Options" button, a variety of different report options will be displayed. However, if the poll worker selects the "Finished—Turn Off" button, the poll will be officially closed.

Of course, it can be appreciated that the accumulated vote totals for voting device 12 are transmitted to a central vote accumulation site via a landline or wireless modem, such as the modem of main access board 66. Alternatively, the accumulated vote totals for voting device 12 may be transported to the central vote accumulation site via a removable USB flash drive inserted into one of the USB ports of USB board 64.

An exemplary operation of voting device 12 in the paper ballot mode, the electronic ballot mode and the audio ballot mode will now be described in detail below. Again, it should be understood that the audio ballot mode may be executed concurrently with either the paper ballot mode or the electronic ballot mode in this exemplary embodiment.

Paper Ballot Mode

Figure 5A:
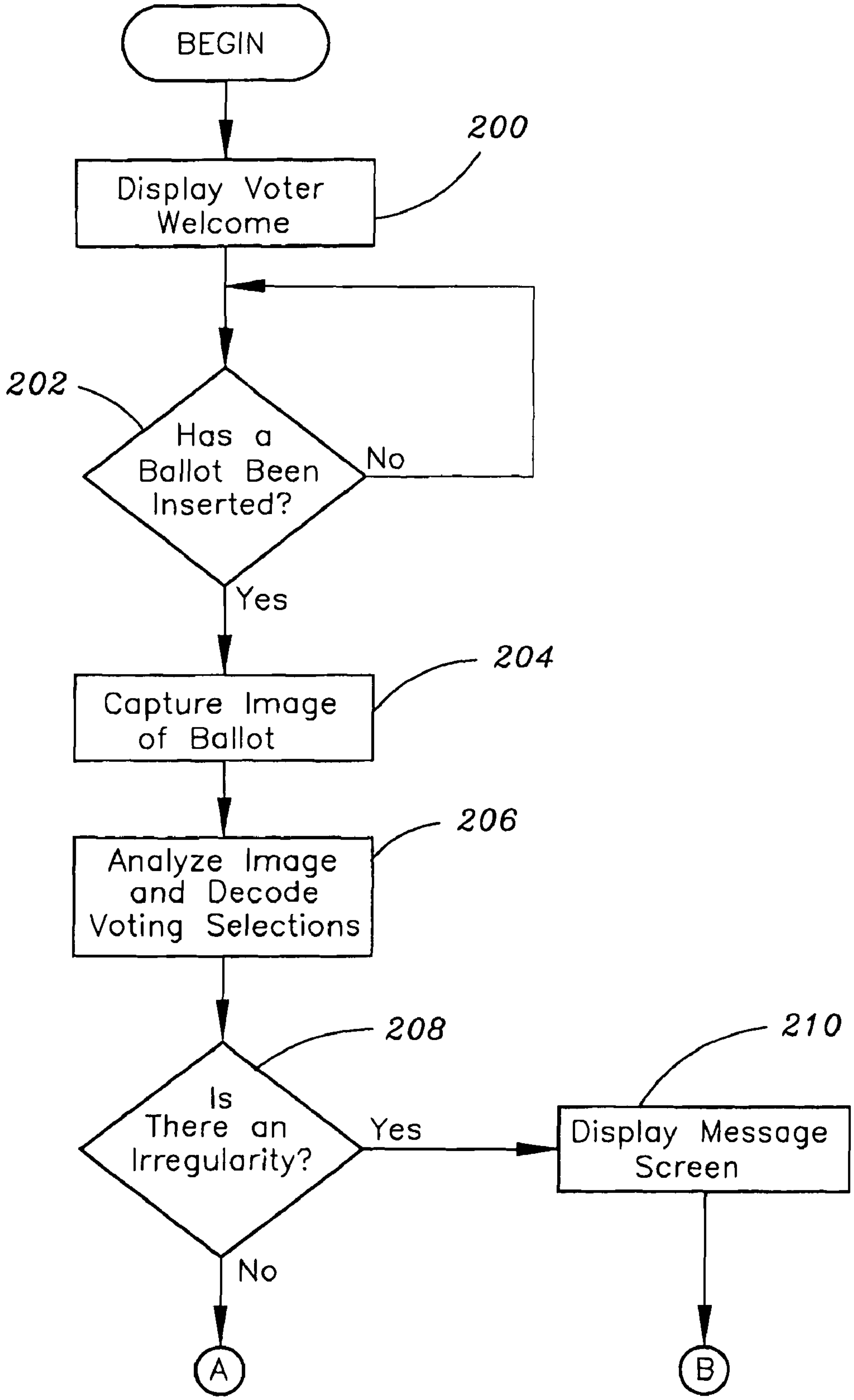
FIGS. 5A-5B are a process flow diagram of an exemplary operation of the voting system of FIG. 1 in the paper ballot mode.

An exemplary operation of the voting device 12 in the paper ballot mode will now be described with reference to blocks 200 to 222 of the process flow diagram shown in FIGS. 5A and 5B. At block 200, the voting device 12 displays a "welcome" screen on display 18 as shown in FIG. 6A. The "welcome" screen displays a message (e.g., "Welcome. Please insert your ballot.") and a graphical depiction of the voting device demonstrating the proper insertion of the ballot into the ballot insertion tray (wherein the demonstration may be either static or moving). The "welcome" screen also includes a horizontally scrollable list of available languages at the bottom of the screen. The list of languages can be customized to include the most frequently used languages for a particular precinct location. Furthermore, the "welcome" screen may be set up to offer the most frequently used languages on the display, wherein other languages are available by scrolling through the list using the scroll bar.

Figure 6A:
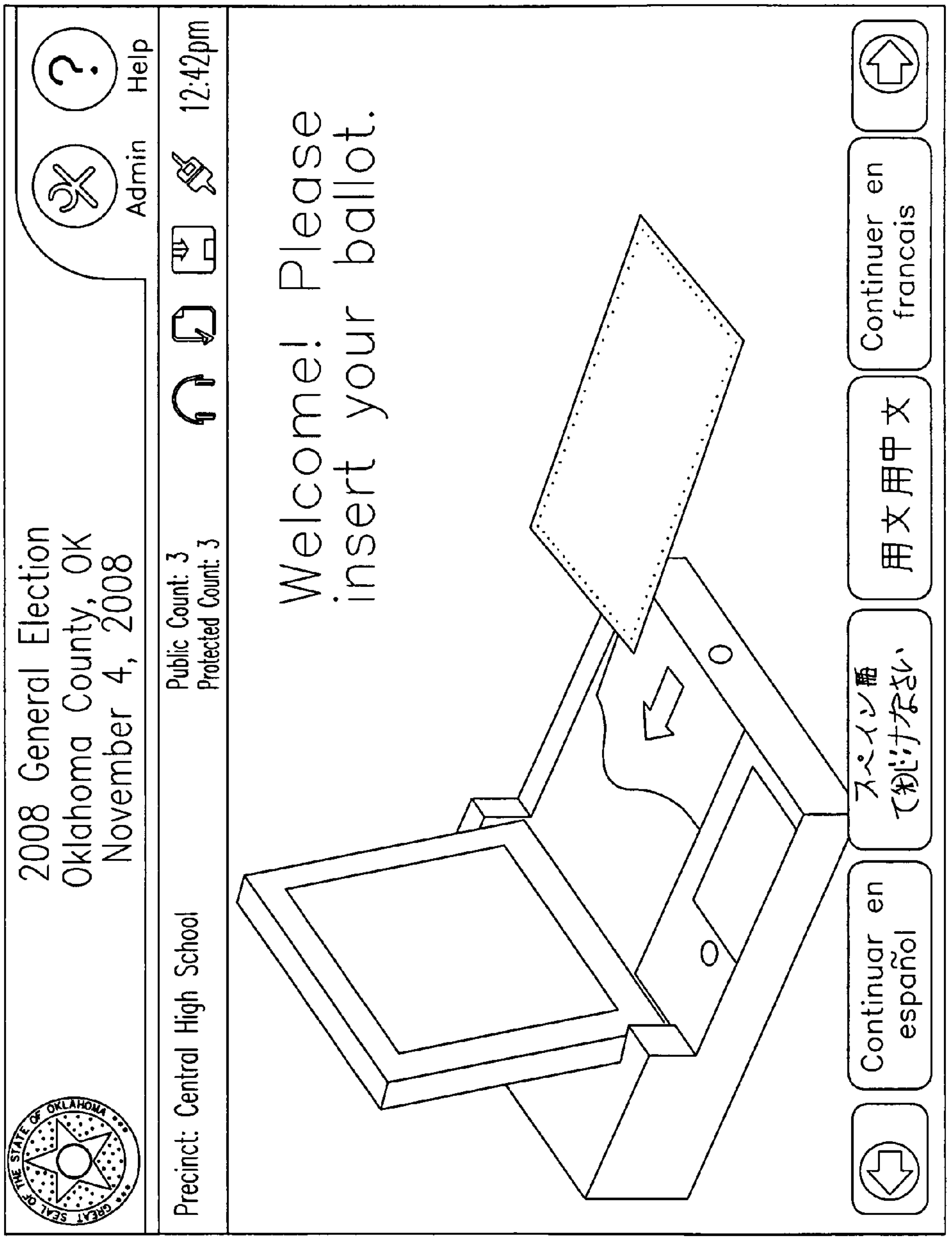
FIGS. 6A-6G are various screen shots of the display of the voting device of FIG. 1 when in the paper ballot mode.
Figure 6B:
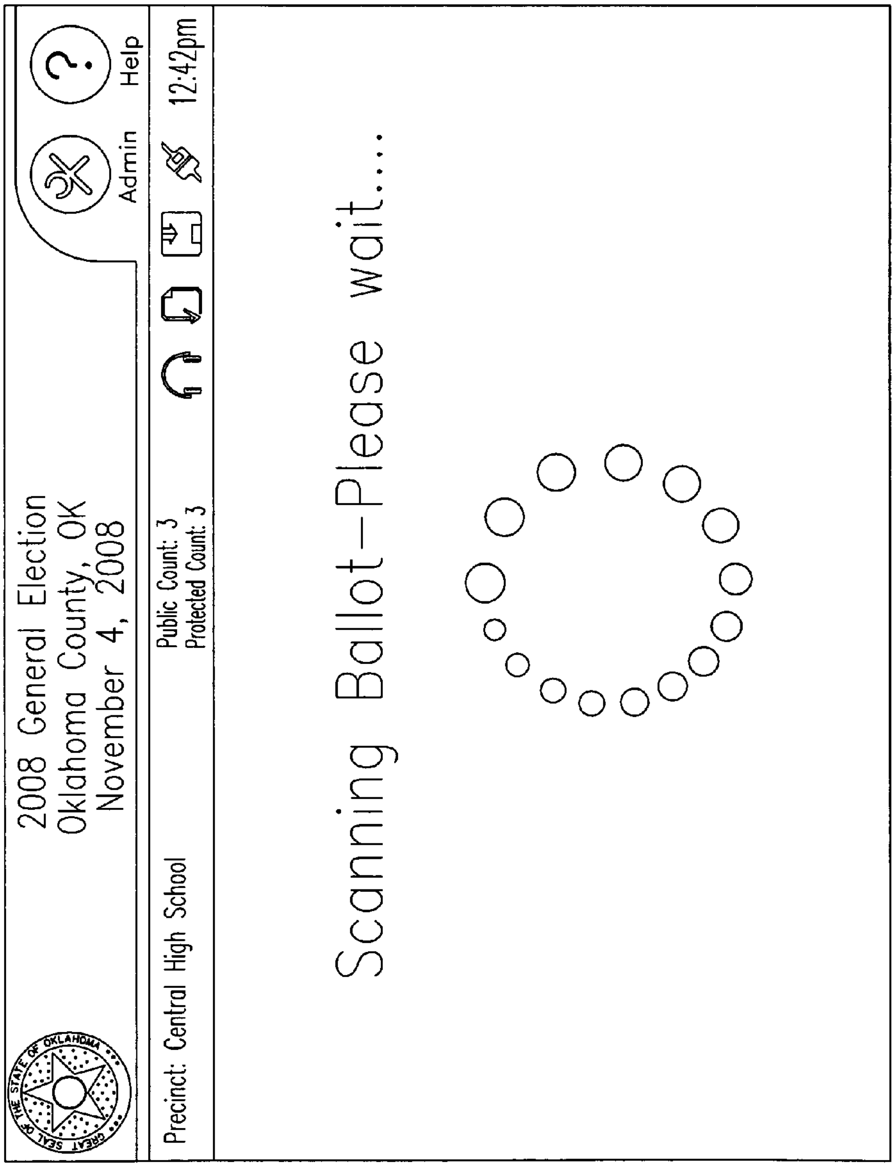

At block 202, the ballot position sensors continuously monitor whether a paper ballot has been inserted into the ballot insertion tray 16 and, upon detection of a ballot, the ballot is fed into the ballot scanner assembly 50. Upon receiving a paper ballot, the voting device 12 displays a "scanning ballot" screen on display 18 as shown in FIG. 6B, prompting the voter to wait until the voting selections marked on the ballot have been processed. Referring back to FIG. 5A, at block 204, the ballot scanner assembly 50 scans the paper ballot so as to capture an image of the ballot. For double-sided ballots, both sides of the paper ballot are preferably scanned simultaneously so as to capture an image of each side of the ballot. As discussed above, the removable USB flash drives of USB board 64 may be used to store the images of the scanned ballots, which may be accessed at a later time for audit purposes.

At block 206, the CPU board 52 analyzes the captured image of the ballot so as to decode the voting selections marked on the ballot. Preferably, the voting selections are decoded using intelligent mark recognition (IMR) technology as described in U.S. Pat. No. 6,854,644 assigned to the assignee of the present application, which is incorporated herein by reference in its entirety. The paper ballot may contain identification marks that allow the CPU board 52 to verify that the ballot is valid for a specific polling place, and, to select the proper ballot template (which is provided as part of the election definition loaded into the voting device 12 via the removable USB flash drive or PEB at poll opening) for decoding the voting selections marked on the ballot.

Figure 6C:
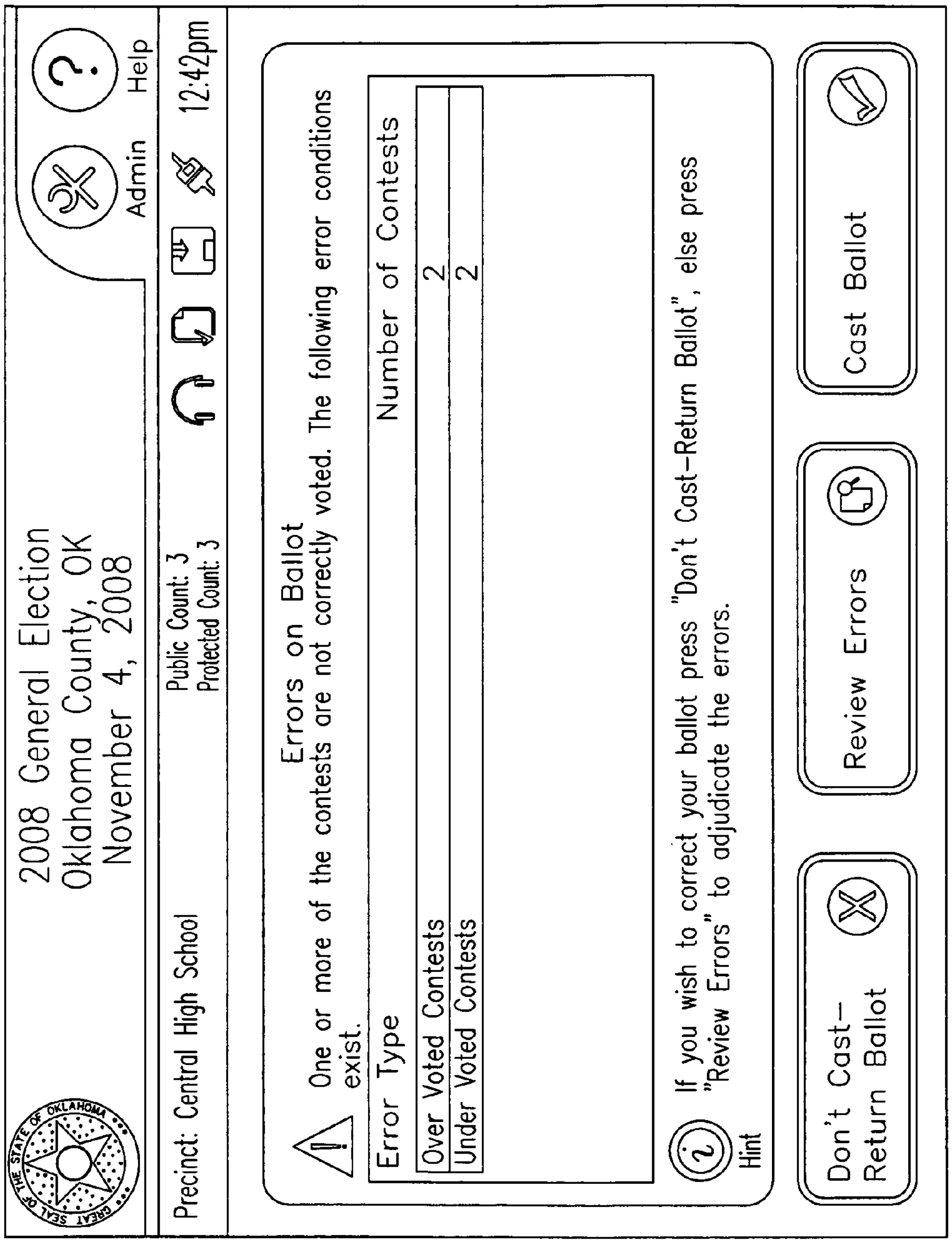

At block 208, the voting device 12 identifies any irregularities associated with the paper ballot, including scanning errors (e.g., read errors or unclear marks) and errors relating to the decoding of the voting selections marked on the ballot (e.g., over votes and under votes). At block 210, if one or more irregularities are detected, the voting device 12 displays a "ballot errors" screen on display 18 identifying the nature of the identified errors, as shown in FIG. 6C. The "ballot errors" screen provides clear feedback to the voter on the disposition of his/her paper ballot. The "ballot errors" screen displays a notification that one or more contests are not correctly voted (e.g., "One or more of the contests are not correctly voted. The following error conditions exist."), a list of encountered error types (e.g., "Over Voted Contests" and "Under Voted Contests"), and the number of contests affected with each listed error type. It can be seen that the "ballot errors" screen also includes instructions on how to proceed (e.g., "If you wish to correct your ballot press 'Don't Cast—Return Ballot', else press 'Review Errors' to adjudicate the errors."). Finally, it can be seen that the "ballot errors" screen includes three selection buttons—"Don't Cast—Return Ballot" (described below), "Review Errors," and "Cast Ballot" (described below).

Generally, by selecting one of the detected irregularities and then touching the "Review Errors" button, the voter is presented with a new screen listing the affected contests and describing the selected error type. Examples of the types of message screens that may be displayed on the display 18 of voting device 12 will now be described with reference to FIGS. 6D to 6F.

Figure 6D:
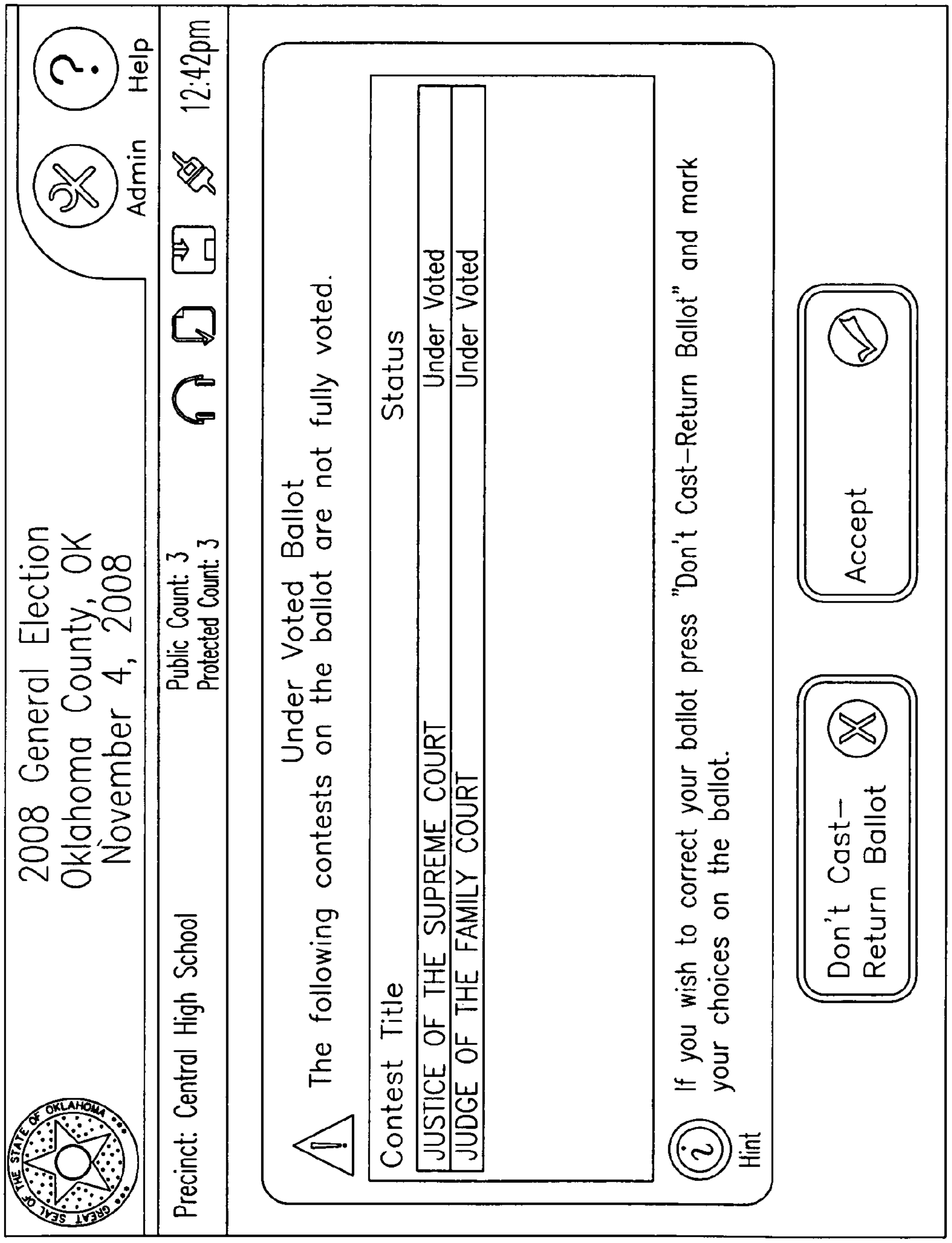

An exemplary "under-vote" screen listing the under voted contests is shown in FIG. 6D. The "under-vote" screen includes identifying information for each of the under-voted contests (e.g., the "Contest Title") and instructions for correcting the under-voted contests on the ballot (e.g., "If you wish to correct your ballot press 'Don't Cast—Return Ballot' and mark your choices on the ballot."). Finally, it can be seen that the "under-vote" screen includes two selection buttons—"Don't Cast—Return Ballot" (described below) and "Accept" (described below).

Figure 6E:
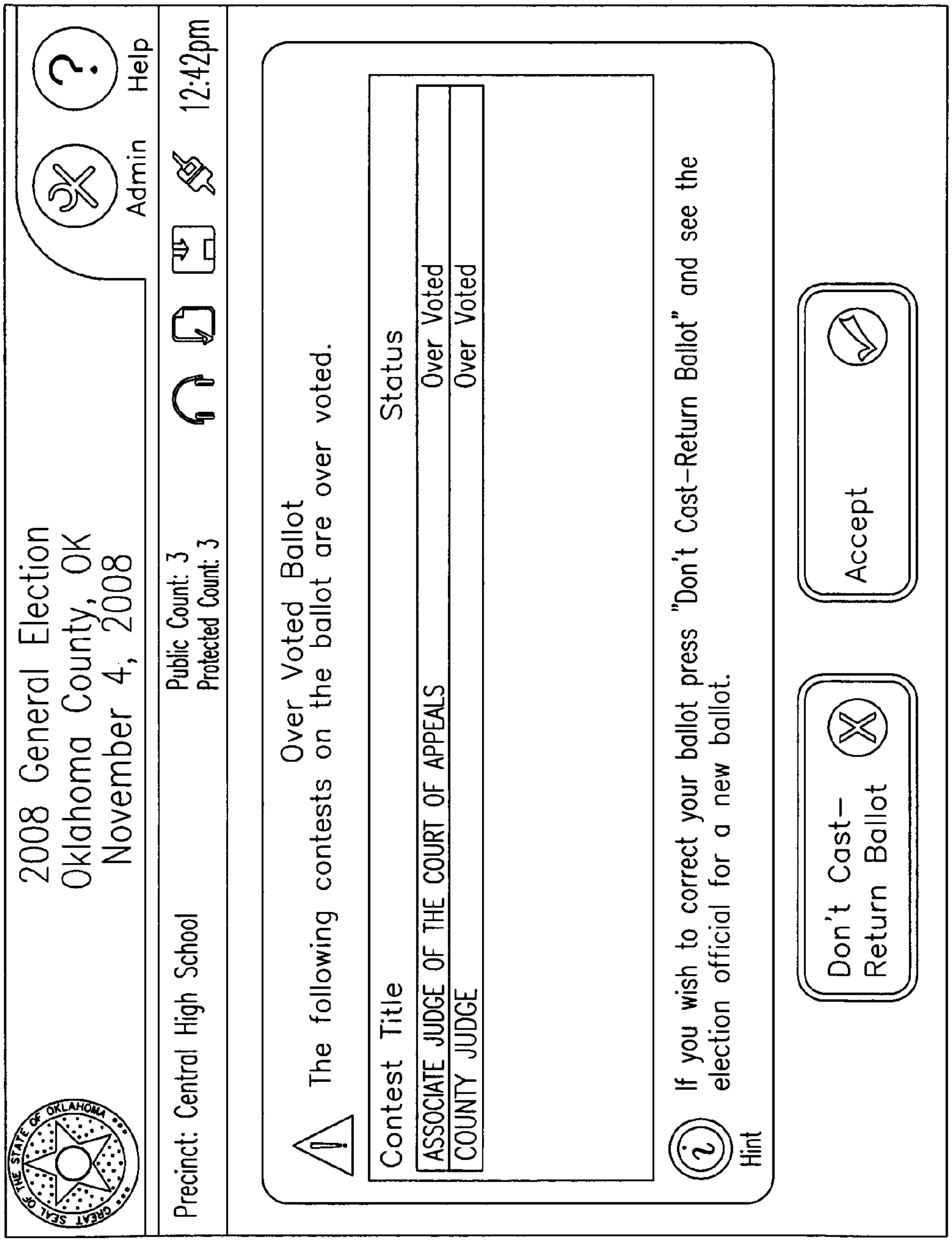

An exemplary "over-vote" screen listing the over-voted contests is depicted in FIG. 6E. The "over-vote" screen includes identifying information for each of the over-voted contests (e.g., "Contest Title") and instructions for correcting the over-voted contests on the ballot (e.g., "If you wish to correct your ballot press 'Don't Cast—Return Ballot' and see the election official for a new ballot."). Finally, it can be seen that the "over-vote" screen includes two selection buttons—"Don't Cast—Return Ballot" (described below) and "Accept" (described below).

Figure 6F:
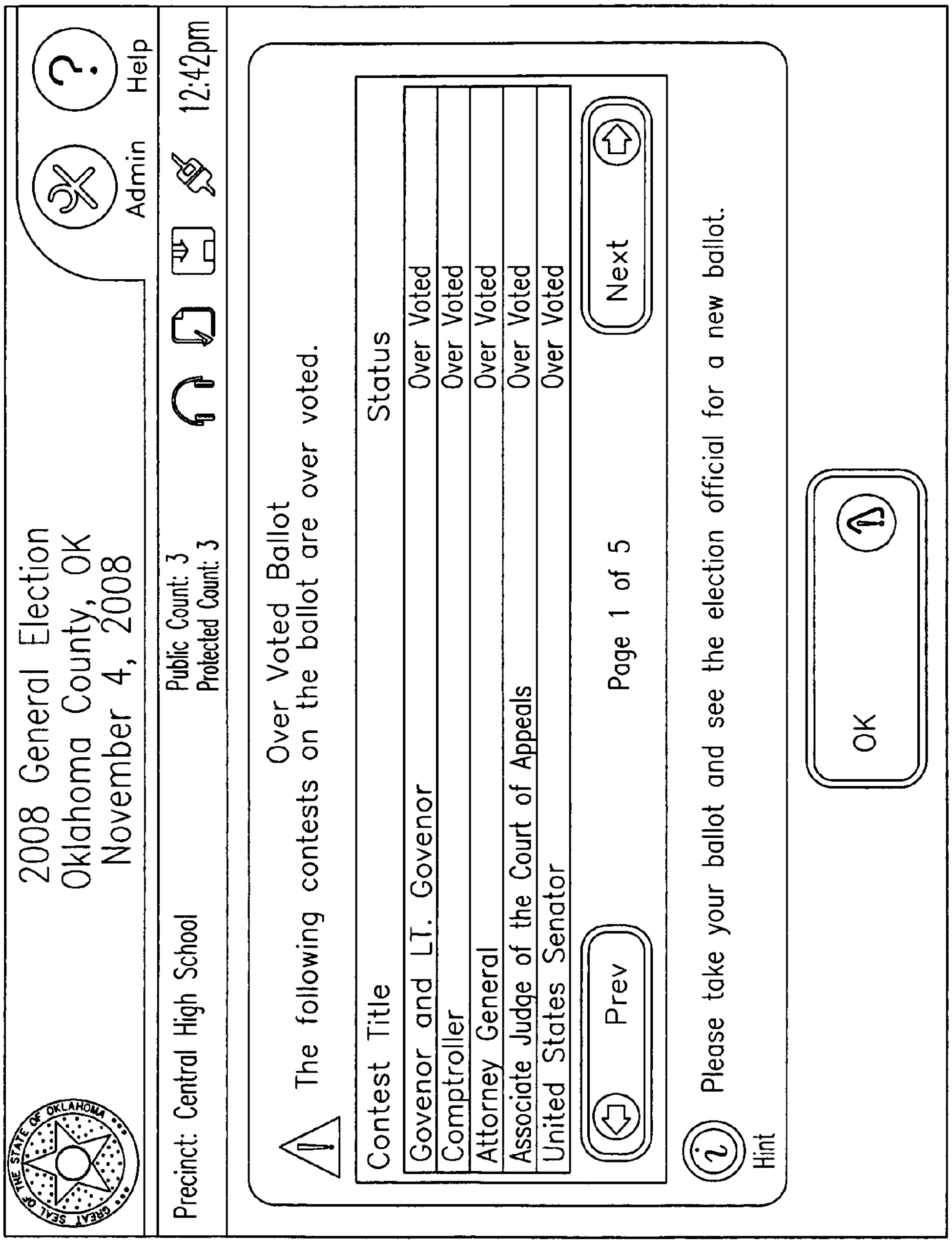

An example of an "over-vote" screen used in jurisdictions that prohibit casting over-voted ballots is depicted in FIG. 6F. It can be seen that the "over-vote" screen does not allow casting the ballot, providing only one button—"OK"—for returning the ballot to the voter. The screen shown in FIG. 6F also depicts a method for displaying a list of contests where the number of contests with irregularities exceeds the available screen space reserved for the list. The contests are distributed among a number of pages, with left-pointing and right-pointing arrows that allow scrolling through the pages.

Figure 5B:
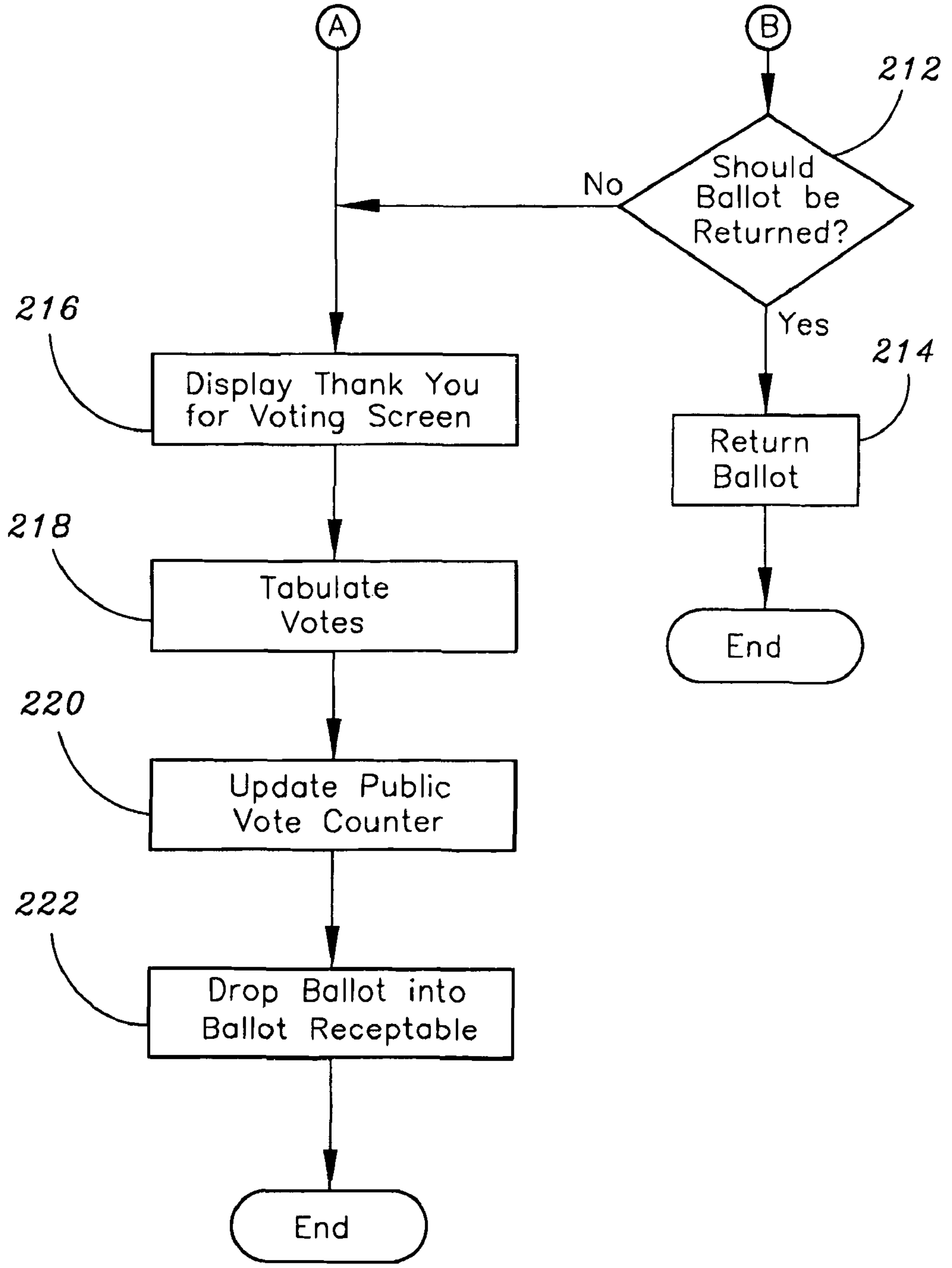

Referring to FIG. 5B, at block 212, a determination is made as to whether the paper ballot should be returned to the voter. It can be appreciated that this determination is made based upon whether the voter selects the "Don't Cast—Return Ballot" button or the "Cast Ballot/Accept" button on the screens depicted in FIGS. 6C to 6E, or, whether the error relates to the scanning of the ballot. If the voter selects the "Don't Cast—Return Ballot" button or if the error relates to the scanning of the ballot, the ballot is returned to the voter at block 214, preferably by feeding the ballot in the opposite direction through the ballot insertion tray 16. At this point, the voter may either correct the error on the same paper ballot or obtain a new ballot from a poll worker. If the voter selects the "Cast Ballot" button, the contests with irregularities (e.g., under-votes and/or over-votes) will not be included in the final tabulation while the remaining contests will be tabulated appropriately. It should be noted that the voting rules in some jurisdictions may prohibit casting ballots containing certain voting irregularities (e.g., over voted ballots). In those jurisdictions, if one or more prohibited irregularities are detected, the "Cast Ballot" button will not be displayed as an option.

Figure 6G:
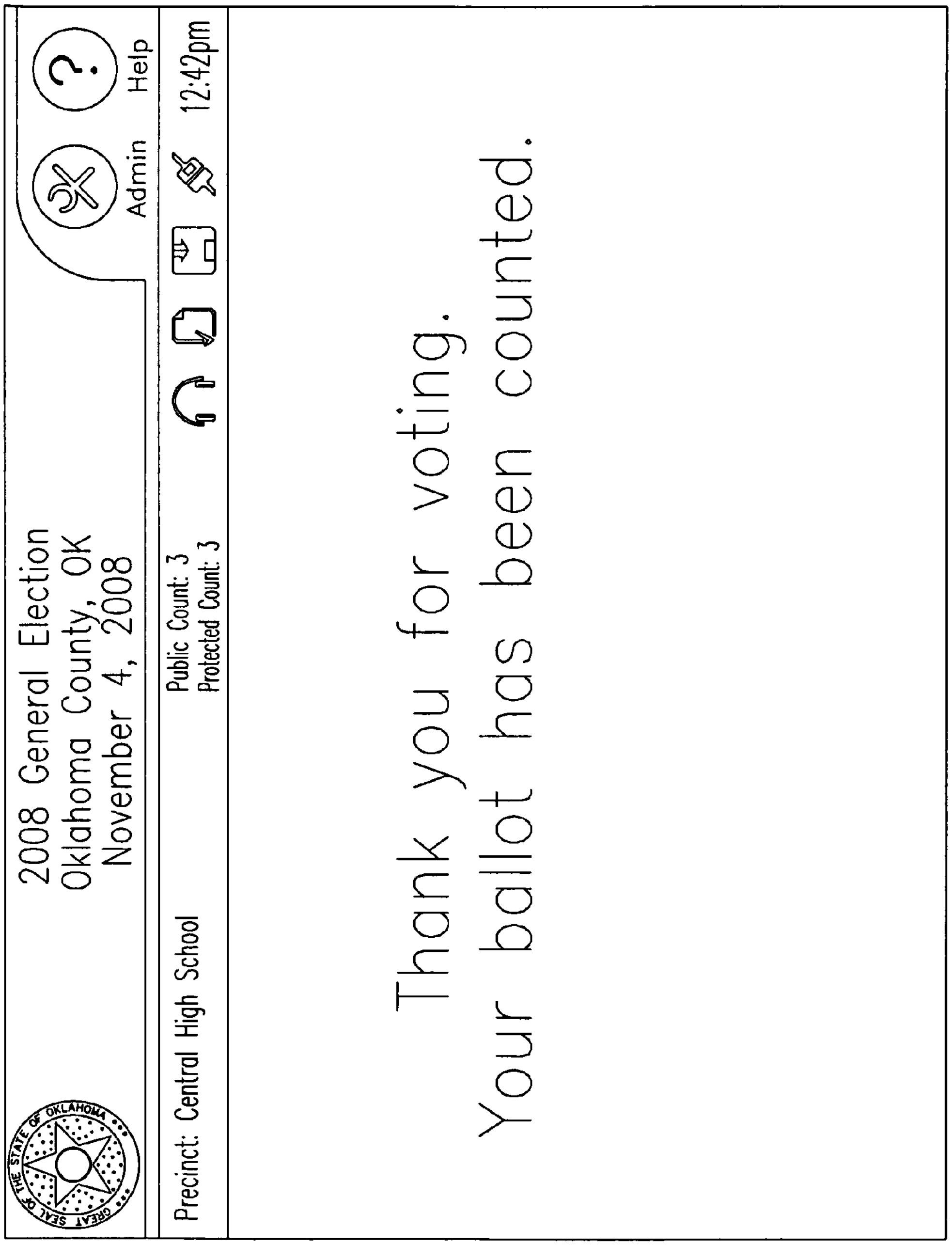

At block 216, upon casting the ballot, the voting device 12 displays a "thank you for voting" screen on the display 18 informing the voter that his/her voting selections have been tabulated. An example of such a "thank you for voting" screen is depicted in FIG. 6G. The "thank you for voting" screen displays a short message (e.g., "Thank you for voting. Your ballot has been counted."). Preferably, the message will be displayed for approximately 3 seconds or until the next ballot is inserted into the ballot insertion tray 16.

Next, at block 218 in FIG. 5B, the votes are tabulated by the CPU board 32 and stored in one of the removable USB flash drives of USB board 64 (noting, of course, that any contest with errors, such as under-votes and/or over-votes, are not tabulated). Then, at block 220, the public and protected counts (described below) are incremented by one to thereby provide confirmation that the ballot has been tabulated. At block 222, the ballot is dropped into the secure ballot receptacle 26 where it is retained for audit purposes, as is known in the art.

Finally, it should be understood that the screens shown in FIGS. 6A-6G are merely examples of the type of message screens that may be used to implement the various features of the invention. One skilled in the art will appreciate that other message screens could alternatively be used that display the information in a different format and/or that display different types of information. Of course, other types of message screens (both for use by voters and poll workers) may be used in accordance with the invention.

Electronic Ballot Mode

Figure 7A:
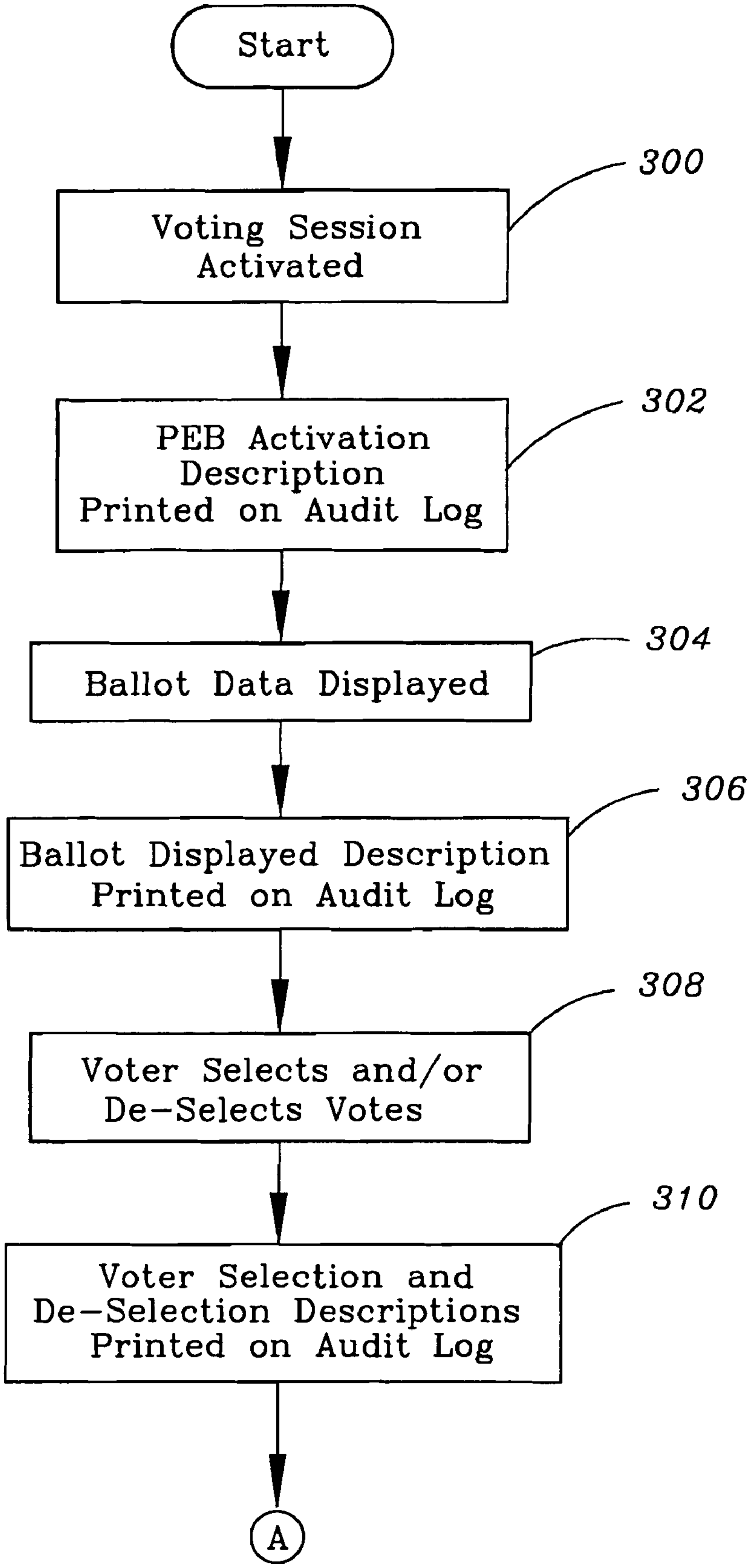
FIGS. 7A-7B are process flow diagrams of an exemplary operation of the voting system of FIG. 1 in the electronic ballot mode.

An exemplary operation of the voting device 12 in the electronic ballot mode will now be described with reference to blocks 300 to 322 of the process flow diagram shown in FIGS. 7A and 7B. At block 300, an electronic ballot voting session may be activated in a variety of different ways (as discussed above). In the exemplary embodiment, the electronic ballot voting session is activated by inserting a PEB into the PEB reader/writer of PEB board 68. Then, at block 302, audit log printer assembly 80 prints a description of the action on the audit log(e.g., "voting session activated").

It should be understood that there are two possible modes of activation for an electronic ballot voting session: poll worker activation and voter activation. In poll worker activation mode, a poll worker inserts a supervisor PEB into the PEB reader/writer, whereby the various races to be voted on are displayed on the display 18. By contrast, in voter activation mode, a poll worker activates a voter PEB at a supervisor terminal by writing an activation security code to the voter PEB. The poll worker provides the voter PEB to the voter who proceeds to the voting device 12 and inserts the voter PEB into the PEB reader/writer. The PEB reader/writer reads the activation security code from the voter PEB, whereby the various races to be voted on are displayed on the display 18. After the voter has completed the voting process, the PEB reader/writer writes a deactivation security code to the voter PEB so that the voter PEB cannot be used again for voting until it is reactivated by a poll worker at the supervisor terminal.

After the electronic ballot voting session has been activated, the voting device 12 displays the ballot data (i.e., the various races to be voted on) on display 18 at block 304. Then, at block 306, audit log printer assembly 80 prints a description of the action on the audit log (e.g., "ballot displayed"). At block 308, the voter selects his/her votes by touching the appropriate locations on the touch screen of display 18. In response, audit log printer assembly 80 prints a description of each action on the audit log at block 310 (e.g., "Governor: select candidate A"; Governor: de-select candidate A", Governor: select candidate B", etc.).

Figure 7B:
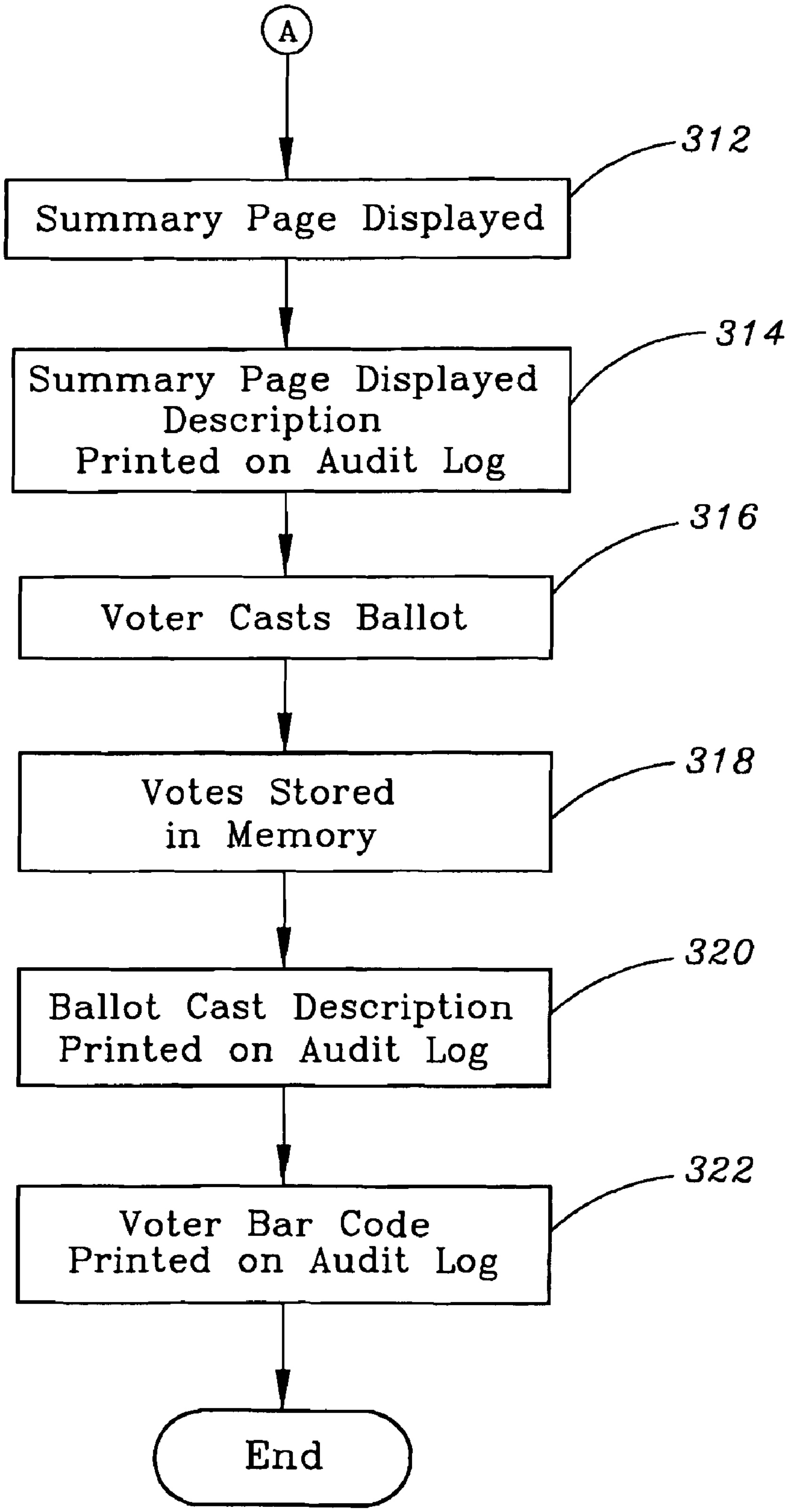

Referring to FIG. 7B, at block 312, after all of the votes have been selected, voting device 12 displays a summary page on display 18 for review by the voter (at which time the voter may change any of the selected votes). This summary page includes a summary of each of the selected candidates/referendum positions, as well as a summary of the under-voted contests. In response, audit log printer assembly 80 prints a description of the action on the audit log at block 314 (e.g., "summary page displayed"). At block 316, once the voter verifies that the summary of selected votes is correct, the voter touches a "vote" button on the touch screen of display 18. At block 318, the selected votes are stored in an internal memory of the voting device 12. In response, audit log printer assembly 80 prints a description of the action on the audit log at block 320 (e.g., "ballot cast").

In addition, at block 322, audit log printer assembly 80 also prints a voter barcode on the audit log. The voter barcode contains information corresponding to the ballot cast by the voter (e.g., the final vote selections of the voter), and is preferably printed on the audit log proximate to the printed voter actions for the voter. In the exemplary embodiment, each of the voter barcodes may be scanned by a commercially available 2D barcode reader. Thus, the scanned information from the voter barcodes may be randomly compared against the voter actions printed on the audit log for auditing purposes.

In the exemplary embodiment, audit log printer assembly 80 may optionally print a vote summary on the audit log that includes a voting device barcode. The voting device barcode may contain the serial number of the voting device 12, the total ballots cast on the voting device 12 in the electronic ballot mode, and the vote totals for each candidate and/or referendum issue within each race. Preferably, the voting device barcode is printed at the end of the audit log so that it may be easily scanned by a commercially available barcode reader for verification purposes after the election is over.

Audio Ballot Mode

Figure 8:
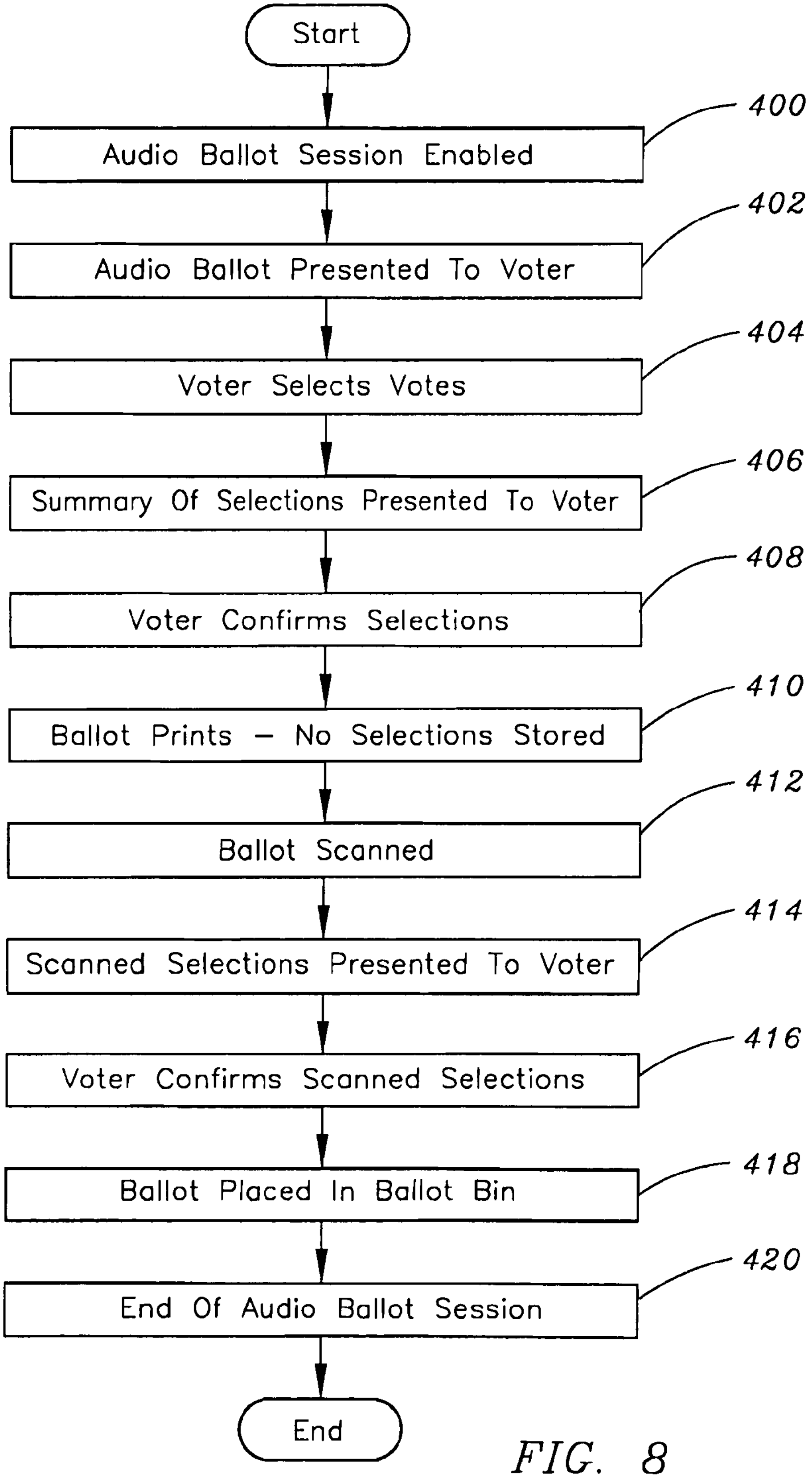
FIG. 8 is a process flow diagram of an exemplary operation of the voting system of FIG. 1 in the audio ballot mode.

An exemplary operation of the voting device 12 in the audio ballot mode will now be described with reference to blocks 400 to 420 of the process flow diagram shown in FIG. 8. At block 400, the poll worker initiates an audio ballot voting session via an administration screen displayed on the display 18 of voting device 12. An example audio ballot initiation process will be described with reference to the screen shown in FIGS. 9A to 9J.

Figure 9A:
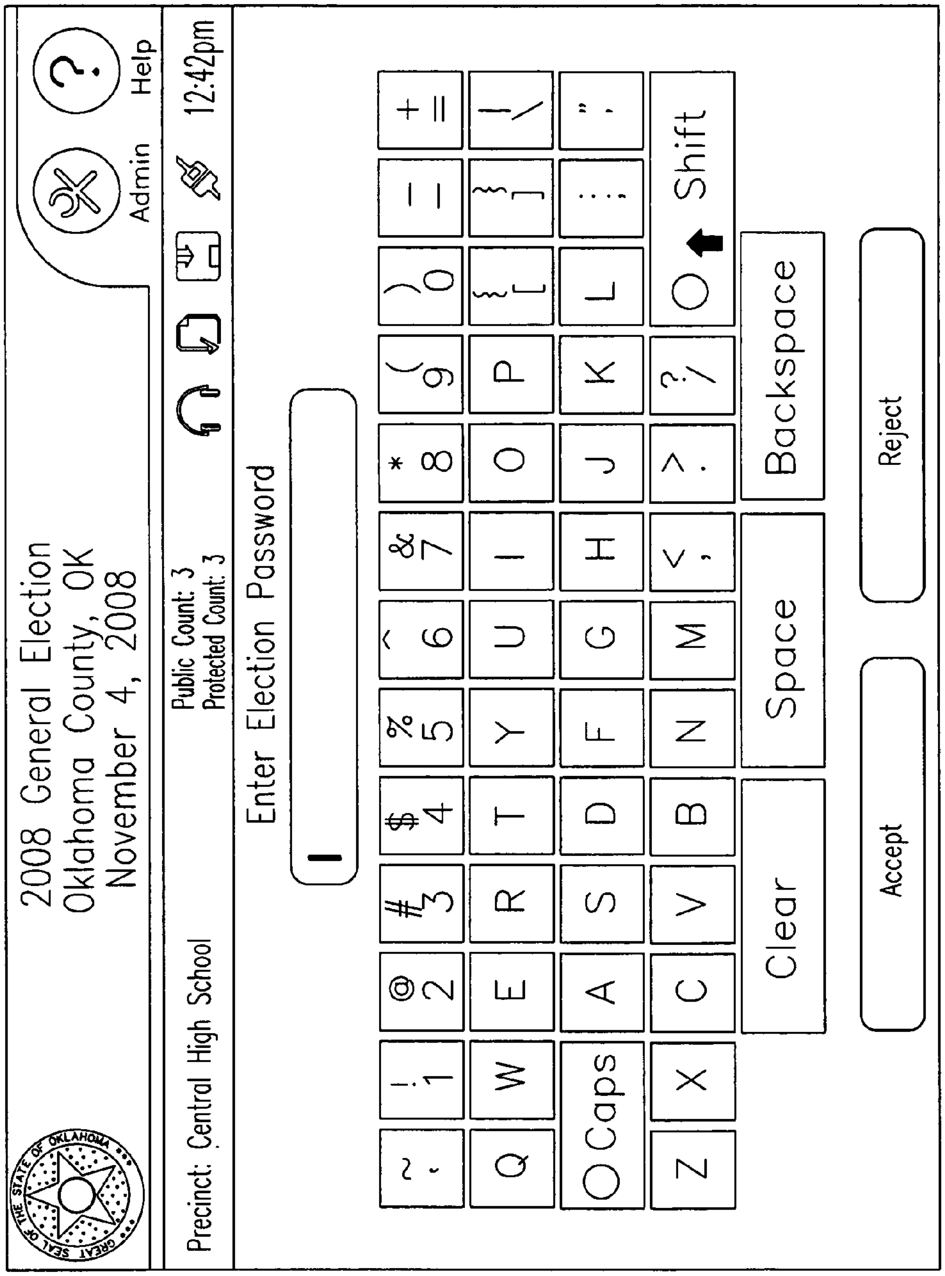
FIGS. 9A-9M are various screen shots of the display of the voting device of FIG. 1 when in the audio ballot mode.

To access the audio ballot settings, the poll worker must select the "Admin" button located at the top right corner of each of the display screens. Upon selection of the "Admin" button, the voting device 12 displays an "enter password" screen on display 18 as shown in FIG. 9A. The "enter password" screen displays a full alphanumeric QWERTY keyboard, a text entry field for entry of an election password, an instruction line prompting the poll worker to enter the password (e.g., "Enter Election Password"), and two selection buttons—"Accept" and "Cancel." Upon entering the election password and selecting the "Accept" button, the poll worker is presented with an "administration" screen as shown in FIG. 9B.

Figure 9B:
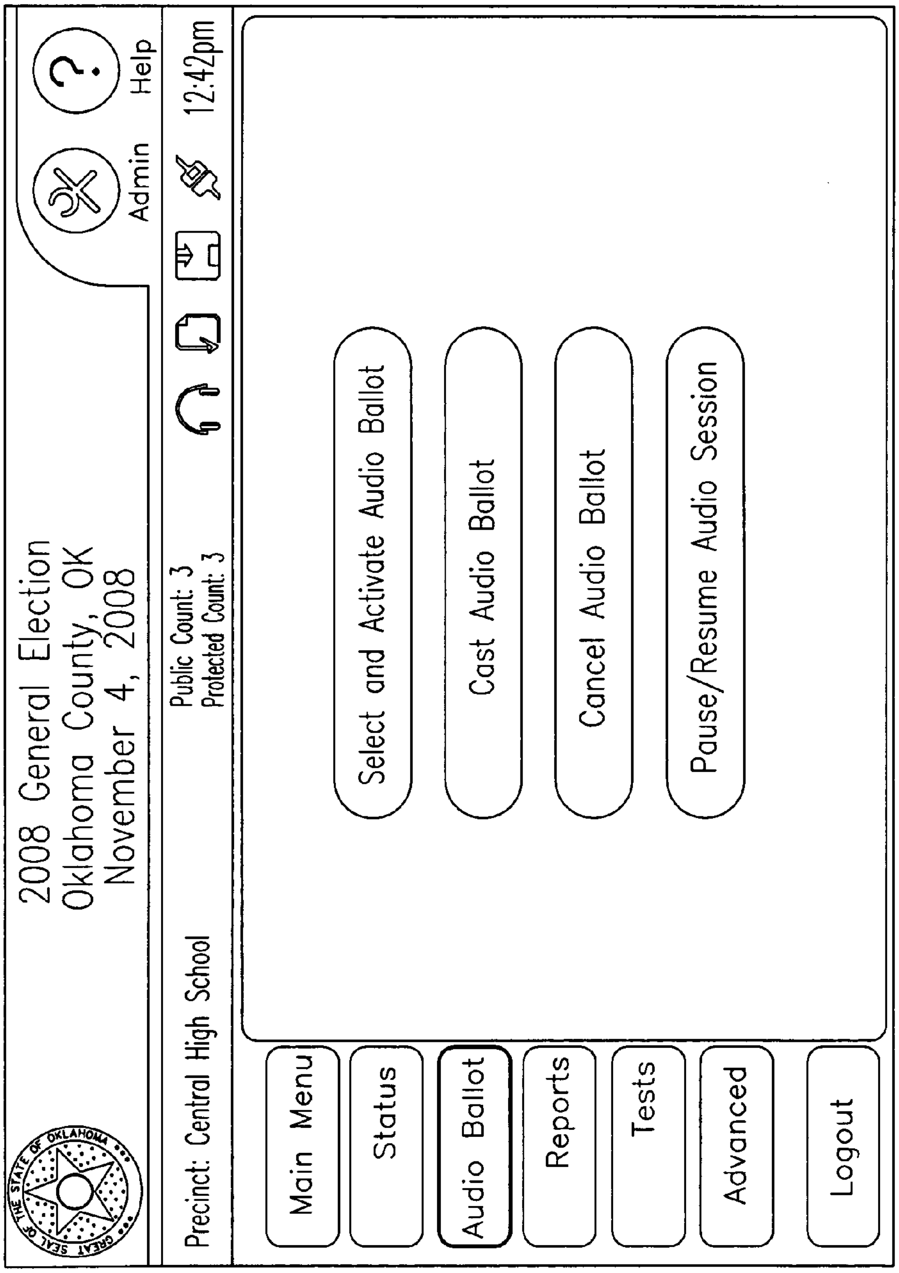

As can be seen in FIG. 9B, the "administration" screen provides functions necessary for the administration of the voting system 10. Various administrative functions are assigned to vertically aligned tabs shown at the left-hand side of the "administration" screen. The selection of each tab will cause the display of a number of related administration functions. For example, selection of the "Audio Ballot" tab causes the display of four audio ballot control functions (e.g., "Select and Activate Audio Ballot," "Cast Audio Ballot," "Cancel Audio Ballot" and "Pause/Resume Audio Session"). In order to activate an audio ballot voting session, the poll worker selects the "Select and Activate Audio Ballot" button.

Figure 9C:
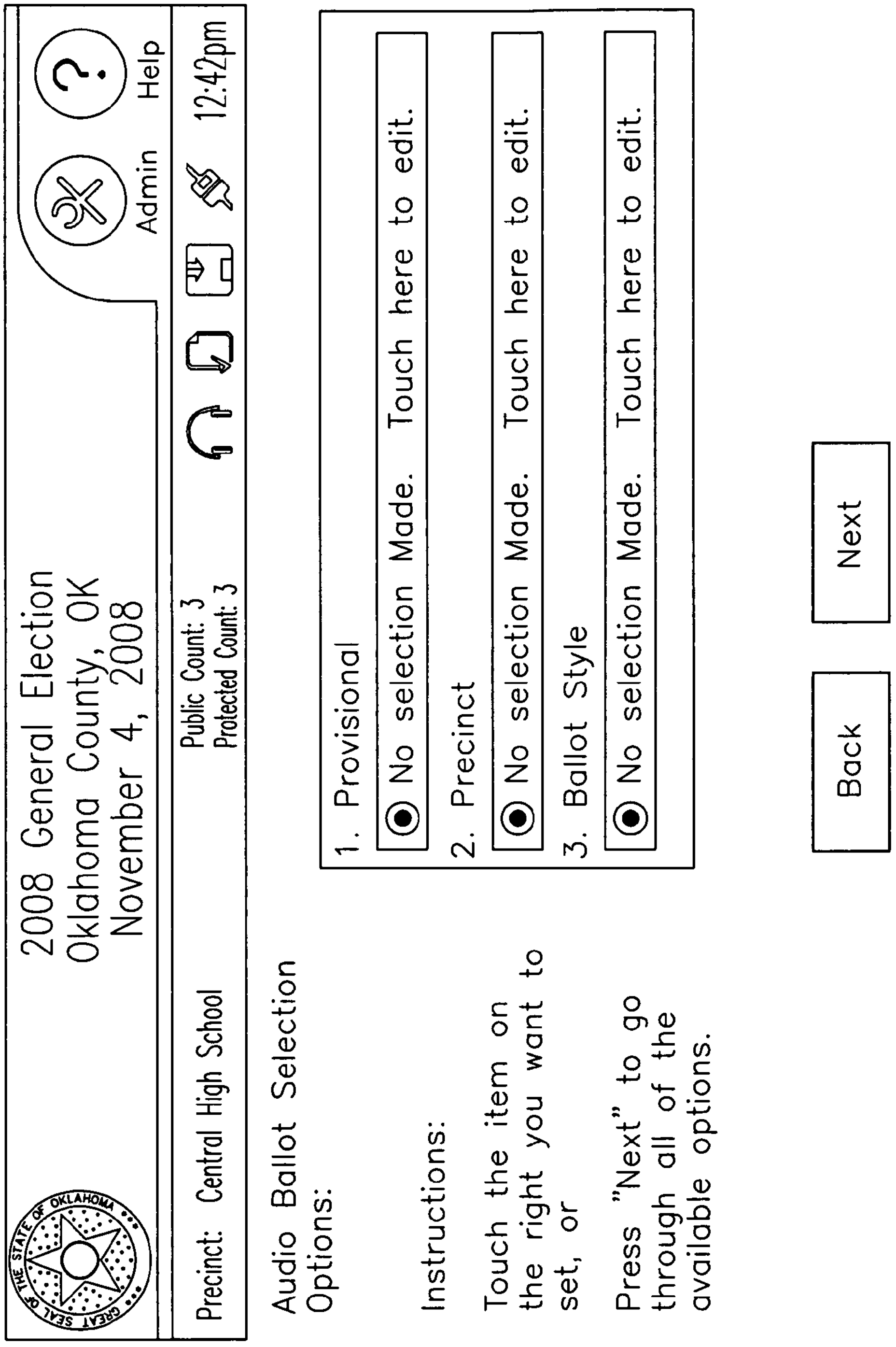

Upon selection of the "Select and Activate Audio Ballot" button, the voting device 12 displays an "audio ballot selection options" screen on display 18 as shown in FIG. 9C. The "audio ballot selection options" screen includes instructions for modifying the audio ballot settings (e.g., "Touch the item on the right you want to set, or Press 'Next' to go through all of the available options."). Three screen areas are provided for a "Provisional" ballot, "Precinct" and "Ballot Style" settings. The number and types of available settings can be defined for each precinct, with the "Ballot Style" setting being a mandatory setting. Finally, it can be seen that the "audio ballot selection options" screen includes two selection buttons—"Back" and "Next."

Figure 9D:
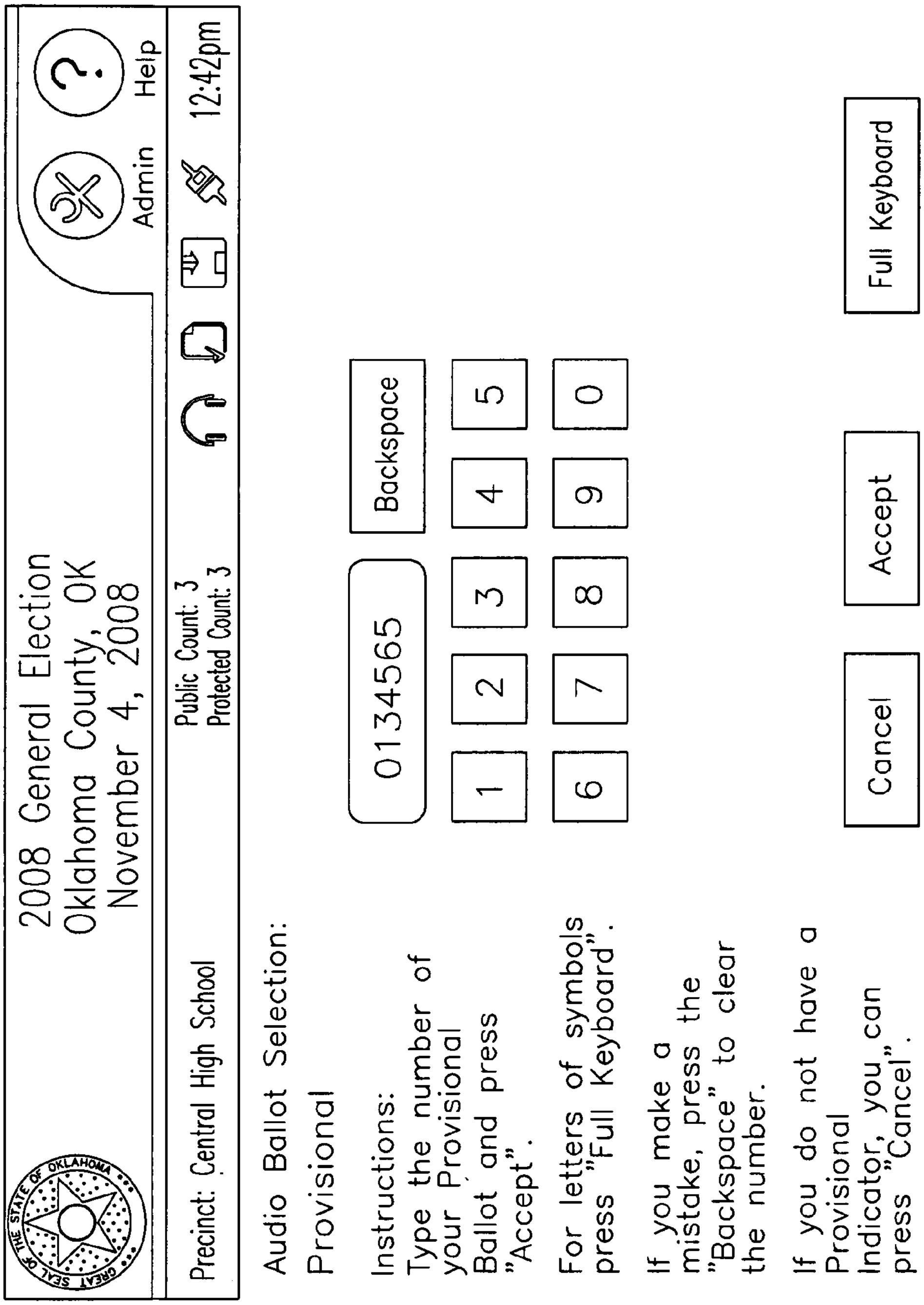

By selecting either the "Next" or "Provisional" buttons, the voting device 12 displays a "provisional audio ballot selection" screen on the display 18 as shown in FIG. 9D. The "provisional audio ballot selection" screen displays a numeric keyboard, which can be substituted by a full keyboard, for entering the number of a Provisional Ballot. The "full keyboard" button causes a full keyboard to be displayed. The "provisional audio ballot selection" screen further includes instructions on how to select a Provisional Ballot (e.g., "Type the number of your Provisional Ballot and press 'Accept'"), and two selection buttons—"Cancel" and "Accept." Upon selection of the "Accept" button, the voting device 12 stores the entered number of the Provisional Ballot.

Figure 9E:
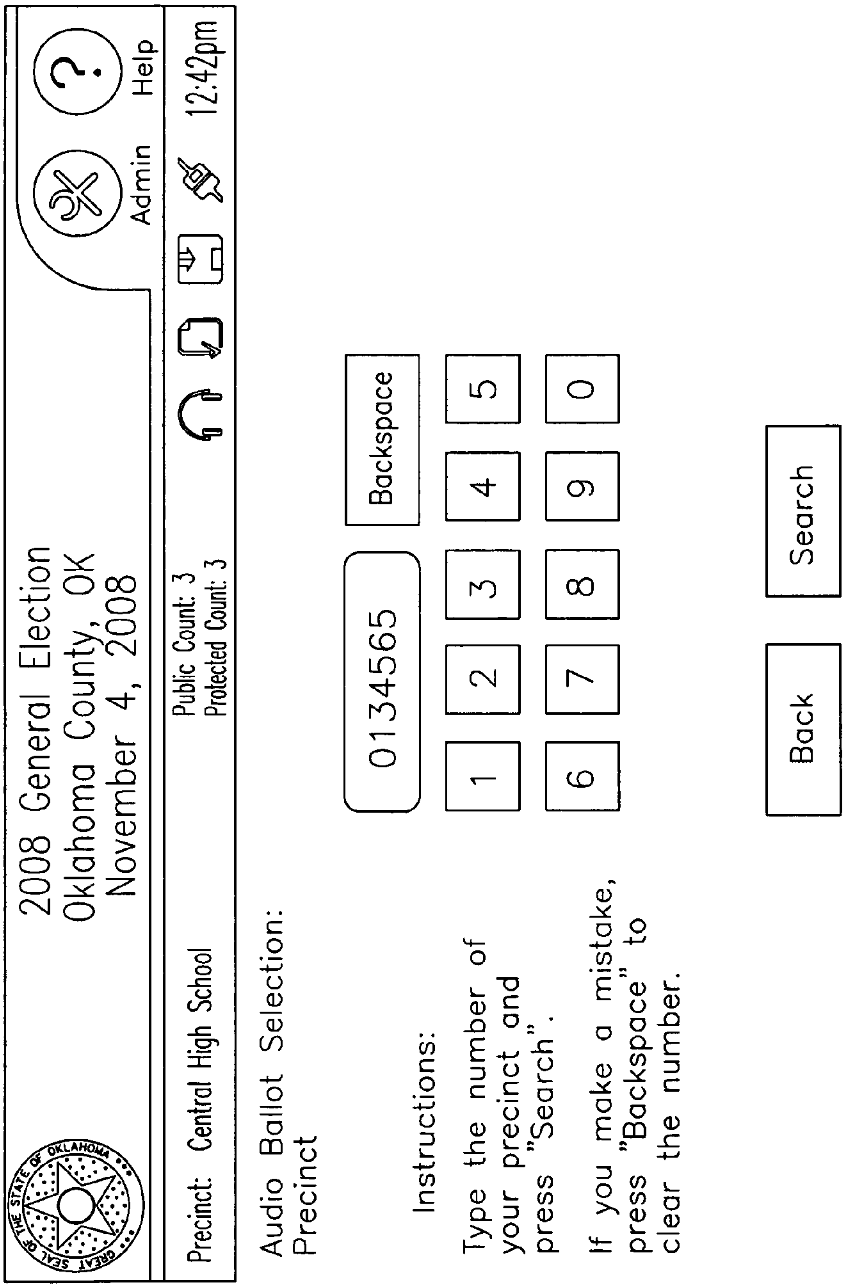

Referring back to the "audio ballot selection options" screen of FIG. 9C, if the "Precinct" button is selected, the voting device 12 displays a "precinct ballot selection" screen on the display 18 as shown in FIG. 9E. The "precinct ballot selection" screen includes a numeric keyboard for entering a precinct number, and instructions for making the selection (e.g., "Type the number of your precinct and press 'Search'. If you make a mistake, press 'Backspace' to clear the number."). It can be seen that the "precinct ballot selection" screen includes two selection buttons—"Back" and "Search."

Figure 9F:
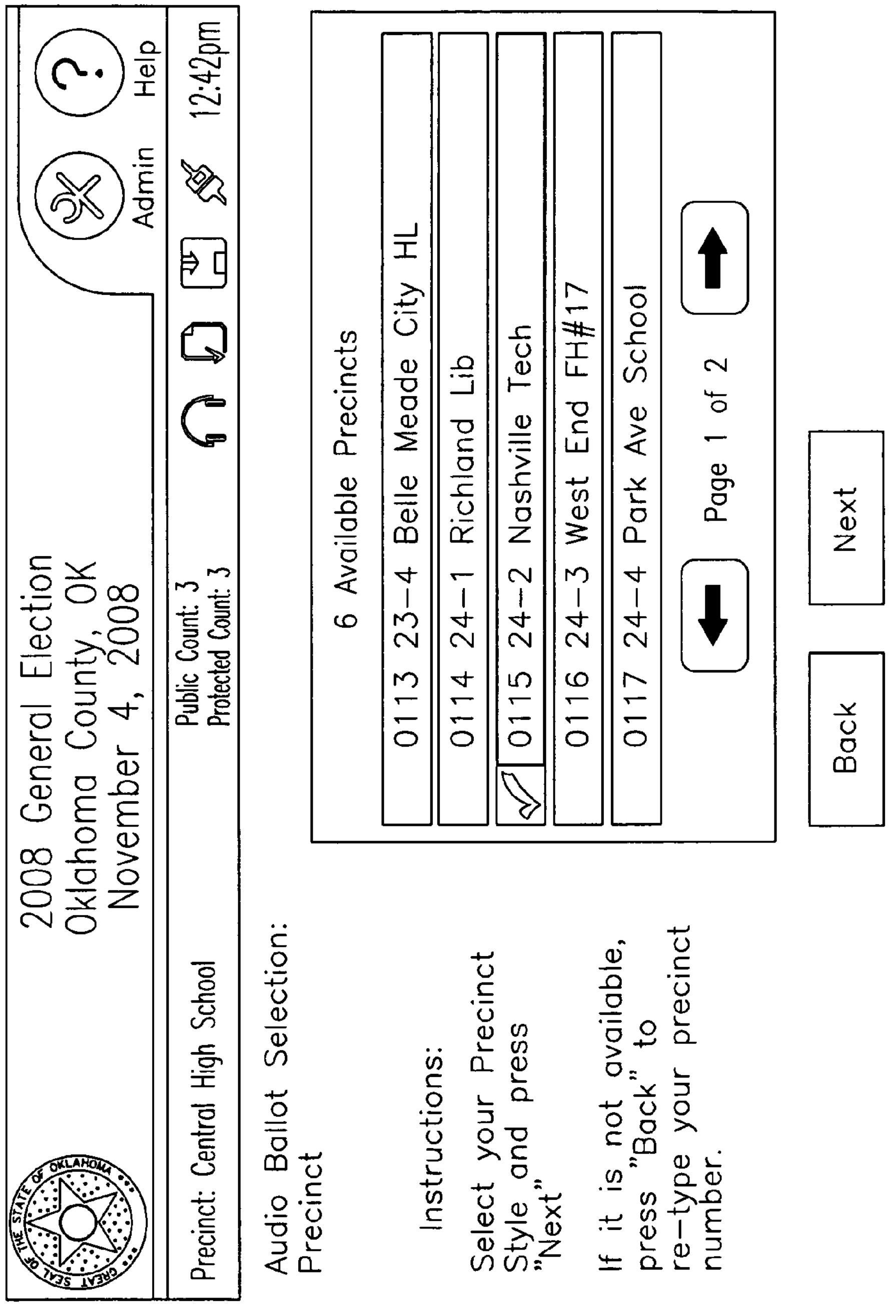
Figure 9G:
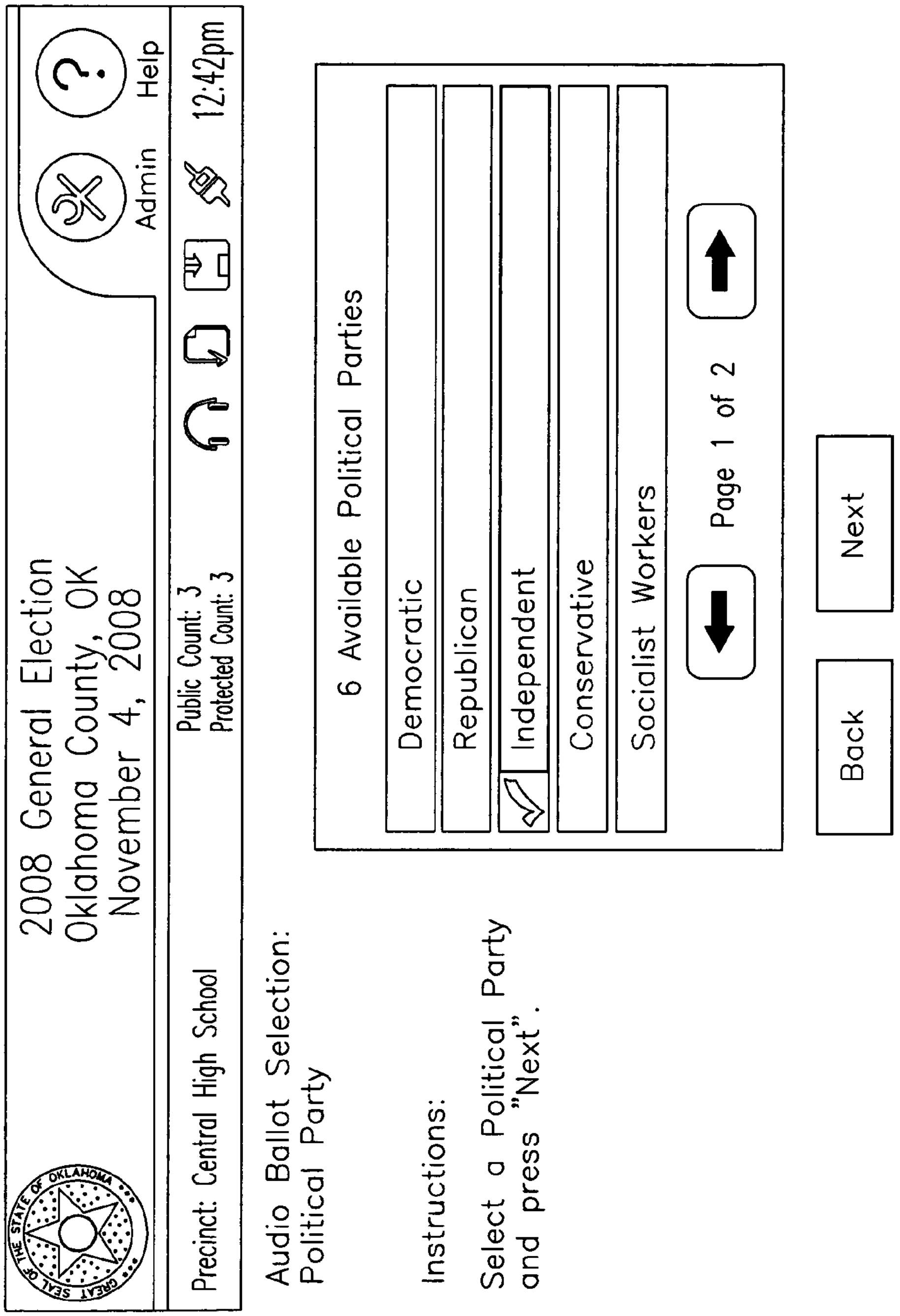

Upon selection of the "Search" button, the voting device 12 searches through a list of stored precincts to locate corresponding precinct numbers, and displays the results of the search in the "available precincts" screen shown in FIG. 9F. If the number of available precincts exceeds the allocated screen area, the precincts are divided into two or more pages wherein left-pointing and right-pointing buttons allow the poll worker to scroll through the pages. The "available precincts" screen also includes instructions for making selections (e.g., "Select your Precinct and press 'Next.' If it is not available, press 'Back' to re-type your precinct number."). Upon selection of a precinct name, a checkmark appears next to the precinct name on the screen. Finally, it can be seen that the "available precincts" screen includes two selection buttons—"Back" and "Next." If the poll worker wishes to change the search criteria, the poll worker can go back to the "precinct ballot selection" screen by selecting the "Back" button. However, if the poll worker is satisfied with the precinct selection, the poll worker can select the "Next" button.

Upon selection of the "Next" button, the voting device 12 may display a variety of different screens on display 18 depending on the type of election. For example, in a general election, the "ballot style" screen shown in FIG. 9H may be displayed (discussed below). However, in a primary election, a political party may first be selected through the "political party" screen shown in FIG. 9G. The "political party" screen displays a list of available political parties. If the number of available political parties exceeds the allocated screen area, the political parties are divided into two or more pages wherein left-pointing and right-pointing buttons allow the poll worker to scroll through the pages. The "political party" screen also includes instructions for selecting a political party (e.g., "Select a Political Party and press 'Next'."). Upon selection of a political party, a checkmark appears next to the selected political party on the screen. Finally, it can be seen that the "political party" screen includes two selection buttons—"Back" and "Next."

Figure 9H:
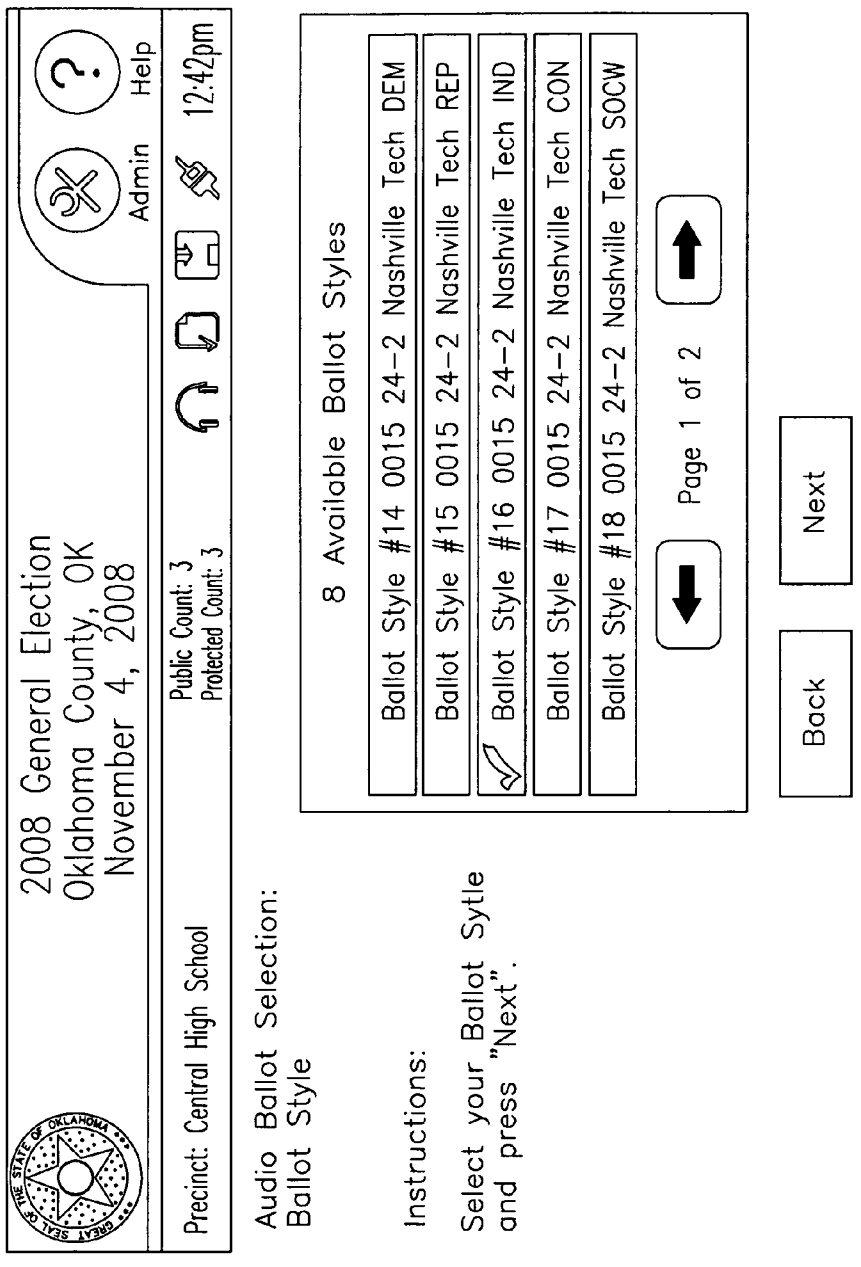
Figure 9I:
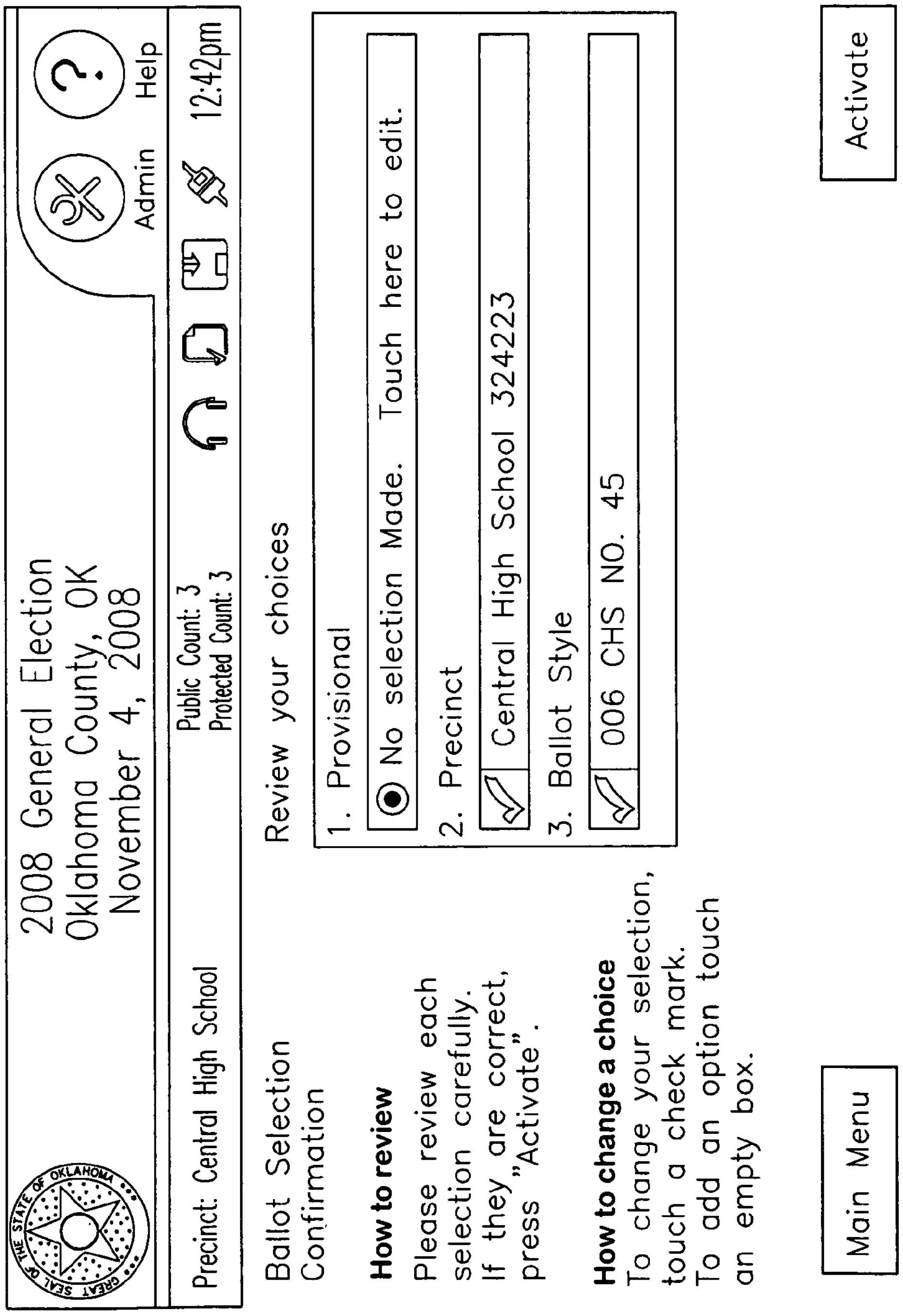

Upon selection of the "Next" button, the voting device 12 displays the "ballot style" screen on the display 18 as shown in FIG. 9H. The "ballot style" screen is used to select the ballot style for the audio ballot voting session. The "ballot style" screen displays a list of available ballot styles, which is a subset of all ballot styles loaded into the voting device 12 as part of the election definition. The subset is defined by the precinct number and/or political party selected following the selection process described above. Therefore, if no selections are made in regard to the precinct number and/or political party, the list of available ballot styles will include all ballot styles loaded into the voting device 12. On the other hand, by making selections for the precinct number and/or political party, the set of available ballot styles is limited to ballot styles with matching attributes.

On the "ballot style" screen, if the list of available ballot styles exceeds the allocated screen area, the available ballot styles are divided into two or more pages wherein left-pointing and right-pointing buttons allow the poll worker to scroll through the pages. The "political party" screen also includes instructions on how to effectuate the ballot style selection (e.g., "Select your Ballot Style and press 'Next'."). Upon selection of a ballot style, a checkmark appears next to the selected ballot style on the screen. Finally, it can be seen that the "ballot style" screen includes two selection buttons—"Back" and "Next."

Figure 9J:
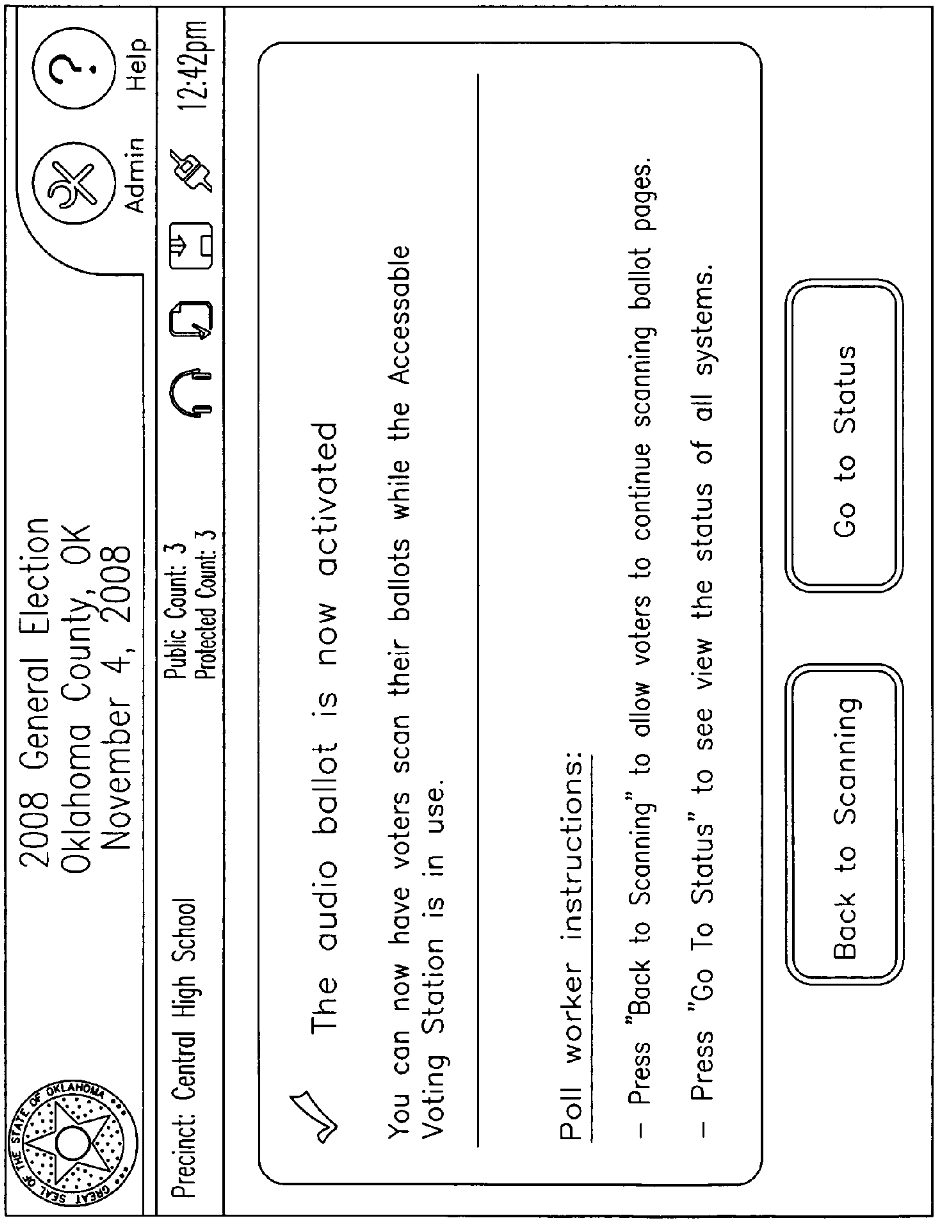

Upon selection of the "Next" button, the voting device 12 displays a "confirmation" screen on the display 18 as shown in FIG. 91. The "confirmation" screen includes three screen areas displaying the poll worker's selection of a "Provisional" ballot number (if applicable), a "Precinct" and a "Ballot Style." The "confirmation" screen also includes instructions on how to modify the entered settings (e.g., "To change your selection touch a check mark. To add an option touch an empty box"), and instructions regarding the activation of the audio ballot voting session (e.g., "Please review each selection carefully. If they are correct press 'Activate'."). Finally, it can be seen that the "confirmation" screen includes two selection buttons—"Main Menu" and "Activate." The "Main Menu" button leads the poll worker to the "administration" screen shown in FIG. 9B, while the "Activate" button activates the audio ballot voting session and presents the voter with an "audio ballot activated" screen as shown in FIG. 9J.

The "audio ballot activated" screen displays a notification that the audio ballot has been successfully activated, and instructions regarding further options available to the poll worker. Specifically, the poll worker is notified that selecting the "Back to Scanning" button will allow the voting device 12 to continue processing paper or electronic ballots, while the "Go to Status" button will display the status of the voting device subsystems.

Referring back to FIG. 8, following activation of the audio ballot voting session, the voting device 12 presents the audio ballot to the voter at block 402. The form of the audio ballot presentation is directly related to the ballot style selection made as part of the activation process described above. Looking to the accessible voting station 100 of FIG. 3, the voter is able to listen to the audio ballot via the headphones 106. At block 404, the voter makes his/her voting selections using the voting console 104 (as described in connection with FIG. 4). A summary of the voting selections is read to the voter at block 406, whereby the voter is prompted to reject or confirm the summary. If the voter rejects the summary, the voter is allowed to repeat the voting process. If the voter confirms the summary at block 408, a ballot (described in connection with FIG. 3 above) is printed by the ballot printer at block 410. It should be noted that the voting selections are not stored in the memory of voting device 12; rather, the printed ballot is the sole record of the voter's voting selections.

At block 412, the printed ballot (which includes one or more barcodes) is scanned by the barcode reader. At block 414, the voting selection information extracted from the barcodes on the printed ballot is presented to the voter via headphones 106, and the voter is prompted to reject or confirm the scanned voting selections. If the voter rejects the scanned voting selections, the printed ballot is marked as "rejected" before being deposited into the ballot bin 128 and the voter is allowed to repeat the voting process. If the voter confirms the scanned voting selections at block 416, the ballot is marked as "accepted" and deposited into the ballot bin 128 at block 418. The audio ballot voting session then ends at block 420.

Figure 9K:
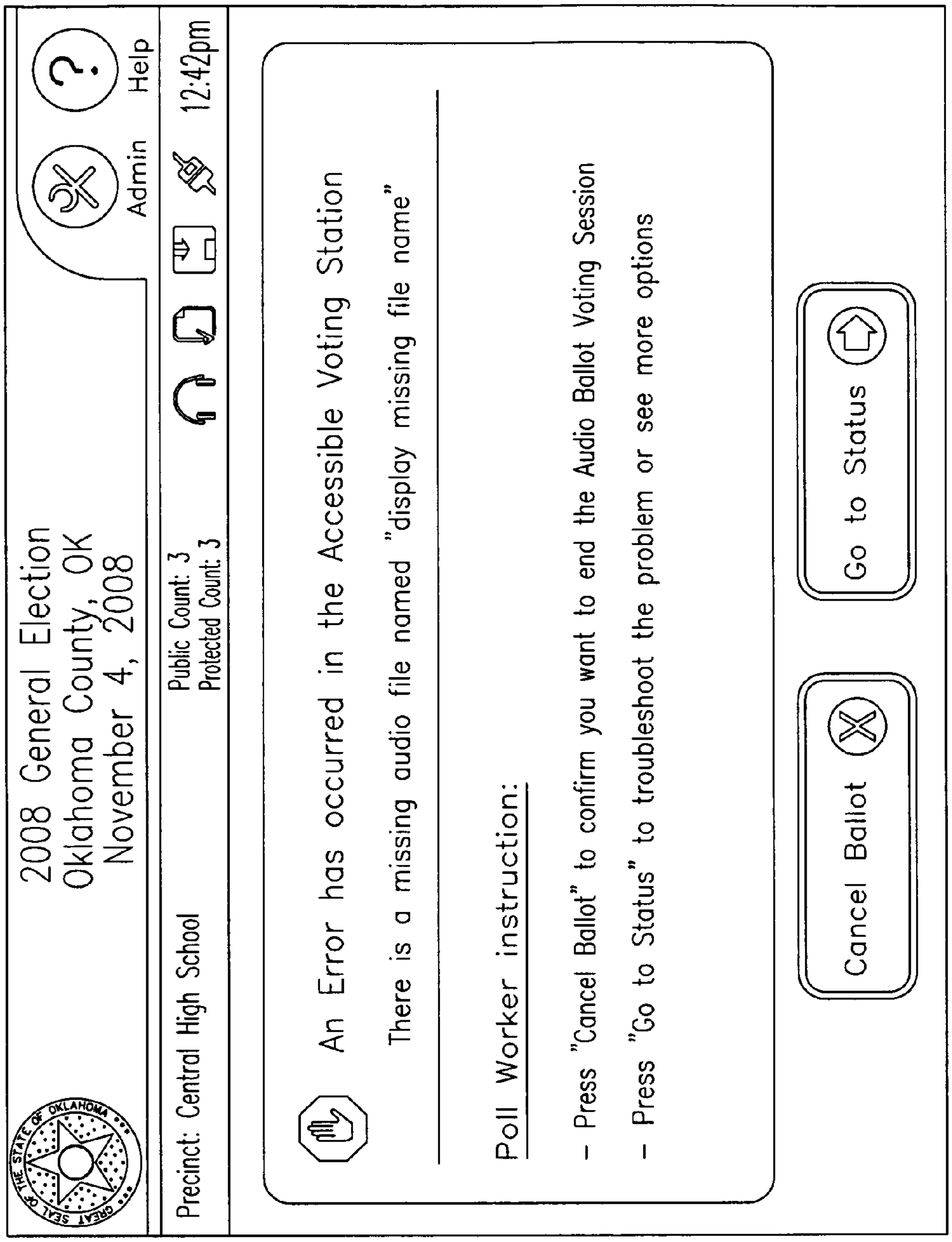

If the voting device 12 detects an error condition during the audio ballot voting session, the poll worker is notified via an "accessible voting station status" headphones icon displayed directly below the "Admin" button on each of the screens. The "accessible voting station status" headphones icon is represented by different colors to indicate the status of the audio ballot voting session. Specifically, orange indicates that the audio ballot voting session is inactive, green indicates that the audio ballot voting session is active, yellow indicates that there is an issue with the audio ballot voting session, and red indicates that there is a critical error with the audio ballot voting session. In case of a critical error, a pop-up window also appears on the display 18 which requires the poll worker's immediate attention. Preferably, the poll worker enters the administration screens by selecting the "Admin" button and providing the election password, as described with reference to FIG. 9A. An exemplary "error" screen is shown in FIG. 9K. The "error" screen includes a notification as to the source and the cause of the error (e.g., "An Error has occurred in the Accessible Voting Station. There is a missing audio file named 'PlsMkSl'.") In addition, the "error" screen provided detailed instructions to the poll worker (e.g., "Press 'Cancel Ballot' to confirm you want to end the Audio Ballot Voting Session" and "Press 'Go to Status' to troubleshoot the problem or see more options"). The "error" screen also includes two selection buttons—"Cancel Ballot" and "Go to Status" for receiving the poll worker's further commands.

The poll worker can check the status of the voting device subsystems by selecting the "Go to Status" button. Selecting the "Cancel Ballot" button ends the audio ballot voting session and causes the "audio ballot voting session successfully ended" screen shown in FIG. 9M to be displayed on display 18. The "audio ballot voting session successfully ended" screen displays a message confirming the successful termination of the audio ballot voting session (e.g., "You have successfully ended an Audio Ballot Voting Session"). The screen also includes two selection buttons—"Back to Scanning" and "Go to Status"—and provides detailed instructions regarding these selection buttons (e.g., "Press 'Back to Scanning' to allow voters to continue scanning ballot pages" and "Press 'Go to Status' to view the status of all systems").

Figure 9L:
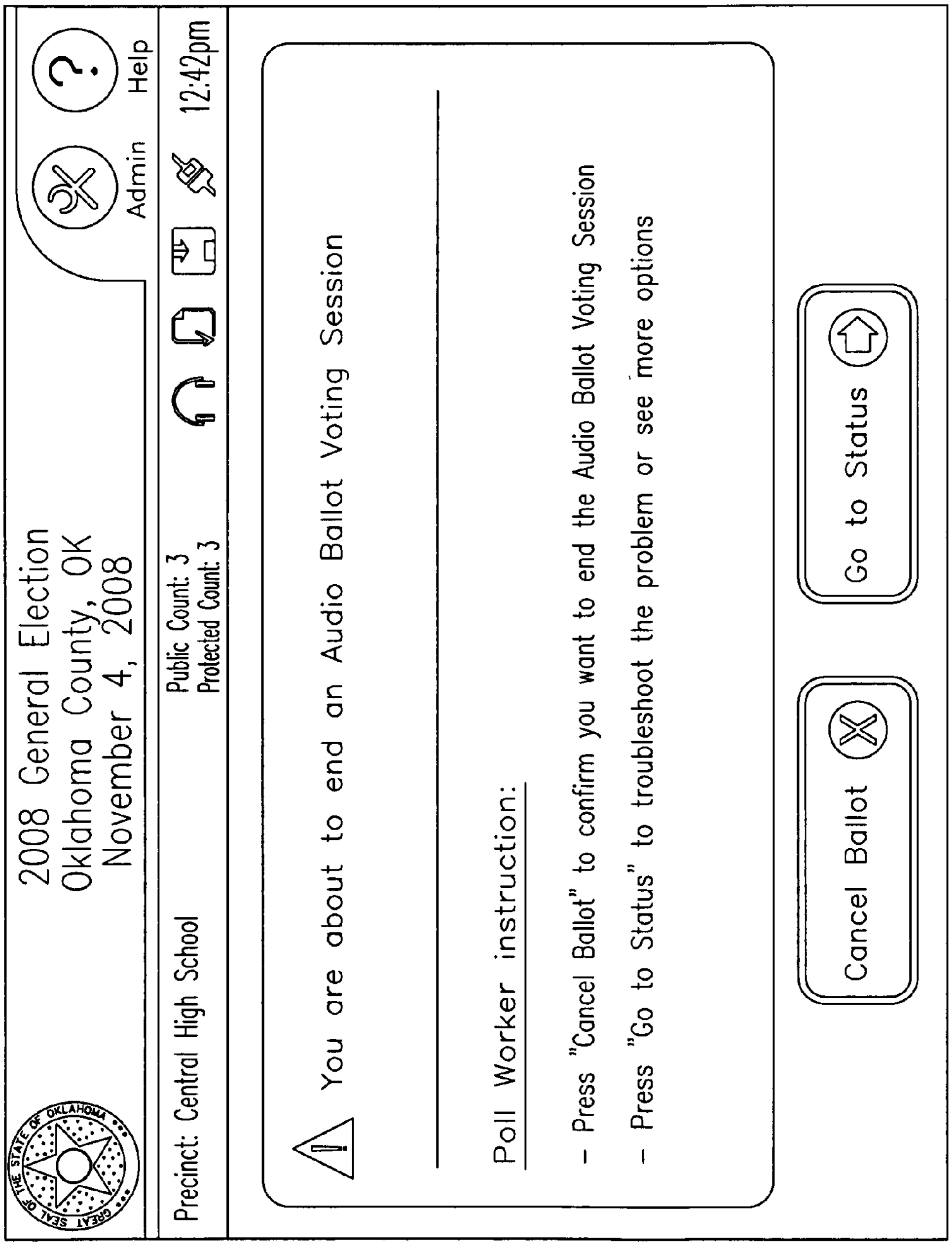
Figure 9M:
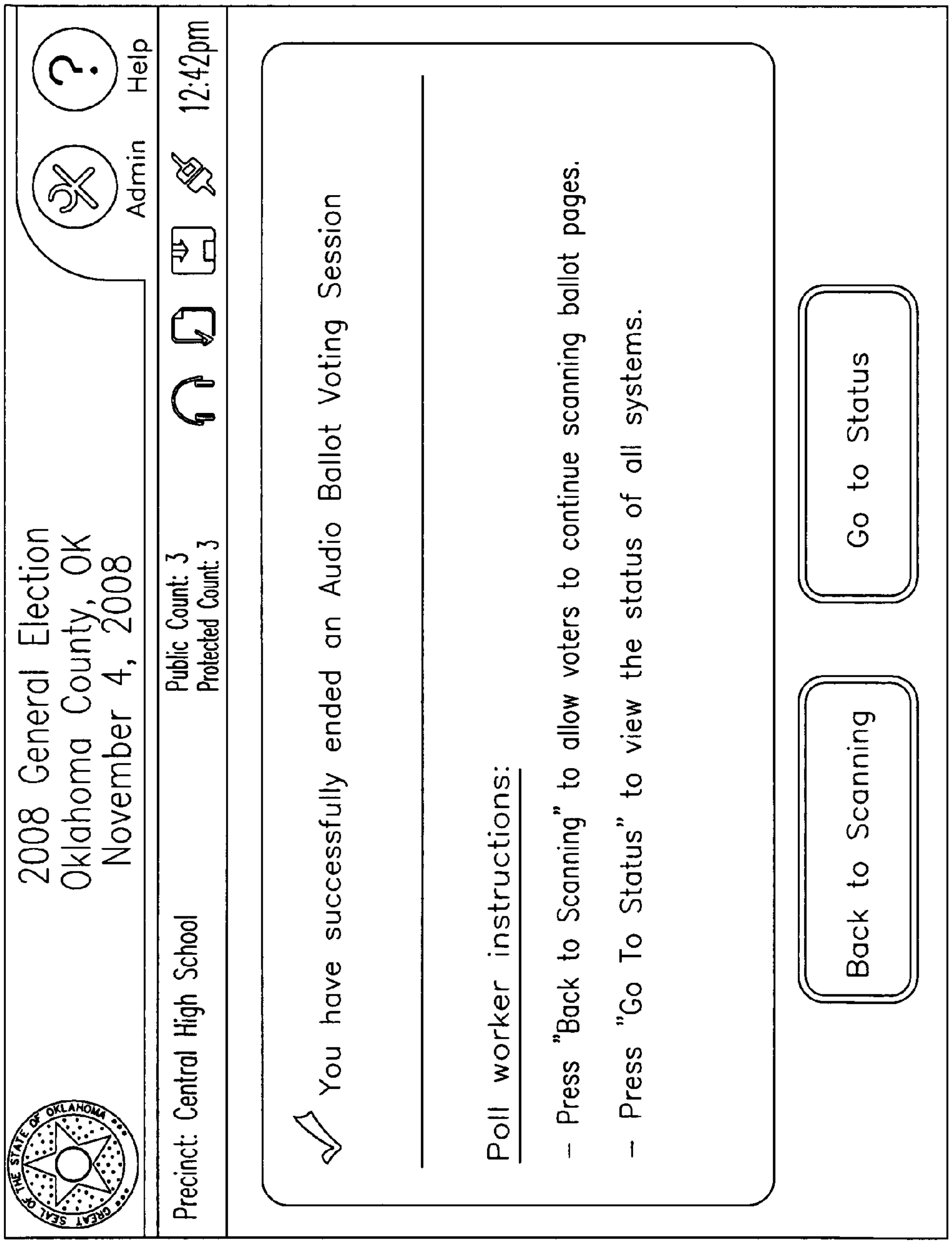

In the event that the poll worker needs to end a normally executing audio ballot voting session, he/she may select the "Cancel Audio Ballot" button associated with the "Audio Ballot" tab shown in FIG. 9B. Upon selecting the "Cancel Audio Ballot" button, the poll worker will be presented with a "confirmation" screen as shown in FIG. 9L. The "confirmation" screen includes a notification to the poll worker that the audio ballot voting session is about to end (e.g., "You are about to end an Audio Ballot Voting Session"), and provides detailed instructions on the available selections (e.g., "Press 'Cancel Ballot' to confirm you want to end the Audio Ballot Voting Session" and "Press 'Go to Status' to troubleshoot the problem or see more options").

The "confirmation" screen also includes two selection buttons—"Cancel Ballot" and "Go to Status." The poll worker can check the status of the voting device subsystems by selecting the "Go to Status" button, or end the audio ballot voting session by selecting the "Cancel Ballot" button. Selecting the "Cancel Ballot" button ends the audio ballot voting session and causes the "audio ballot voting session successfully ended" screen shown in FIG. 9M to be displayed on display 18 (described above).

Referring back to FIGS. 1 and 3, it should be noted that all of the printed ballots deposited in ballot bin 128 of the accessible voting station 100 will be collected by a poll worker periodically during the election day or at the end of the election day. The poll worker then proceeds to the voting device 12 and inserts the printed ballots one-by-one into the ballot insertion tray 16 for scanning and tabulation. Of course, it can be appreciated that the voting device 12 will include a barcode reader (not shown) operable to read the printed ballots.

It should be understood that alternative methods for processing the audio ballots are possible and within the scope of the present invention. In one alternative embodiment, the voting selection information extracted from the barcodes on the printed ballot at block 412 of FIG. 8 is transmitted over USB cable 132*b* to the voting device 12 for tabulation. As such, the printed ballots deposited in ballot bin 128 need not be scanned a second time by voting device 12.

In another alternative embodiment, the printed ballot is provided to the voter (rather than deposited in ballot bin 128), whereby the voter inserts the ballot into the ballot insertion tray of voting device 12 for scanning and tabulation. In another alternative embodiment, the ballot bin 128 includes a display window that allows the voter to view at least a portion of the printed ballot.

In yet another alternative embodiment, the barcode reader (s) could be replaced with an optical character recognition (OCR) scanner capable of extracting information from the human-readable information printed on the ballot (in which case the printed ballot need not include the barcodes). Of course, a wide variety of other ballot formats and configurations are within the scope of the present invention, including a printed ballot that has the appearance of a traditional paper ballot.

It should be noted that all of the screens described above (as shown in FIGS. 6A-6G, 9A-9M and 10A-10D) display the same header information, including general information on the election (e.g., "2008 General Election; Oklahoma County, Okla.; Nov. 4, 2008"), a precinct identifier (e.g., "Precinct: Central High School"), a protected count consisting of a total number of ballots cast on that voting device over the entire life of the device (e.g., "Protected Count: 3"), and a public count consisting of a running total of the number of ballots cast on that voting device during a particular election (e.g., "Public Count: 3").

Furthermore, all of the screens have an "Admin" button (described above) and a "Help" button located in the upper-right corner of the screen. Upon the selection of the "Help" button, a pop-up window is displayed which is designed to provide more detailed information regarding the particular operation of the voting device 12. For example, a pop-up window that may be displayed during poll opening would list the steps required to open the poll for voting.

All of the screens also include four system indicator icons displayed directly below the "Admin" and "Help" buttons. These icons are non-selectable and are used primarily by poll workers and other non-voter users. The system indicator icons comprise, from left to right, an "accessible voting station status" headphones icon (described above), an "election definition found" icon (which will include a small red "X" if the election definition is not found), an "additional ballot image storage found" icon (which will include a small red "X" if additional ballot image storage is not found), and a "running on AC power" icon. The "running on AC power" icon will be replaced with a "battery" icon when the voting device 12 is running on battery power. This "battery" icon will preferably be displayed in five states representing the available capacity of the battery —100%, 75%, 50%, 25% and 0%. The "battery" icon may flash when the battery capacity drops below a predetermined level.

Configuration of Ballot Tabulator with Security Sensor(s)

Figure 12:
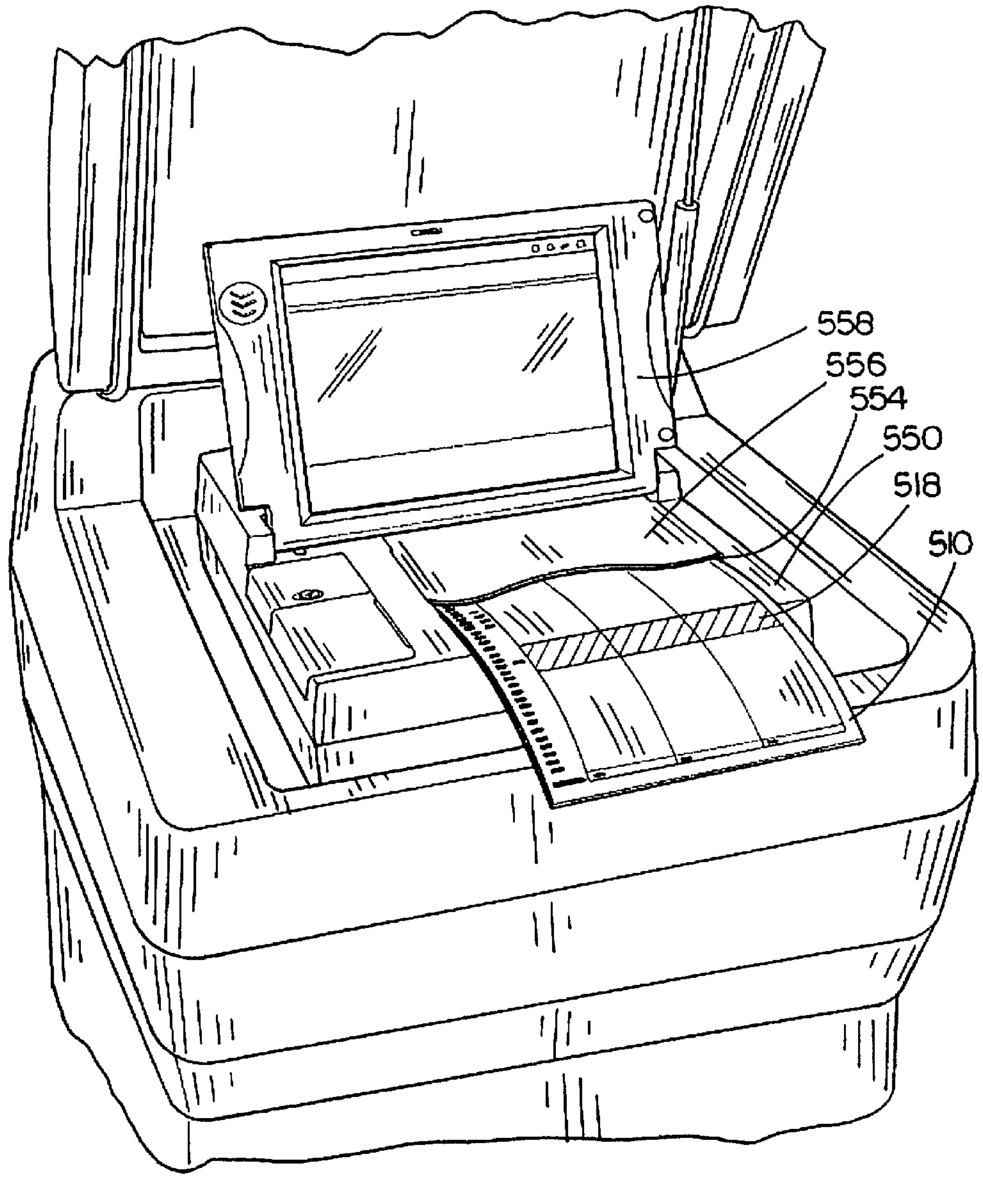
FIG. 12 is a perspective view of an exemplary embodiment of a ballot tabulator in accordance with the present invention.
Figure 13:
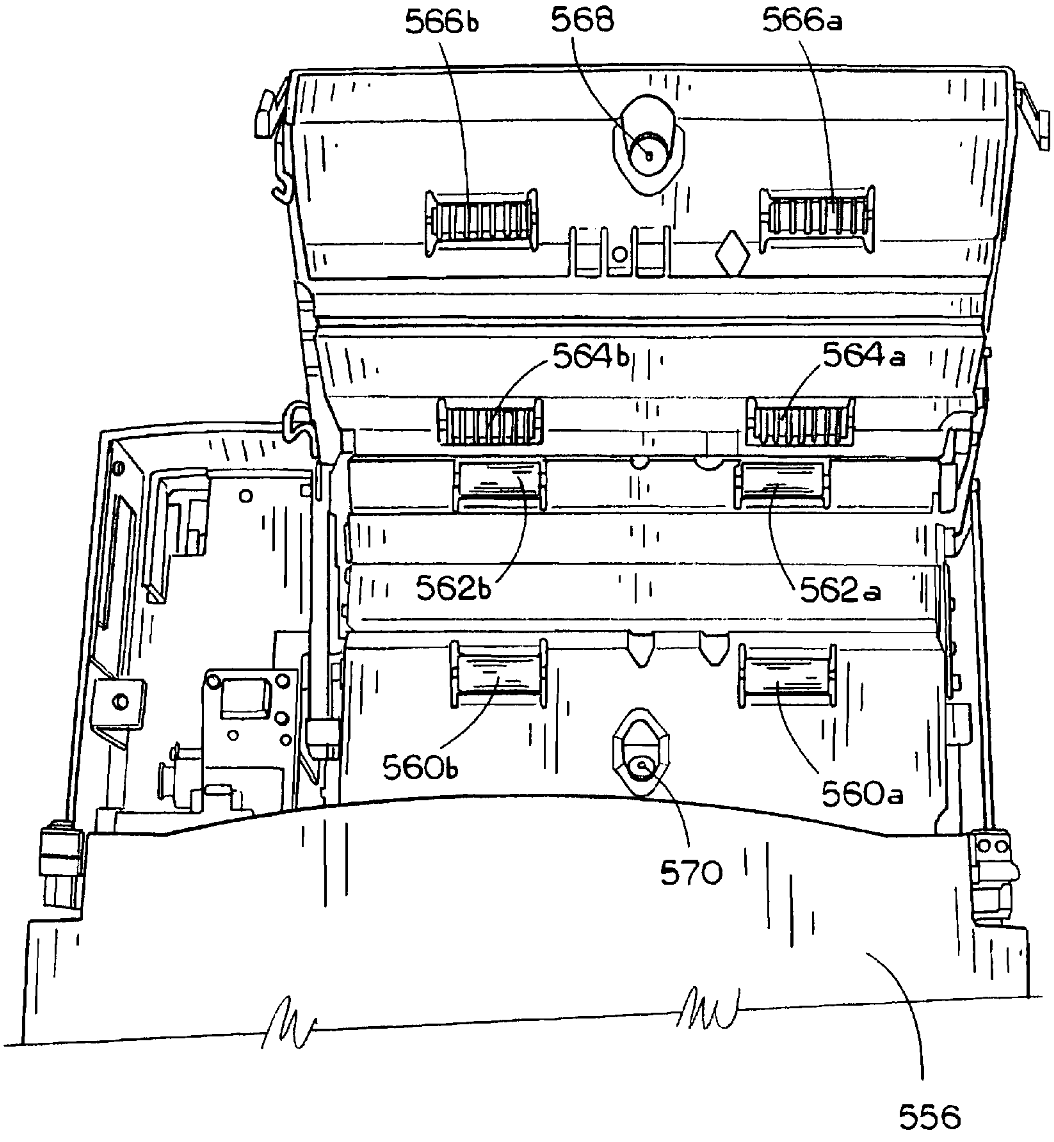
FIG. 13. is a front view of a portion of the ballot tabulator of FIG. 12 shown in an open position.
Figure 14:
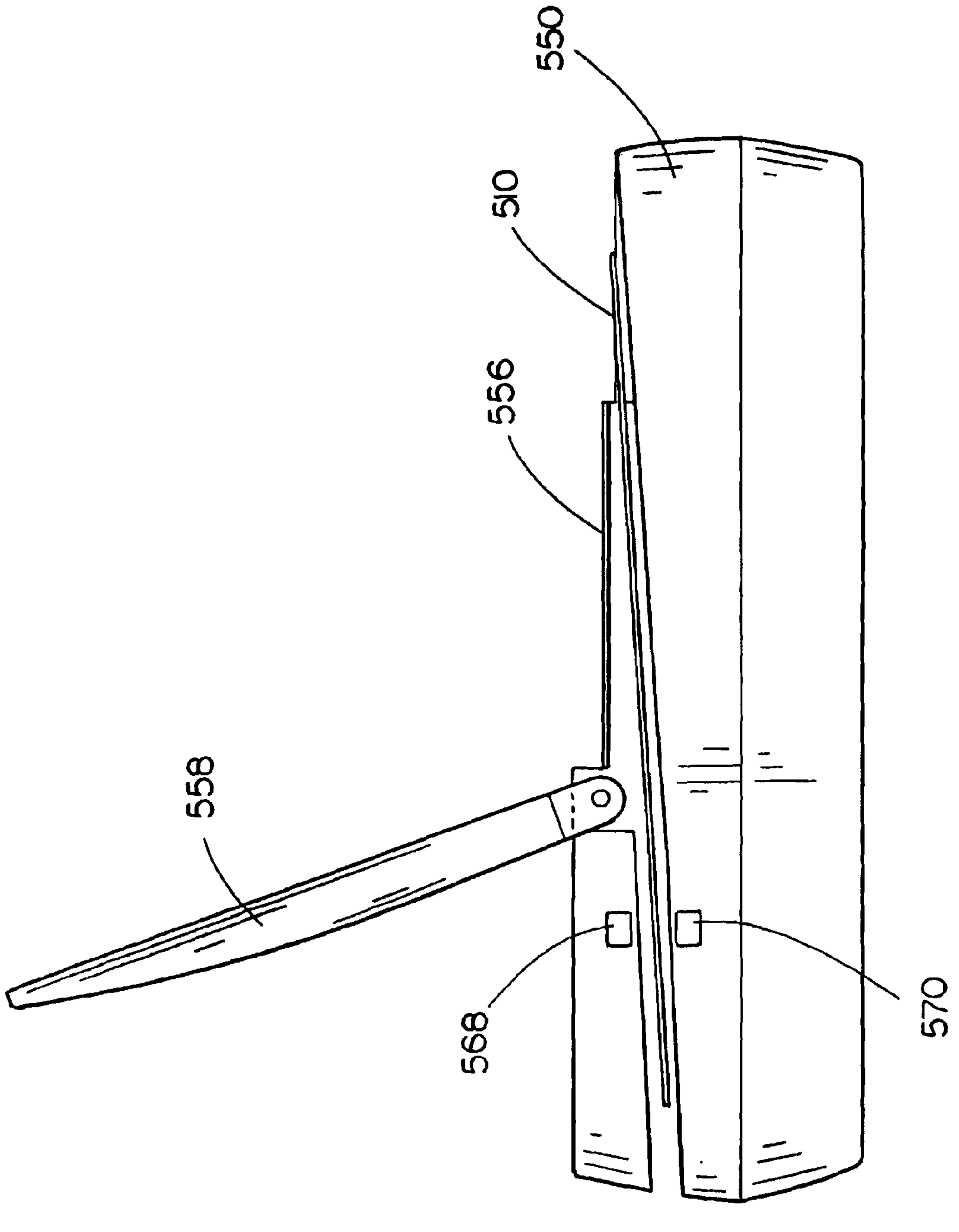
FIG. 14 is a cut-away side view of the ballot tabulator of FIG. 12.

Referring to FIGS. 12-14, an exemplary embodiment of a ballot tabulator for detecting security features on paper ballots in accordance with another aspect of the present invention is show as reference numeral 550. Ballot tabulator 550 includes essentially the same components as voting device 12 described above (when operating in paper ballot mode), with the exception that ballot tabulator 550 also includes at least one security sensor for detecting security features on paper ballots. It should be understood that ballot tabulator 550 could also include the necessary components to operate in the electronic ballot mode and/or the audio ballot mode, as described above. However, these alternative modes of operation are optional and may or may not be incorporated into ballot tabulator 550.

Figure 11:
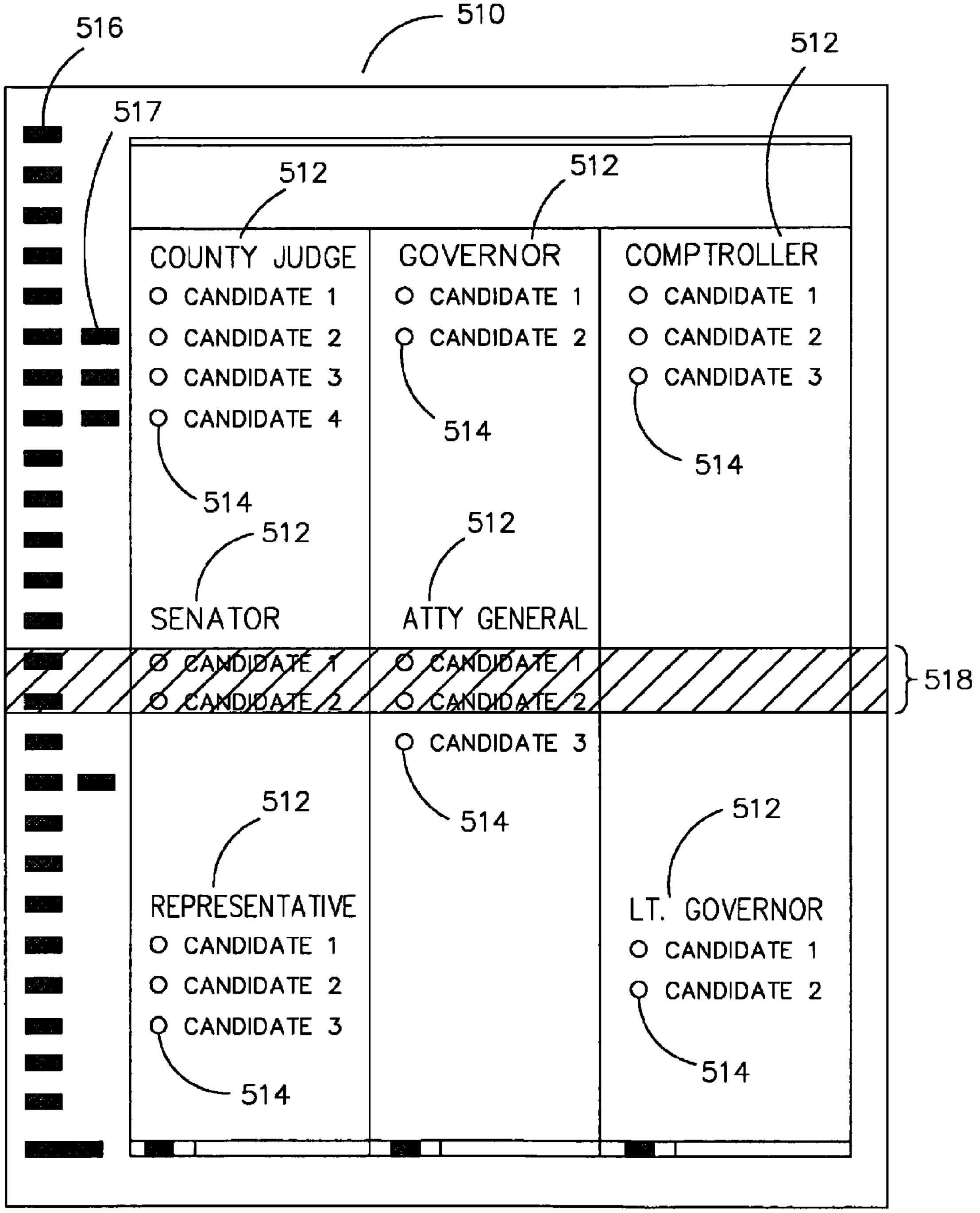
FIG. 11 is a plan view of an exemplary embodiment of a paper ballot having at least one security feature.

Looking to FIG. 11, an exemplary embodiment of a paper ballot that may be scanned and tabulated by ballot tabulator 550 is shown generally as reference numeral 510. Ballot 510 includes printed indicia 512 that includes a description of each contest (e.g., "County Judge") and the names of the candidates associated with each contest (e.g., Candidates 1-4). Ballot 510 also includes mark spaces 514 corresponding to each of the candidates in each contest. As is known in the art, a voter may darken or otherwise mark the mark space corresponding to his/her selection for each of the contests. Alternatively, a voter may utilize a ballot marking device to print a mark in each of the appropriate marks spaces, such as the AutoMARK® ballot marking device sold by the assignee of the present application. Ballot 510 further includes a series of rectangular timing marks 516 positioned along and down the left side and across the bottom of the ballot. The timing marks 516 permit ballot tabulator 550 to determine the position (i.e., row and column) of each of the mark spaces 514 on the ballot. Ballot 510 further includes a plurality of rectangular code channel marks 517 positioned adjacent the timing marks 516 on the left side of the ballot. The code channel marks 517 are used to identify the ballot style of ballot 510 so that ballot tabulator 550 is able to associate the marked voting selections with the correct contests and candidates printed on the ballot.

Looking still to FIG. 11, ballot 510 includes a security feature 518 positioned in the area represented by the shaded bar extending across the width of the ballot. In this embodiment, security feature 518 is comprised of a taggant that permits the verification and authentication of ballot 510 using a security sensor positioned within ballot tabulator 550 (as will be described in more detail below). A taggant consists of one or more micro-particles embedded within or affixed to the paper of a ballot. One type of taggant is a radio frequency (RF) microchip having an assigned serial number or other identifier. Upon interrogation by a radio frequency transmitter, the microchip broadcasts its identifier which is captured by a receiver or sensor. Another type of taggant is a chemical marker comprising one or more molecules of one or more materials, wherein those materials have specific properties. A sensor sensitive to the chemical detects the presence or absence of the associated material and provides an output indicative of the presence or absence thereof. In this case, security feature 518 comprises a chemical taggant available from Authentix, Inc.® of Addison, Tex. (and the security sensor positioned within ballot tabulator 550 is also provided by Authentix, Inc.®. As can be seen, the taggant is dispersed across the entire width of ballot 510, which permits the taggant to be detected with a single security sensor positioned within ballot tabulator 550 regardless of the orientation of ballot 510. However, it should be understood that the security feature may be located anywhere on the ballot provided the ballot tabulator includes one or more security sensors that are appropriately positioned to detect the security feature.

One skilled in the art will appreciate that other types and combinations of security features may also be used in accordance with the present invention. For example, the security feature may comprise a watermark consisting of a recognizable image or pattern that appears as various shades of lightness/darkness on the paper ballot when viewed by transmitted light. The watermark may be printed on, or formed in, the paper used to make the ballot. The watermark may be substantially invisible to the naked eye, or may be visible only upon holding the ballot at an angle or when illuminated with a particular light source. The watermark may be detected as a visible image or pattern using an image capture device such as a scanner or charge-coupled device (CCD) camera. In this case, the presence or absence of the image or pattern may be discerned by processing the image captured by the scanner or CCD camera to detect the image or pattern of the watermark.

As another example, the security feature may comprises printed indicia consisting of one or more characters, patterns and/or images printed on the paper ballot. Preferably, the printed indicia is located inconspicuously on the ballot, such as along the upper or lower edge away from the printed indicia 512 identifying the contests and candidates, so as not to interfere with that indicia. The printed indicia may be detected using an image capture device such as a scanner or CCD camera. In this case, the presence or absence of the printed indicia may be discerned by processing the image captured by the scanner or CCD camera to detect the printed indicia using OCR technology, or other image or pattern detection technologies as are known in the art.

As another example, the security feature may comprise a hologram consisting of a recognizable image that gives the appearance of being three-dimensional, or of having two or more distinct visible images depending on the viewing angle. The hologram may be affixed to the paper ballot using an adhesive or other method known in the art, and may comprise two or more stacked images such that each image is alternately visible depending upon the angle of perspective of the viewer. While the hologram is primarily intended for use as a human-viewable security feature, an image of the hologram may be captured by an image capture device such as a scanner or CCD camera. In this case, the presence or absence of the image may be discerned by processing the image captured by the scanner or CCD camera to detect the image of the hologram.

As yet another example, the security feature may comprise a security thread consisting of a thin ribbon woven into the paper of the paper ballot. Security threads are typically made of metal foil and may include information (i.e., text and/or numbers) engraved thereon. Security threads may also be comprised of fluorescent material that will fluoresce or glow when exposed to ultraviolet light. The fluorescent reaction can be detected by exposing the paper ballot to ultraviolet light and detecting the reaction using an image capture device such as a CCD camera.

As yet another example, the security feature may comprise an embossing consisting of a recognizable image or pattern impressed into the paper ballot. An embossed feature includes recessed areas and raised areas in the otherwise generally planar surface of the paper ballot, wherein those recessed and raised areas appear as various shades of lightness/darkness on the ballot when viewed by transmitted light. An embossing may be substantially invisible to the naked eye, or may be visible only upon holding the ballot at an angle to a light source. An embossing may be also detected as a visible image or pattern using an image capture device such as a scanner or CCD camera. In this case, the presence or absence of the embossed image or pattern may be discerned by processing the image captured by the scanner or CCD camera to detect the image or pattern of the embossing.

As yet a further example, the security feature may comprise intaglio print consisting of a pattern or image created by printing onto the surface of the paper ballot using an etched or engraved plate having ink within the recesses on the plate. The intaglio print is analogous to a combination of the embossing and printed indicia described above, with the intaglio print comprising both a printed component and an embossed component. An intaglio print may be detected as a visible image or pattern using an image capture device such as a scanner or CCD camera. In this case, the presence or absence of the intaglio print image or pattern may be discerned by processing the image captured by the scanner or CCD camera to detect the image or pattern of the intaglio print.

It should be understood that the detection of security feature 518 on ballot 510 may be used to distinguish between an authentic ballot (which would include the security feature) and a counterfeit ballot (which would not include the security feature). In addition, the security feature may be used to identify and detect various types of election information, such as information identifying an election, a ballot style, a ballot type, a ballot specific to a particular precinct, an absentee ballot, or an election day ballot. For example, a first watermark may correspond to a first ballot style and a second watermark may correspond to a second ballot style (wherein both watermarks would also be used to authenticate the ballot). In this case, the code channel marks 517 on ballot 510 would not be required because the ballot style information would be provided by the watermark.

Furthermore, it should be understood that more than one security feature may be provided on a single paper ballot to provide multiple counterfeit detection methods, and to provide multiple types of information corresponding to that ballot. For example, all paper ballots for a given election could include a chemical taggant security feature, with that taggant corresponding to that particular election. In addition, paper ballots used in a first precinct may additionally include a second security feature corresponding to that precinct (such as a different taggant, or a watermark, etc.) with ballots used in a second precinct including a third security feature corresponding to that precinct (such as yet another taggant, or another watermark, etc.). Thus, the security features on a given paper ballot would identify both the election and the precinct associated with that ballot.

It should further be understood that paper ballot 510, which has the appearance of a traditional paper ballot, is merely an example of a ballot that could be used in accordance with the present invention. A wide variety of other ballot formats and configurations are within the scope of the present invention, such as the printed ballots produced by ballot printer 108 (see FIG. 3) when voting device 12 is operating in audio ballot mode, as described in greater detail above. Of course, with these other types of ballots, the manner in which the ballot tabulator scans the voting selections marked on the ballots will vary in accordance with the ballot format. For example, if the voting selections are marked on the ballots with one or more barcodes, the ballot tabulator will include a barcode reader for scanning the voting selections (i.e., the barcodes) marked on the ballots. Regardless of the ballot format, however, the ballots may include a security feature that allows the ballot tabulator to distinguish between an authentic ballot and a counterfeit ballot.

Referring again to FIGS. 12-14, the configuration of ballot tabulator 550 (which is a precinct-based tabulator) will now be described with a focus on the components relating to the detection of security features on paper ballots. It should be understood that the remaining components of ballot tabulator 550 are essentially the same as those described above in connection with voting device 12 and, thus, will not be described hereafter.

Turning first to FIG. 12, ballot tabulator 550 includes a ballot insertion tray 556 configured to receive a paper ballot, such as ballot 510 described above. Specifically, ballot insertion tray 556 includes a slot 554 into which is inserted a paper ballot 510 that has been marked with the desired voting selections. Ballot tabulator 550 also includes a ballot drive mechanism, as shown in FIG. 13. Ballot tabulator 550 is depicted in FIG. 13 with its upper portion hinged upwardly to reveal a plurality of ballot transport rollers, including forward lower rollers 560*a*, 560*b* and corresponding forward upper rollers 564*a*, 564*b*, and rear lower rollers 562*a*, 562*b* and corresponding rear upper rollers 566*a*, 566*b*. As is known in the art, the ballot transport rollers comprise pairs of opposed resilient rollers controlled by the CPU board that rotate together to transport ballot 510 ballot through ballot tabulator 550, or, when rotated in the opposite direction, to eject ballot 510 from ballot tabulator 550. As described above with reference to voting device 12, ballot position sensors are also provided to continuously monitor whether a paper ballot has been inserted into ballot insertion tray 556 and, upon detection of a ballot, the ballot is transported into ballot tabulator 550 as just described.

Ballot tabulator 550 also includes an upper security sensor 568 and a lower security sensor 570 that are operable to detect one or more security features on paper ballot 510. As best shown in FIG. 14, as paper ballot 510 is transported through ballot tabulator 550, the ballot passes in proximity to upper and lower security sensors 568, 570 such that one or more security features on the ballot can be detected. In this exemplary embodiment, security sensors 568, 570 comprise chemical taggant detectors available from Authentix, Inc.® of Addison, Tex. In other embodiments, the security sensors may be any of a scanner, a CCD camera, a light source, a radio frequency transmitter/receiver, or any combination thereof. One skilled in the art will appreciate that other types of sensors could also be used in accordance with the present invention. Further, the security sensors may be integrated units comprising various types of sensors in a single package, or may be separate units comprising one or more of a combination of various sensors.

While security sensors 568, 570 are depicted as being positioned approximately in the center of the path of paper ballot 510, they may likewise be placed in other positions corresponding to the location of specific security features on the ballot. And, while upper and lower security sensors 568, 570 are shown, a single sensor may be located only on the upper portion or only on the lower portion of the ballot drive mechanism, or in a different area of ballot tabulator 550 altogether. Further, the ballot scanner assembly (as described above with respect to voting device 12) may comprise all or a portion of a sensor in the case where a captured image of the paper ballot is required to detect a specific security feature.

Security sensors 568, 570 are preferably in communication with the CPU board of ballot tabulator 550 so that the CPU board can control the operation of the sensors and/or receive an output signal from the sensors (e.g., receive an image from a CCD camera, receive a signal from a chemical taggant sensor, etc.).

Operation of Ballot Tabulator with Security Sensor(s)

An exemplary operation of ballot tabulator 550 will now be described with reference to FIGS. 12-14. It should be understood that ballot tabulator 550 operates in essentially the same manner as voting device 12 when operating in the paper ballot mode, with the exception that ballot tabulator 550 also performs various steps relating to the detection of security features on paper ballots. Thus, the operation of ballot tabulator 550 will be described with a focus on the steps relating to the detection of security features on paper ballots. It should be understood that the remaining steps performed by ballot tabulator 550 are essentially the same as those described above in connection with the operation of voting device 12 and, thus, will not be described hereafter. Of course, the steps relating to the electronic ballot mode and/or the audio ballot mode are optional and may or may not be incorporated into ballot tabulator 550.

In operation, after a voter has inserted a ballot into ballot insertion tray 556, the ballot position sensors detect the ballot and the ballot drive mechanism (i.e., rollers 560*a*, 560*b*, 562*a*, 562*b*, 564*a*, 564*b*, 566*a*, 566*b*) transports the ballot into ballot tabulator 550. The ballot scanner assembly scans the paper ballot to capture an image of the ballot. For double-sided ballots, both sides of the paper ballot are preferably scanned simultaneously to capture an image of each side of the ballot. The CPU board then analyzes the captured image of the ballot to decode or determine the voting selections marked on the ballot.

As the paper ballot is transported through ballot tabulator 550 for the purpose of acquiring an image of the front and/or back of the ballot, it is also transported in proximity to the upper and lower security sensors 568, 570 (see FIG. 14). Security sensors 568, 570 detect the presence or absence of one or more security features on the ballot and transmit an output signal to the CPU board. For example, in the case of a chemical taggant security feature, the output signal comprises an indication of whether or not the expected chemical taggant was detected on the ballot. As another example, in the case of a watermark security feature, the security sensors may be CCD cameras operable to capture an image of a portion of the paper ballot. In this case, the output signal would comprise image information that may be analyzed by the CPU board to determine the presence or absence of the expected watermark security feature.

It should be understood that the sensors may include circuitry necessary to detect the various security features, such as an ultraviolet light operable to fluoresce a thread security feature, a radio frequency output operable to cause an RF microchip taggant to broadcast its information, or a visible light source operable to illuminate an embossed security feature. This circuitry may be packaged integrally with the corresponding detection circuitry, or may be packaged and positioned separately from the detection circuitry. Those skilled in the art will recognize the various combinations, configurations, and arrangements of the security sensor circuitry that are included within the scope of the present invention.

It should also be understood that the CPU board may provide the analysis of captured images in detecting watermark, embossing, or similar security features, such that the sensor output must be analyzed to determine the presence or absence of the security feature on the ballot. Alternatively, the sensor itself may include circuitry operable to provide the analysis such that the sensor output alone is sufficient to determine the presence or absence of the security feature on the ballot. Thus, the determination of whether or not a ballot contains an expected security feature may be based on the output signal originating from the security sensor or may be based on an analysis of the output signal by the CPU board (depending upon the processing power of the CPU board and/or the availability of integrated sensors having the desired capabilities).

Looking to FIGS. 13 and 14, after the paper ballot has been transported past the ballot scanner assembly and security sensors 568, 570, the ballot is held by the rear ballot transport rollers 564*a*, 564*b*, 566*a*, 566*b* while the information acquired from the ballot scanner assembly and security sensors is processed by the CPU board. If an expected security feature has not been detected on the ballot, the ballot tabulator 550 preferably displays an error message such as "Security Feature Not Detected—Contact Poll Worker" on the display screen. In addition, an audible alert may be generated via an output signal from the CPU board using a buzzer, piezoelectric device, tone generator, or other audible device known in the art. The ballot will then be returned to the voter by ejecting the ballot through the ballot insertion tray 556 (i.e., by reversing the rotational direction of the ballot transport rollers). The voter may then request a new ballot from a poll worker. Alternatively, the ballot tabulator 550 may await input from the touch screen display, such as entry of a password by the poll worker, before ejecting the ballot. In either case, the poll worker may take additional actions as required by the jurisdiction. Because the non-detection of a security feature indicates a potential counterfeit ballot, the voting selections decoded from the ballot will not be tabulated by the ballot tabulator 550 and, as such, will not be included within the vote totals for the precinct.

In the case where no security feature detection errors are present, the ballot tabulator 550 proceeds with processing of the ballot as described above, with the voter selecting the "Don't Cast—Return Ballot" button or the "Cast Ballot/Accept" button on the display screen. If the voter selects the "Don't Cast—Return Ballot" button, the ballot is returned to the voter by ejecting the ballot through the ballot insertion tray 556, in which case the voting selections decoded from the ballot will not be tabulated by the ballot tabulator 550. If the voter selects the "Cast Ballot/Accept" button, the voting selections decoded from the ballot are tabulated by the CPU board and stored in one of the removable USB flash drives of the USB board (as described above in connection with voting device 12). Upon casting the ballot, the ballot tabulator 550 drives the rear ballot transport rollers to eject the ballot through the rear of the tabulator and into an attached ballot receptacle.

As discussed above, in addition to providing a means to distinguish between an authentic ballot and a counterfeit ballot, a particular security feature may be used to identify and detect various types of election information, such as information identifying an election, a ballot style, a ballot type, a ballot specific to a particular precinct, an absentee ballot, an election day ballot, or other information. This additional information would be used by the CPU board in connection with the processing of the ballot. For example, if a security feature identified the ballot style of a ballot, the CPU board would correlate the ballot style information to the election definition in order to decode the voting selections marked on the ballot. One skilled in the art will appreciate the different ways in which the ballot tabulator could use the various types of election information just described.

Finally, it should be understood that ballot tabulator 550 is merely an exemplary embodiment of the invention and that other alternative embodiments are within the scope of the invention. For example, ballot tabulator 550 is a precinct ballot tabulator and, as such, is designed for use by voters and/or poll workers at a particular precinct. In an alternative embodiment, the present invention could be implemented within a central ballot tabulator located at an election headquarters (i.e., a tabulator that is used to process ballots originating from multiple precincts). In this embodiment, if an expected security feature is not detected on a ballot, the central ballot tabulator preferably displays an error message such as "Security Feature Not Detected" on the display screen and the ballot is ejected through the rear of the tabulator and into a designated outstack bin. The operator would then take the ballots from the outstack bin to an election official for handling in accordance with the laws of the jurisdiction. Of course, because the non-detection of a security feature indicates a potential counterfeit ballot, the voting selections decoded from the ballots in the outstack bin are not tabulated by the central ballot tabulator.

In another alternative embodiment, the present invention could be implemented within a ballot reader that is used to verify the authenticity of paper ballots (without providing any tabulation functionality). The ballot reader includes a paper drive mechanism operable to transport a paper ballot through a paper path in the ballot reader, and at least one security sensor operable to detect the security feature on the paper ballot and provide an output indicating the presence or absence of the security feature. In this embodiment, the ballot reader does not scan the paper ballot to determine the voting selections marked thereon and does not tabulate the marked voting selections. Rather, if the paper ballot includes the required security feature, the ballot is dropped in a ballot box for tabulation by a conventional central ballot counter, or the ballot is directly inserted into a conventional precinct ballot counter. The ballot reader could be located either at a precinct or at an election headquarters to provide an additional station for checking the authenticity of paper ballots.

While the present invention has been described and illustrated hereinabove with reference to several exemplary embodiments of the invention, it should be understood that various modifications could be made to these embodiments without departing from the scope of the invention. Therefore, the present invention is not to be limited to the specific configurations or methodologies of the exemplary embodiments herein, except insofar as such limitations are included in the following claims.

What is claimed and desired to be secured by Letters Patent is as follows:

1. A method of detecting security features on paper ballots so as to distinguish between an authentic ballot printed on paper that includes a security feature and a counterfeit ballot printed on paper that does not include said security feature, comprising:

providing paper that includes at least one security feature;

causing a plurality of authentic ballots to be printed on said paper;

using a ballot tabulator to process a paper ballot comprising indicia printed on a paper, wherein one or more voting selections are marked on said paper ballot, and wherein said ballot tabulator is programmed to:

(a) scan said paper ballot to determine said voting selections marked thereon;

(b) detect a presence or an absence of said security feature on said paper of said paper ballot, wherein detection of said security feature indicates that said paper ballot comprises one of said authentic ballots and wherein failure to detect said security feature indicates that said paper ballot comprises a counterfeit ballot;

(c) tabulate said voting selections if said security feature is detected on said paper of said paper ballot; and (d) present an alert if said security feature is not detected on said paper of said paper ballot.

2. The method of claim 1, wherein said alert comprises a visual indication, an audio indication, or combinations thereof.

3. The method of claim 1, wherein said security feature provides an indication of an election, a ballot style, a precinct, an absentee ballot, an election day ballot, or combinations thereof.

4. The method of claim 1, wherein said voting selections are hand-marked by a voter on said paper ballot.

5. The method of claim 1, wherein said voting selections are printed on said paper ballot.

6. The method of claim 1, wherein said ballot tabulator ejects said paper ballot if said security feature is not detected on said paper of said paper ballot.

7. The method of claim 1, wherein said ballot tabulator transfers said paper ballot to an output bin if said security feature is not detected on said paper of said paper ballot.

8. A method of detecting security features on paper ballots so as to distinguish between an authentic ballot printed on paper that includes a security feature and a counterfeit ballot printed on paper that does not include said security feature, comprising:

providing paper that includes at least one security feature;

causing a plurality of authentic ballots to be printed on said paper;

using a ballot tabulator to process a paper ballot comprising indicia printed on a paper, wherein one or more voting selections are marked on said paper ballot, and wherein said ballot tabulator is programmed to:

(a) receive said paper ballot;

(b) detect a presence or an absence of said security feature on said paper of said paper ballot, wherein detection of said security feature indicates that said paper ballot comprises one of said authentic ballots and wherein failure to detect said security feature indicates that said paper ballot comprises a counterfeit ballot; and (c) tabulate said voting selections marked on said paper ballot if said security feature is detected on said paper of said paper ballot.

9. The method of claim 8, wherein said ballot tabulator scans said paper ballot to determine said voting selections marked thereon.

10. The method of claim 8, wherein said ballot tabulator presents an alert if said security feature is not detected on said paper of said paper ballot.

11. The method of claim 10, wherein said alert comprises a visual indication, an audio indication, or combinations thereof.

12. The method of claim 8, wherein said security feature provides an indication of an election, a ballot style, a precinct, an absentee ballot, an election day ballot, or combinations thereof.

13. The method of claim 8, wherein said voting selections are hand-marked by a voter on said paper ballot.

14. The method of claim 8, wherein said voting selections are printed on said paper ballot.

15. The method of claim 8, wherein said ballot tabulator ejects said paper ballot if said security feature is not detected on said paper of said paper ballot.

16. The method of claim 8, wherein said ballot tabulator transfers said paper ballot to an output bin if said security feature is not detected on said paper of said paper ballot.

17. A method of detecting a security feature on a paper ballot so as to distinguish between an authentic ballot printed on paper that includes said security feature and a counterfeit ballot printed on paper that does not include said security feature, comprising:

providing paper that includes at least one security feature;

causing a plurality of authentic ballots to be printed on said paper;

using a ballot reading device to process a paper ballot comprising indicia printed on a paper, wherein one or more voting selections are marked on said paper ballot, and wherein said ballot reading device is programmed to:

(a) receive said paper ballot;

(b) transport said paper ballot through a paper path such that said paper ballot passes in proximity to a security sensor;

(c) utilize said security sensor to detect a presence or absence of a security feature on said paper of said paper ballot, wherein detection of said security feature indicates that said paper ballot comprises one of said authentic ballots and wherein failure to detect said security feature indicates that said paper ballot comprises a counterfeit ballot; and (d) provide an output indicating the detected presence or absence of said security feature on said paper of said paper ballot.

18. The method of claim 17, wherein said ballot reading device presents an alert if said security feature is not detected on said paper of said paper ballot.

19. The method of claim.18, wherein said alert comprises a visual indication, an audio indication, or combinations thereof.

20. The method of claim 17, wherein said security feature provides an indication of an election, a ballot style, a precinct, an absentee ballot, an election day ballot, or combinations thereof.

21. The method of claim 17, wherein said ballot reading device ejects said paper ballot if said security feature is not detected on said paper of said paper ballot.

22. The method of claim 17, wherein said ballot reading device transfers said paper ballot to an output bin if said security feature is not detected on said paper of said paper ballot.

23. A voting system for detecting a security feature on a plurality of paper ballots so as to distinguish between an authentic ballot printed on paper that includes said security feature and a counterfeit ballot printed on paper that does not include said security feature, said voting system comprising:

a plurality of authentic ballots each of which is printed on paper that includes at least one security feature, wherein said security feature is the same on each of said authentic ballots;

a ballot tabulator operable to process a paper ballot comprising indicia printed on a paper, wherein one or more voting selections are marked on said paper ballot;

at least one security sensor positioned within said ballot tabulator, said security sensor operable to detect a presence or an absence of said security feature on said paper of said paper ballot, wherein detection of said security feature indicates that said paper ballot comprises one of said authentic ballots and wherein failure to detect said security feature indicates that said paper ballot comprises a counterfeit ballot; and wherein said ballot tabulator is operable to tabulate said voting selections marked on said paper ballot if said security sensor detects said security feature on said paper of said paper ballot.

24. The voting system of claim 23, further comprising an output device operable to present a visual alert and/or audio alert if said security sensor does not detect said security feature on said paper of said paper ballot.

25. The voting system of claim 24, wherein said output device comprises a display operable to present said visual alert.

26. The voting system of claim 24, wherein said output device comprises a buzzer, a piezoelectric device, a tone generator, or combinations thereof, operable to present said audio alert.

27. The voting system of claim 23, wherein said ballot tabulator comprises a paper drive mechanism operable to transport said paper ballot through a paper path in said ballot tabulator such that said paper ballot passes in proximity to said security sensor.

28. The voting system of claim 23, wherein said security feature provides an indication of an election, a ballot style, a precinct, an absentee ballot, an election day ballot, or combinations thereof.

29. The voting system of claim 23, wherein said voting selections are hand-marked by a voter on said paper ballot.

30. The voting system of claim 23, wherein said voting selections are printed on said paper ballot.

31. A ballot tabulator for detecting a security feature on a plurality of paper ballots so as to distinguish between an authentic ballot printed on paper that includes said security feature and a counterfeit ballot printed on paper that does not include said security feature, wherein said security feature is the same on each said authentic ballot, comprising:

a paper drive mechanism operable to transport each said paper ballot through a paper path in said ballot tabulator, wherein said paper ballot comprises indicia printed on a paper, and wherein one or more voting selections are marked on said paper ballot;

a scanner operable to scan said paper ballot to determine said voting selections marked thereon;

at least one security sensor operable to detect a presence or an absence of said security feature on said paper of said paper ballot, wherein detection of said security feature indicates that said paper ballot comprises an authentic ballot and wherein failure to detect said security feature indicates that said paper ballot comprises a counterfeit ballot; and a processor operable to tabulate said voting selections marked on said paper ballot if said security sensor detects said security feature on said paper of said paper ballot.

32. The ballot tabulator of claim 31, further comprising an output device operable to present a visual alert and/or audio alert if said security sensor does not detect said security feature on said paper of said paper ballot.

33. The ballot tabulator of claim 31, wherein said output device comprises a display operable to present said visual alert.

34. The ballot tabulator of claim 31, wherein said output device comprises a buzzer, a piezoelectric device, a tone generator, or combinations thereof, operable to present said audio alert.

35. The ballot tabulator of claim 31, wherein said security feature provides an indication of an election, a ballot style, a precinct, an absentee ballot, an election day ballot, or combinations thereof.

36. The ballot tabulator of claim 31, wherein said voting selections are hand-marked by a voter on said paper ballot.

37. The ballot tabulator of claim 31, wherein said voting selections are printed on said paper ballot.

38. A voting system for detecting security features on paper ballots so as to distinguish between an authentic ballot printed on paper that includes said security feature and a counterfeit ballot printed on paper that does not include said security feature, comprising:

a plurality of authentic ballots each of which is printed on paper that includes at least one security feature, wherein said security feature is the same on each of said authentic ballots;

at least one security sensor operable to detect a presence or an absence of said security feature on said paper of said paper ballot, wherein detection of said security feature indicates that said paper ballot comprises one of said authentic ballots and wherein failure to detect said security feature indicates that said paper ballot comprises a counterfeit ballot; and a ballot tabulator in electrical communication with said security sensor and operable to process a paper ballot comprising indicia printed on a paper, wherein one or more voting selections are marked on said paper ballot, said ballot tabulator programmed to:

scan said paper ballot to determine said voting selections marked thereon;

tabulate said voting selections marked on said paper ballot if said security sensor detects said security feature on said paper of said paper ballot; and present a visual alert and/or audio alert if said security sensor does not detect said security feature on said paper of said paper ballot.

39. The voting system of claim 38, wherein said security feature provides an indication of an election, a ballot style, a precinct, an absentee ballot, an election day ballot, or combinations thereof.

* * * * *